United States Patent
Igarashi et al.

(10) Patent No.: US 11,782,594 B2
(45) Date of Patent: Oct. 10, 2023

(54) DISPLAY APPARATUS, DISPLAY SYSTEM, AND DISPLAY METHOD

(71) Applicants: Kanae Igarashi, Kanagawa (JP); Susumu Fujioka, Kanagawa (JP)

(72) Inventors: Kanae Igarashi, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/688,929

(22) Filed: Mar. 8, 2022

(65) Prior Publication Data

US 2022/0308746 A1    Sep. 29, 2022

(30) Foreign Application Priority Data

Mar. 22, 2021    (JP) .................................. 2021-047765
Sep. 30, 2021    (JP) .................................. 2021-161931

(51) Int. Cl.
  *G06F 3/04883*    (2022.01)
  *G06F 3/04817*    (2022.01)
  *G06F 3/0482*     (2013.01)

(52) U.S. Cl.
  CPC ........ *G06F 3/04883* (2013.01); *G06F 3/0482* (2013.01); *G06F 3/04817* (2013.01)

(58) Field of Classification Search
  CPC . G06F 3/04883; G06F 3/04817; G06F 3/0482
  See application file for complete search history.

(56) References Cited

U.S. PATENT DOCUMENTS

| | | | | |
|---|---|---|---|---|
| 6,020,895 A * | 2/2000 | Azami | .................. | G06F 3/0481 345/619 |
| 7,503,008 B2 * | 3/2009 | Berquist | ............... | G06F 40/169 715/764 |
| 7,725,493 B2 * | 5/2010 | Saund | ................. | G06F 16/9027 707/713 |
| 7,911,495 B2 * | 3/2011 | Tamaru | ............... | H04L 12/1831 348/14.07 |
| 9,519,414 B2 * | 12/2016 | Farouki | ..................... | G06F 3/14 |
| 2002/0196284 A1 * | 12/2002 | Berquist | ............... | G06Q 10/10 715/769 |
| 2007/0011239 A1 | 1/2007 | Fujioka | | |
| 2007/0263082 A1 * | 11/2007 | Tamaru | ................. | G06F 3/1454 348/14.08 |
| 2008/0235211 A1 * | 9/2008 | Saund | ................. | G06F 16/9027 |
| 2010/0195123 A1 | 8/2010 | Fujioka | | |

(Continued)

FOREIGN PATENT DOCUMENTS

| | | |
|---|---|---|
| JP | 2001-108475 | 4/2001 |
| JP | 2018-093361 | 6/2018 |
| JP | 2019-008668 | 1/2019 |

*Primary Examiner* — Michael J Jansen, II
(74) *Attorney, Agent, or Firm* — XSENSUS LLP

(57) ABSTRACT

A display apparatus includes circuitry to display a display area at a first location. The display area is a portion of an input receiving area for receiving hand drafted input. The circuitry selects an object to be retained in the display area based on a user operation, receives an operation of moving the display area to a second location different from the first location in the input receiving area, and displays the display area in which the object is retained at the second location according to the operation of moving the display area.

16 Claims, 43 Drawing Sheets

(56) References Cited

U.S. PATENT DOCUMENTS

| | | | |
|---|---|---|---|
| 2014/0164984 A1* | 6/2014 | Farouki | G06F 3/14 |
| | | | 715/784 |
| 2015/0332060 A1 | 11/2015 | Tsumura et al. | |
| 2018/0160076 A1 | 6/2018 | Ozaki | |
| 2020/0382700 A1 | 12/2020 | Takatsu et al. | |
| 2021/0133363 A1 | 5/2021 | Okumura et al. | |

* cited by examiner

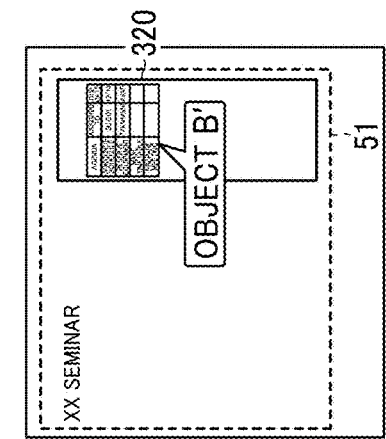
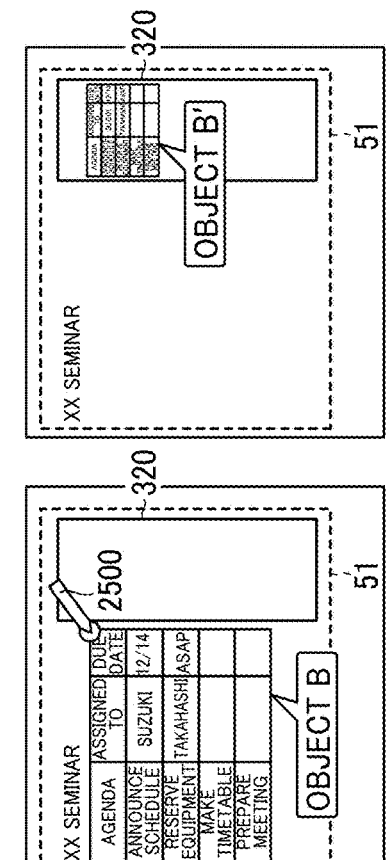
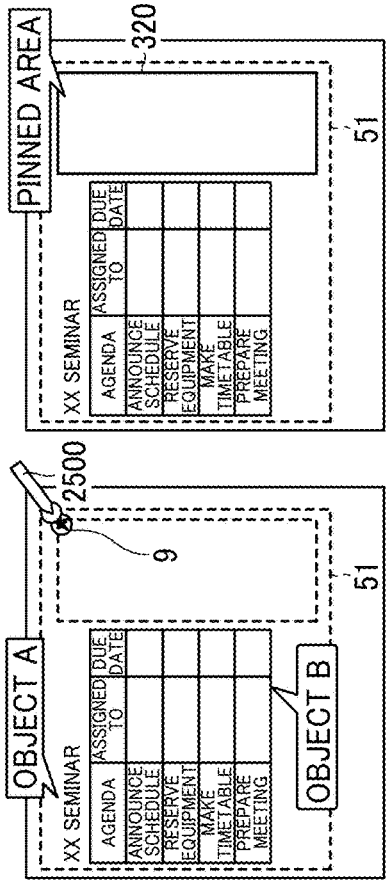
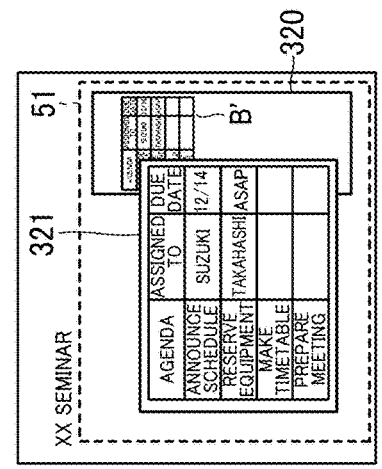
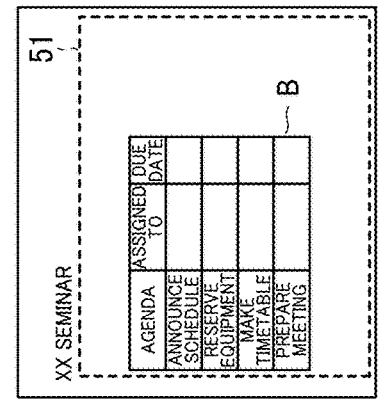
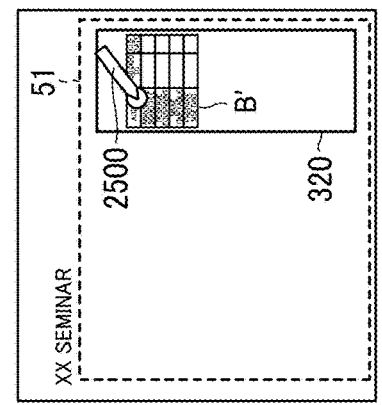

DISPLAY APPARATUS, DISPLAY SYSTEM, AND DISPLAY METHOD

CROSS-REFERENCE TO RELATED APPLICATIONS

This patent application is based on and claims priority pursuant to 35 U.S.C. § 119(a) to Japanese Patent Application Nos. 2021-047765, filed on Mar. 22, 2021, and 2021-161931, filed on Sep. 30, 2021, in the Japan Patent Office, the entire disclosure of which is hereby incorporated by reference herein.

BACKGROUND

Technical Field

Embodiments of the present disclosure relate to a display apparatus, a display system, a display method, and a recording medium.

Related Art

There are display apparatuses such as electronic whiteboards having a touch panel display that displays a hand drafted object drawn by strokes input by a user with an input device, such as a dedicated electronic pen, or a finger. A display apparatus having a relatively large touch panel is used in a conference room or the like, and is shared by a plurality of users as an electronic whiteboard or the like.

There is a technology for effectively casing a limited display area of a display apparatus. For example, there is a display apparatus that allows a user to move an object away from a display area while retaining an operation menu in the display area.

SUMMARY

An embodiment provides a display apparatus that includes circuitry to display a display area at a first location. The display area is a portion of an input receiving area for receiving hand drafted input. The circuitry selects an object to be retained in the display area based on a user operation, receives an operation of moving the display area to a second location different from the first location in the input receiving area, and displays the display area in which the object is retained at the second location according to the operation of moving the display area.

Another embodiment provides a display system that includes an information processing apparatus connected to a network, and a first display apparatus and a second display apparatus to communicate with each other via the information processing apparatus. The information processing apparatus includes a memory that stores data of one or more objects exchanged between the first display apparatus and the second display apparatus. The first display apparatus includes first circuitry to display one or more objects in a display area that is a portion of an input receiving area for receiving hand drafted input, select an object to be retained in the display area based on an operation of a user at the first display apparatus, and, in accordance with an operation of moving the display area from a first location to a second location in the input receiving area, transmit, to the information processing apparatus, data of the selected object and an instruction for moving the display area. The information processing apparatus includes second circuitry to move the display area and the selected object based on the instruction for moving; generate an image of the display area, including the selected object, having moved to the second location; and transmit the image of the display area to the first display apparatus and the second display apparatus. The first display apparatus and the second display apparatus display the image of the display area received from the information processing apparatus.

Another embodiment provides a display method that includes displaying a display area at a first location in an input receiving area for receiving hand drafted input, selecting an object to be retained in the display area based on a user operation, receiving an operation of moving the display area to a second location different from the first location in the input receiving area, and displaying the display area in which the object is retained at the second location according to the operation of moving the display area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 24A to 24G illustrate an example of display of an object pinned to the pinning layer, according to Embodiment 8;

FIG. 30 is an example of an object handwritten on a display apparatus by a user at one site;

FIG. 31 is a diagram illustrating a display area in which a pinning button is displayed;

Figure 1A:
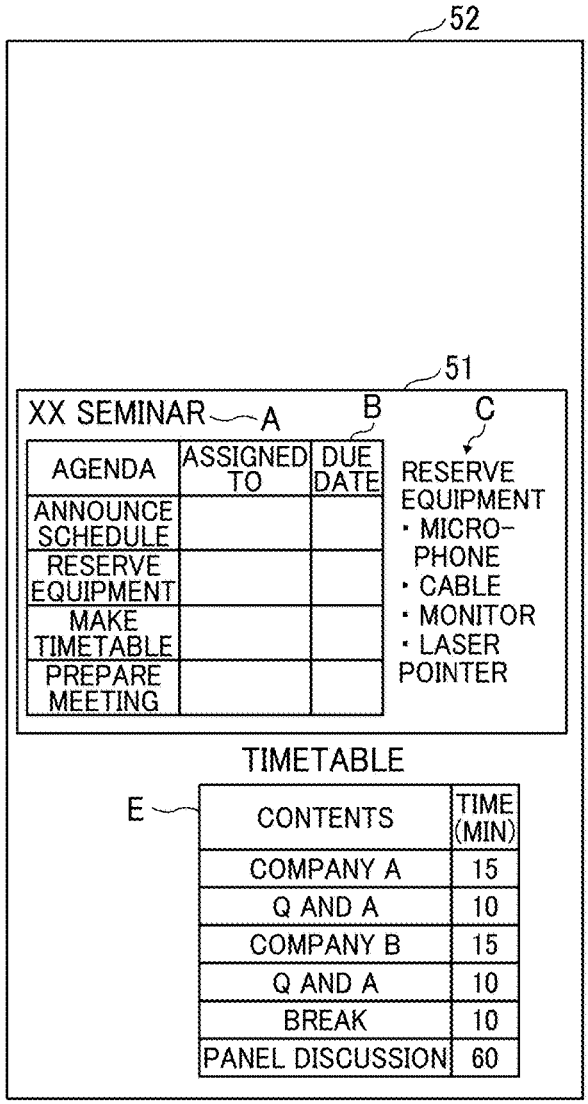
FIGS. 1A to 1D are diagrams illustrating relationship between an input receiving area and a display area of a display apparatus according to one embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a display apparatus, a display system, and a display method performed by the display apparatus according to embodiments of the present disclosure, with reference to the attached drawings.

Embodiment 1

First, a description is given of a comparative technology before describing the display apparatus according to the present embodiment. There are display apparatuses that provide an input receiving area that is wider than a display area. The input receiving area receives hand drafted input. Such a display apparatus displays a portion of the input receiving area as the display area in response to a user's operation.

FIGS. 1A to 1D are diagrams illustrating the relationship between an input receiving area 52 provided by the a display apparatus and a display area 51 displayed by the display apparatus. FIG. 1A illustrates an example of the input receiving area 52. The display apparatus allows the user to handwrite objects or arrange objects in the input receiving area 52, like a whiteboard. There are display apparatuses that provide an infinite input receiving area 52. The display area 51 is a portion of the input receiving area 52 currently displayed on a display (a screen) by the display apparatus. In FIG. 1A, an object A (XX seminar), an object B that is an agenda table for preparation of XX seminar, and an object C (note about a subject "reserve equipment" on the agenda) are in the display area 51. Further, an object E (timetable) is in the input receiving area 52 outside the display area 51. The display area 51 may be the same in size as the screen, that is, the display area 51 extends the entire screen.

Figure 1B:
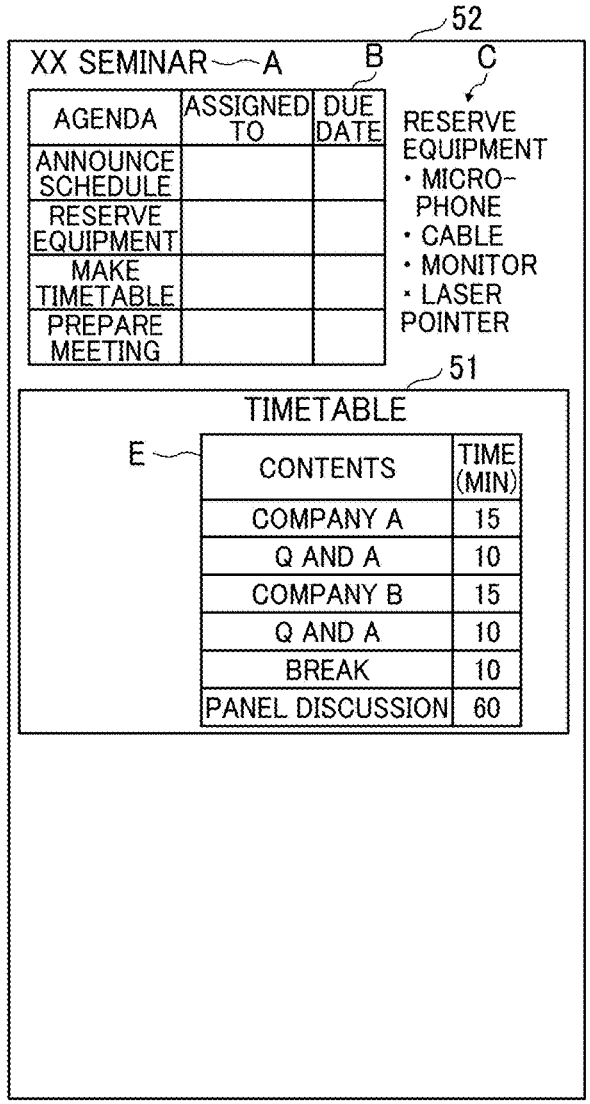
Figure 1C:
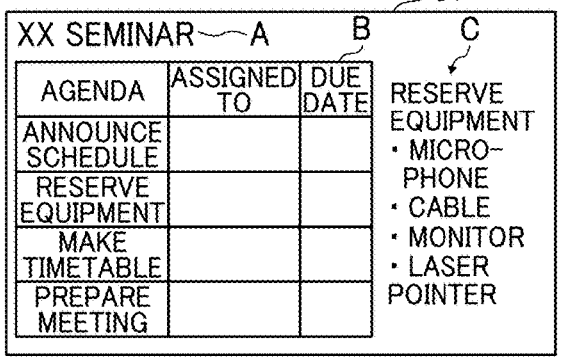

FIG. 1C illustrates the display area 51 displayed by the display apparatus that provides the input receiving area 52 illustrated in FIG. 1A.

Figure 1D:
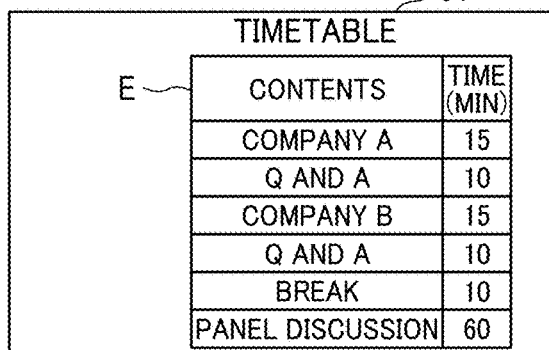

When the user moves, by a swipe operation, the display area 51 illustrated in FIG. 1A to display the object E illustrated in FIG. 1B, the display apparatus displays the display area 51 illustrated in FIG. 1D. Swiping refers to an operation of sliding the touch panel up, down, left, or right while pressing the touch panel with an input device (such as a finger).

As described above, since only a portion of the input receiving area 52 is displayed as the display area 51, the user has to swipe the screen when referring to an object that is not displayed. This may interrupt the discussion.

A description is given of an overview of display apparatus according to the present embodiment.

The display apparatus according to the present embodiment adopts a transparent layer (pinning layer) for pinning an object.

Figure 2:
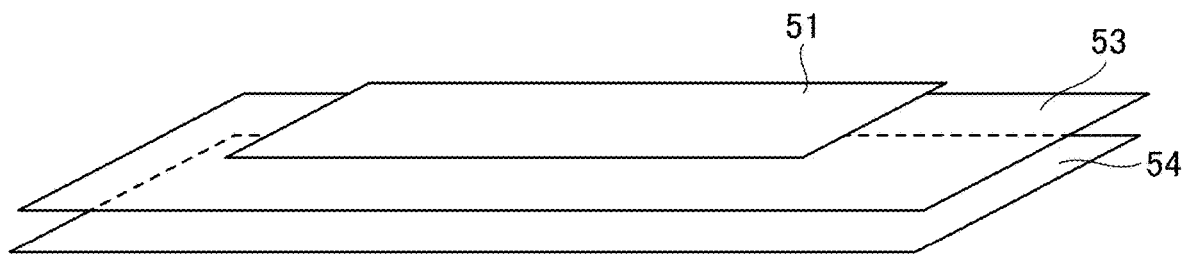
FIG. 2 is a diagram illustrating the relationship among display layers of the display apparatus according to one embodiment.

FIG. 2 is a diagram illustrating the relationship between layers of a display apparatus 2 (see FIG. 4) according to the present embodiment. The display apparatus 2 has a drawing layer 54 and a pinning layer 53 from the back in the direction of sight of a user.

The drawing layer 54 includes all objects.

The pinning layer 53 is closer to the sight of the user than the drawing layer 54.

The pinning layer 53 is pinned or retained in the display area 51. In other words, even when the display area 51 is moved in the input receiving area 52, the display apparatus 2 keeps displaying the object pinned in the pinning layer 53.

The drawing layer 54 expresses one pixel in red, green, and blue (RGB). In the pinning layer 53, an object of the drawing layer 54 is temporarily recorded, and pixels other than the object are transparent (value is 0). An object in the pinning layer 53 is displayed in the display area 51 by overwriting pixels in the drawing layer 54.

For example, the display apparatus 2 receives pinning of an object by either of the following user operations.

(i) The user holds down an object to be pinned with the input device and presses a displayed pinning button.

(ii) The user handwrites a predetermined mark and encloses, with handwriting, an area to be pinned.

The display apparatus 2 allows the user to cancel the pinning of the object or area.

Pinning of an object will be described with reference to FIG. 3. FIGS. 3A to 3D illustrate an example of display of an object pinned to the pinning layer 53.

Figure 3A:
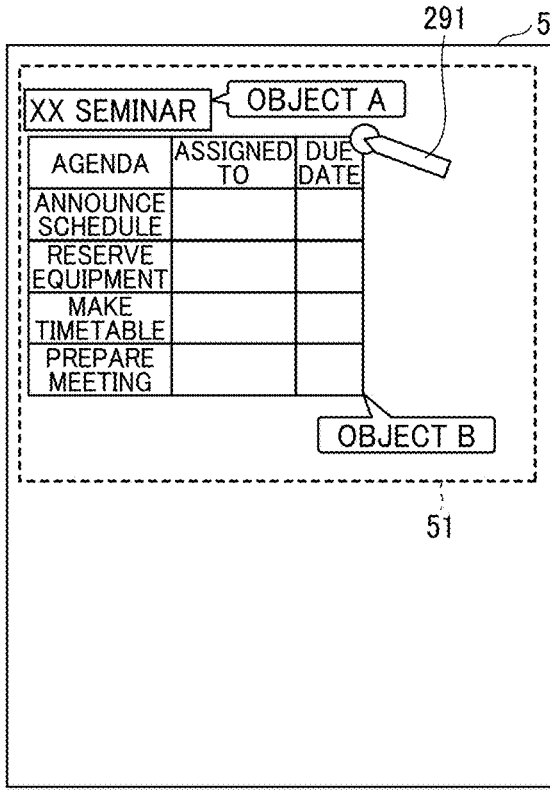
FIGS. 3A to 3D illustrate an example of display of an object pinned (retained) to a pinning layer according to one embodiment.

FIG. 3A illustrates the object A (XX seminar) and the object B (the table having a header cell "agenda") input in the input receiving area 52. The display area 51 is indicated by a broken line. The coordinates of the upper loll corner of the display area 51 are set as the origin (0,0). The upper left coordinates of an object are set as the start point coordinates of the object, and the lower right coordinates thereof are set as the end point coordinates of the object, relative to the origin.

Figure 3B:
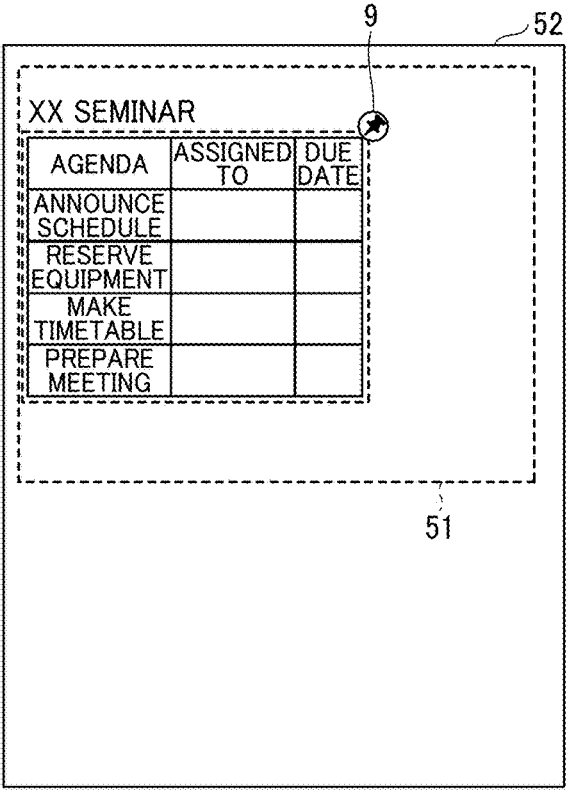

When the user holds down the object B (agenda table) with an input device 291, the display apparatus 2 (see FIG. 4) sets the object B to a selected state and displays a pinning button 9 as illustrated in FIG. 3B. The pinning button 9 is an example of a graphical representation for selecting an object to be retained in the display area 51.

When the user presses the pinning button 9, the display apparatus deletes the object B from the drawing layer 54 and adds the object B to the pinning layer 53.

Figure 3C:
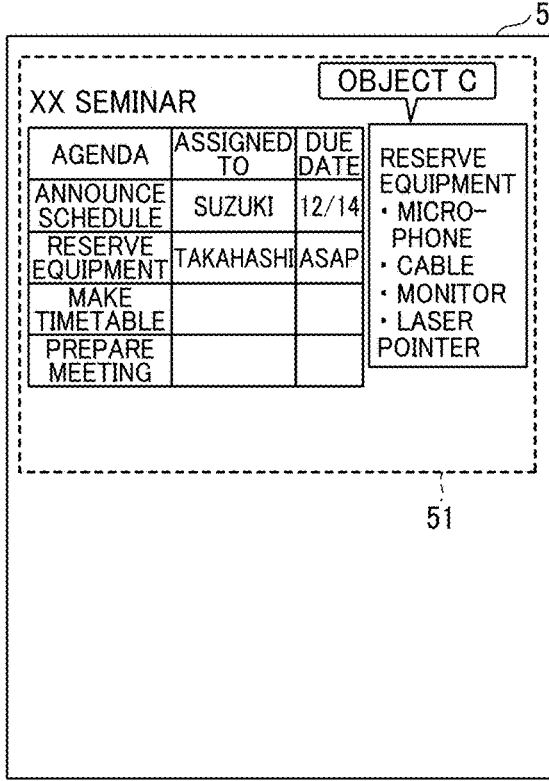

In FIG. 3C, the user handwrites, in a blank space, the object C that is a memo about the subject "reserve equipment" in the object B (agenda table).

The user tries to write a minute memo about "Make timetable" of the object B, but the space is not sufficient. The coordinates of the object B do not change relative to the display area 51, and the display position of the object B in the display area 51 does not change. That is, in the display area 51 after the swipe, the object B is displayed at the same position of the object B being selected in the display area 51 in FIGS. 3A and 3B.

Figure 3D:
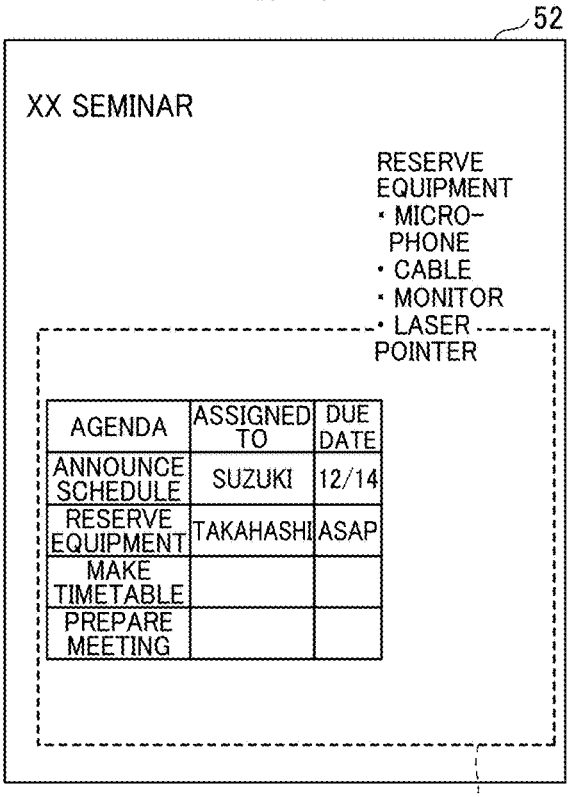

When the display area 51 is thus moved in the input receiving area 52, a space is created on the right of the object B as illustrated in FIG. 3D. Thus, the user can write a minute memo (the object C) about the "Make timetable" of the object B.

As described above, the display apparatus 2 according to the present embodiment retains a pinned object in the display, area 51.

Terms

"Input device" may be any means capable of handwriting by designating coordinates on a touch panel. Examples thereof include an electronic pen, a human finger or hand, and a bar-shaped member.

A series of user operations including engaging a writing mode, recording movement of an input device or portion of a user, and then disengaging the writing mode is referred to as a "stroke." The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse.

"Stroke data" is data based on a trajectory of coordinates of a stroke input with the input device. The stroke data may be interpolated appropriately.

"Hand-drafted input data" includes one or more stroke data and is data used for displaying (reproducing) a display screen including objects hand-drafted by the user.

"Hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user.

A "character string" obtained by character recognition and conversion of hand drafted input data is not limited to text data but may include other data input by a user operation, such as a stamp of a given character or mark such as "complete," a graphic including a circle, a rectangle, a line, and a star, a balloon, and a note (mark).

The character string includes one or more characters handled by a computer. The character string actually is one or more character codes. Characters include numbers, alphabets, symbols, and the like. The character string is also referred to as text data.

An "object" refers to an item displayed on a screen. The term "object" in this specification represents an object of display. In the description of embodiments, objects include hand drafted objects, character strings, graphics (for example, circles, rectangles, and arrows), stamps, balloons, labels (tags), and images.

A "display component" is a button or an icon displayed on the screen, and is also referred to as a graphical representation. For example, the pinning button 9 is a display component.

Example Structure of Display Apparatus

Figure 4:
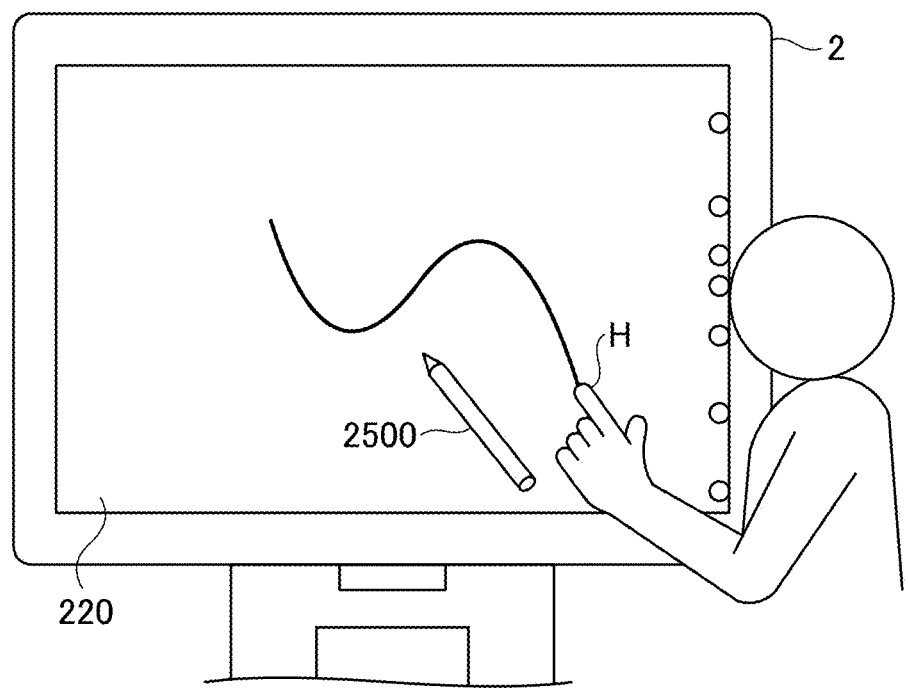
FIG. 4 is a schematic view illustrating an example of a configuration of a display apparatus according to one embodiment.

FIG. 4 is a schematic diagram illustrating an example structure of the display apparatus 2. The display apparatus 2 is used by a user. In the display apparatus 2 according to the present embodiment, the user can perform handwriting on a display 220 with the input device 291 such as a hand H or an electronic pen 2500.

Although the display apparatus 2 illustrated in FIG. 4 is placed landscape, the display apparatus 2 may be placed portrait. The user can rotate the display apparatus 2 around the center of the display 220 as an axis for switching between the landscape placement and the portrait placement.

Hardware Configuration

Figure 5:
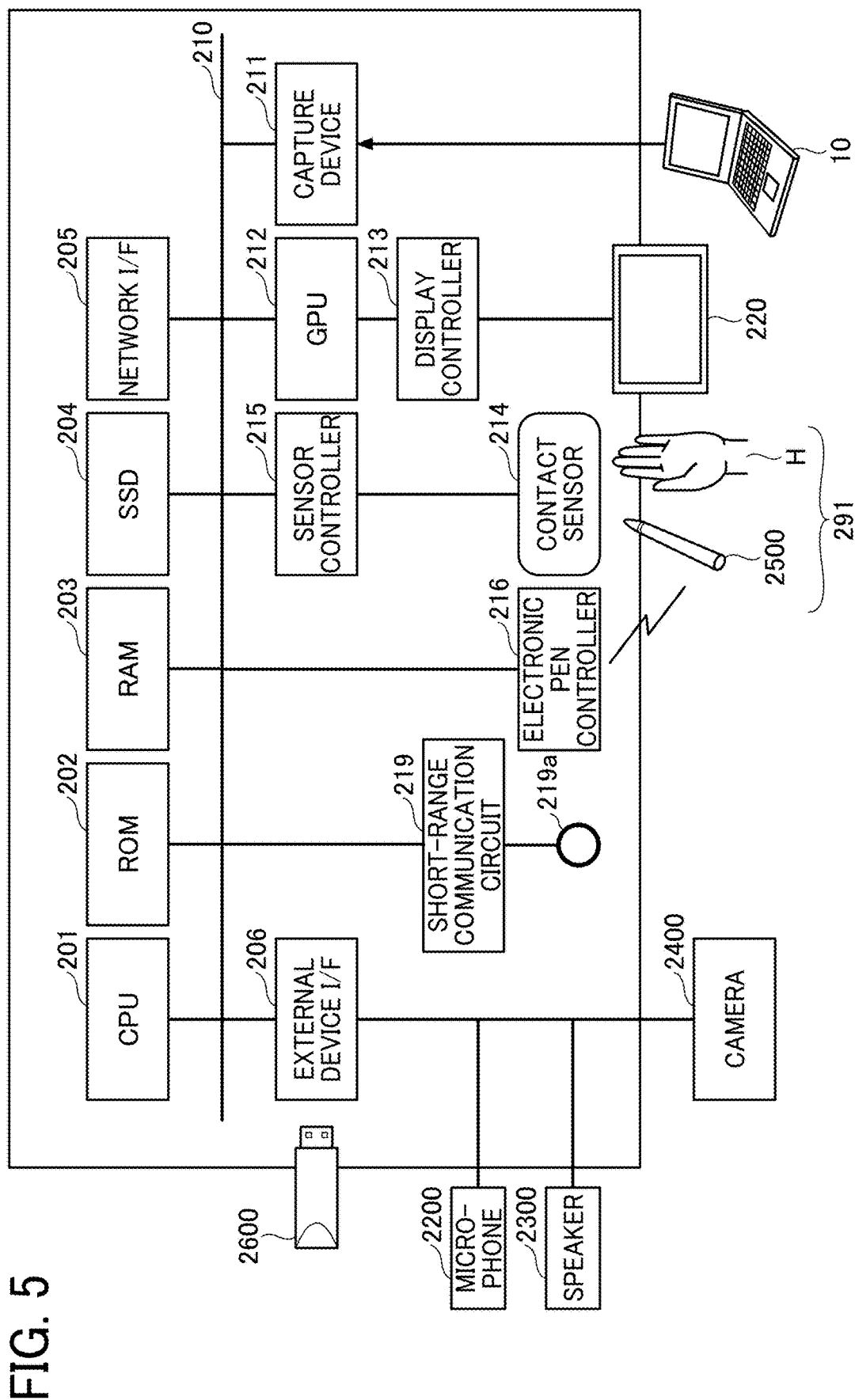
FIG. 5 is a block diagram illustrating an example of a hardware configuration of the display apparatus according to one embodiment.

FIG. 5 is a block diagram illustrating an example of a hardware configuration of the display apparatus 2. The display apparatus 2 includes a central processing unit (CPU) 201, a read only memory (ROM) 202, a random-access memory (RAM) 203, a solid-state drive (SSD) 204, a network controller 205, and an external device interface (I/F) 206. The display apparatus 2 is a shared terminal for sharing information.

The CPU 201 controls entire operation of the display apparatus 2. The ROM 202 stores a control program such as an initial program loader (IPL) to boot the CPU 201. The RAM 203 is used as a work area for the CPU 201.

The SSD 204 stores various data such as a control program for the display apparatus 2. This program may be an application program that runs on an information processing apparatus equipped with a general-purpose operating system (OS) such as WINDOWS, MAC OS, ANDROID, and IOS. In this case, the display apparatus 2 is usually used as a general-purpose information processing terminal. However, when a user executes an installed application program, the display apparatus 2 receives handwriting or the like performed by the user similarly to a dedicated display apparatus.

The network controller 205 controls communication with an external device through a network, and may be implemented by, for example, a network interface circuit. The external device I/F 206 controls communication with a universal serial bus (USB) memory 2600, and external devices such as a microphone 2200, a speaker 2300, and a camera 2400.

The display apparatus 2 further includes a capture device 211, a graphics processing unit (GPU) 212, a display controller 213, a contact sensor 214, a sensor controller 215, an electronic pen controller 216, the short-range communication circuit 219, and an antenna 219a for the short-range communication circuit 219.

The capture device 211 causes a display of a personal computer (PC) 10 to display a still image or a motion video based on image data captured by the capture device 211. The GPU 212 is a semiconductor chip dedicated to graphics. The display controller 213 controls display of an image processed by the GPU 212 for output through the display 220, for example.

The contact sensor 214 detects a touch of the electronic pen 2500 or the user's hand H onto the display 220. The electronic pen 2500 and the hand H are collectively referred to as input devices 291 when not distinguished from each other.

The sensor controller 215 controls operation of the contact sensor 214. The contact sensor 214 inputs and detects coordinates by an infrared blocking system. The inputting and detecting a coordinate may be as follows. For example, two light receiving and emitting devices are disposed at both ends of the upper side of the display 220, and a reflector frame surrounds the periphery of the display 220. The light receiving and emitting devices emit a plurality of infrared rays in parallel to a surface of the display 220. The rays are reflected by the reflector frame, and a light-receiving element receives light returning through the same optical path of the emitted infrared rays.

The contact sensor 214 outputs an identifier (ID) of the infrared ray that is blocked by an object after being emitted from the two light receiving and emitting devices, to the sensor controller 215. Based on the ID of the infrared ray, the sensor controller 215 detects specific coordinates that is touched by the object. The electronic pen controller 216 communicates with the electronic pen 2500 to detect contact by the tip or bottom of the electronic pen with the display 220.

The short-range communication circuit 219 is a communication circuit in compliance with a near field communication (NFC), a BLUETOOTH, or the like.

The display apparatus 2 further includes a bus line 210. Examples of the bus line 210 include an address bus and a data bus, which electrically connect the components including the CPU 201, one another.

The contact sensor 214 is not limited to a sensor using the infrared blocking system, but may be, for example, a capacitance touch panel that identifies a contact position by detecting a change in capacitance. Alternatively, the contact sensor 214 may be a resistance film touch panel that identifies a contact position by a change in voltage of two opposing resistance films. In another example, the contact sensor 214 may be an electromagnetic induction touch panel that identifies a contact position by detecting electromagnetic induction caused by contact of an object to the display. As described above, as the contact sensor 214, various types of detection devices may be used. In addition to or alternative to detecting a touch by the tip or bottom of the electronic pen 2500, the electronic pen controller 216 may also detect a touch by another part of the electronic pen 2500, such as a part held by a hand of the user.

Functions

Figure 6:
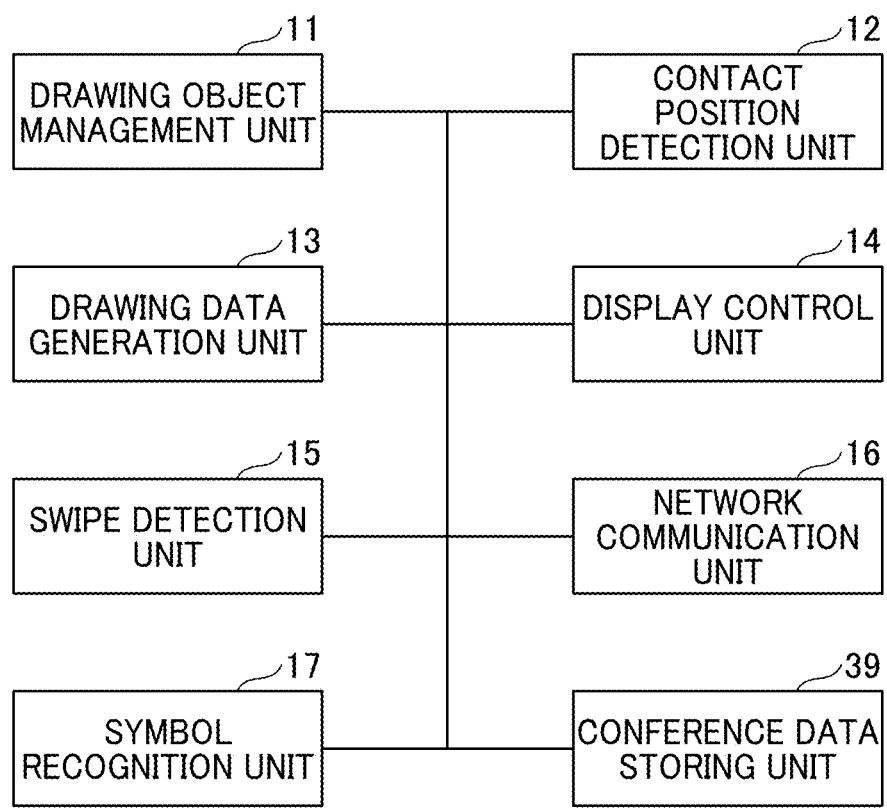
FIG. 6 is a block diagram illustrating an example of a functional configuration of the display apparatus according to one embodiment.

FIG. 6 is a block diagram illustrating an example of a functional configuration of the display apparatus 2 according to the present embodiment. The display apparatus 2 illustrated in FIG. 6 includes a drawing object management unit 11, a contact position detection unit 12, a drawing data generation unit 13, a display control unit 14, a swipe detection unit 15, a network communication unit 16, a symbol recognition unit 17, and a conference data storing unit 39.

The functional units of the display apparatus 2 are implemented by or are caused to function by operation of any of the elements illustrated in FIG. 5 according to an instruction from the CPU 201 according to an application program loaded to the RAM 203.

The contact position detection unit 12 detects coordinates of a position on the touch panel touched by the input device 291 (e.g., a finger or an electronic pen). The contact position detection unit 12 determines that the electronic pen 2500 has touched when the number (width in which light is blocked) of phototransistors that do not detect light from a light-emitting element such as a light emitting diode (LED) is equal to or less than a threshold number, and determines that another object (for example, a finger) has touched when the number of phototransistors is greater than the threshold number.

The drawing data generation unit 13 generates a stroke data from the coordinate point sequence detected by the contact position detection unit 12 when the user performs handwriting. In addition, the drawing data generation unit 13 generates a graphic such as a circle or a rectangle from the shape of the stroke.

The drawing object management unit 11 stores, as an object, an area of the stroke data, an area of a character string, an area of a graphic such as a circle or a rectangle, or an area of a table object generated by the drawing data generation unit 13. The drawing object management unit 11 assigns an object ID to each of these areas, and also records the display position (pixel position on the display 220) of each object.

The display control unit 14 controls display of these objects, menus, and the like on the display 220.

The symbol recognition unit 17 recognizes a symbol such as "+" handwritten by the user by comparing the symbol with symbol data registered in advance. The symbol recognition unit 17 may use pattern matching or a result of machine learning.

When the input device 291 detected by the contact position detection unit 12 is other than an electronic pen, the swipe detection unit 15 detects a swipe operation based on the coordinate point sequence detected by the contact position detection unit 12.

Note that the electronic pen 2500 may be capable of swiping, and in the present embodiment, a description will be given of a case where the user swipes with the input device 291.

The conference data storing unit 39 stores materials and objects used in a conference in the SSD 204.

The network communication unit 16 connects the network controller 205 to a network such as a local area network (LAN) or the Internet, and transmits and receives data to and from other devices via the network.

Figure 7:
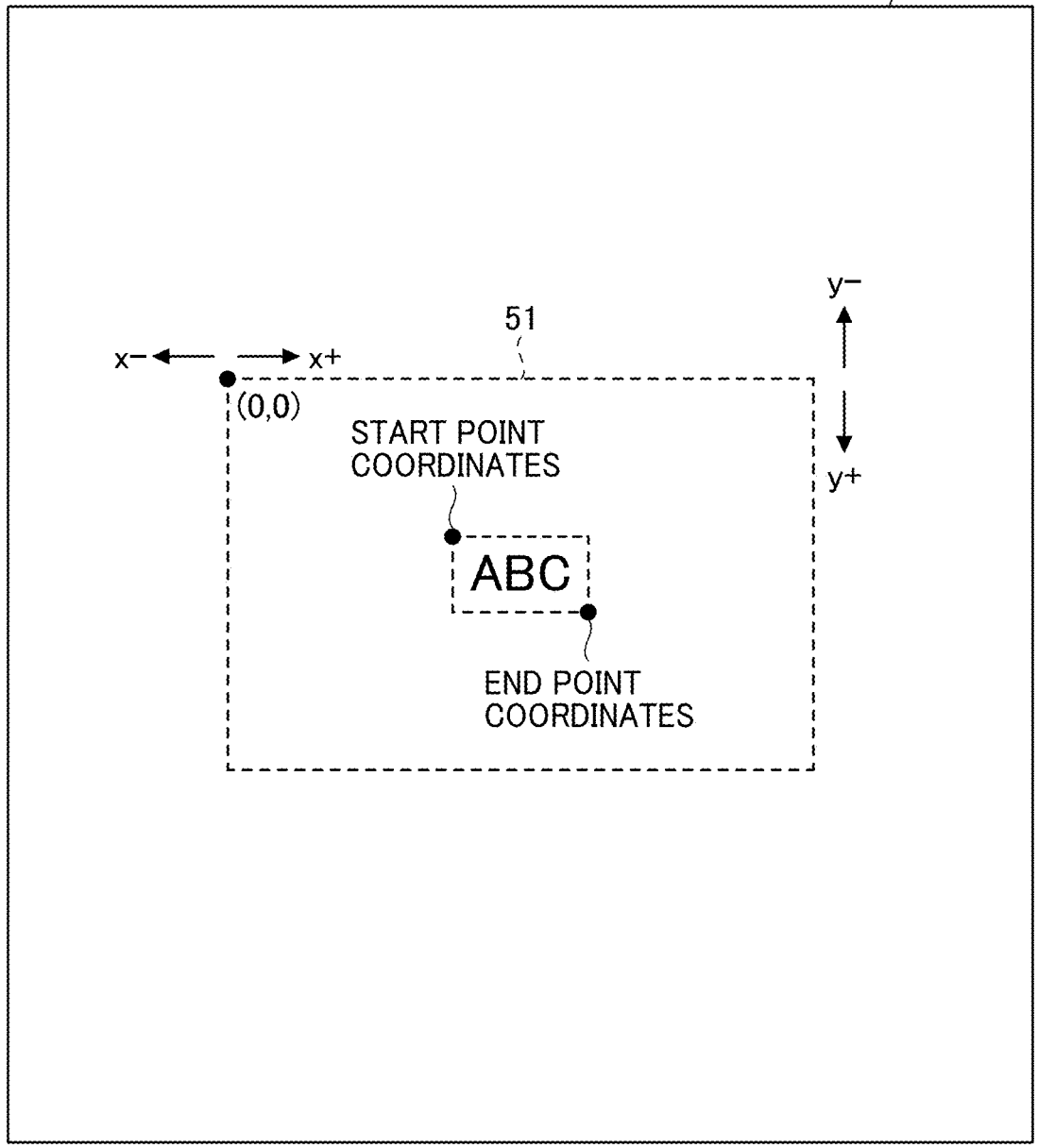
FIG. 7 illustrates coordinates of an object stored by a drawing object management unit according to one embodiment.

A description is given of coordinates of objects stored by the drawing object management unit 11 with reference to FIG. 7. The coordinates of an object in the display area 51 (e.g., a screen) of the display 220 of the display apparatus 2 are expressed on a coordinate plane in which the origin is a pixel position at an upper left corner of the display area 51, the rightward direction is a positive direction of an X axis, and a downward direction is a positive direction of a Y axis. Specifically, the position (coordinates) is (the number of pixels in the x-axis direction from the origin pixel, the number of pixels in the y-axis direction from the origin pixel).

The display area 51 is an area currently displayed on the display 220 out of the input receiving area 52 provided by the display apparatus 2. The coordinates of the display area 51 in the input receiving area 52 represent a position relative to the origin that is the pixel position at the upper left corner of the display area 51 (a part of the display 220) in the initial state. In addition, the rightward direction is the positive direction of the X axis, the leftward direction is a negative direction of the X axis, the downward direction is the positive direction of the Y axis, and the upward direction is the negative direction of the Y axis.

Further, the drawing object management unit 11 controls the area of the object by a rectangle that circumscribes the object. The drawing object management unit 11 sets the pixel position at the upper left corner of the rectangular area as start point coordinates and the pixel position at the lower right corner of the rectangular area as end point coordinates.

It is assumed that intervals between the coordinates on the touch panel are the same as intervals between the coordinates on the display 220, and the coordinates on the touch panel coincide with those on the display 220.

Relationship Between Layer Structure and Display Control Unit

Figure 8:
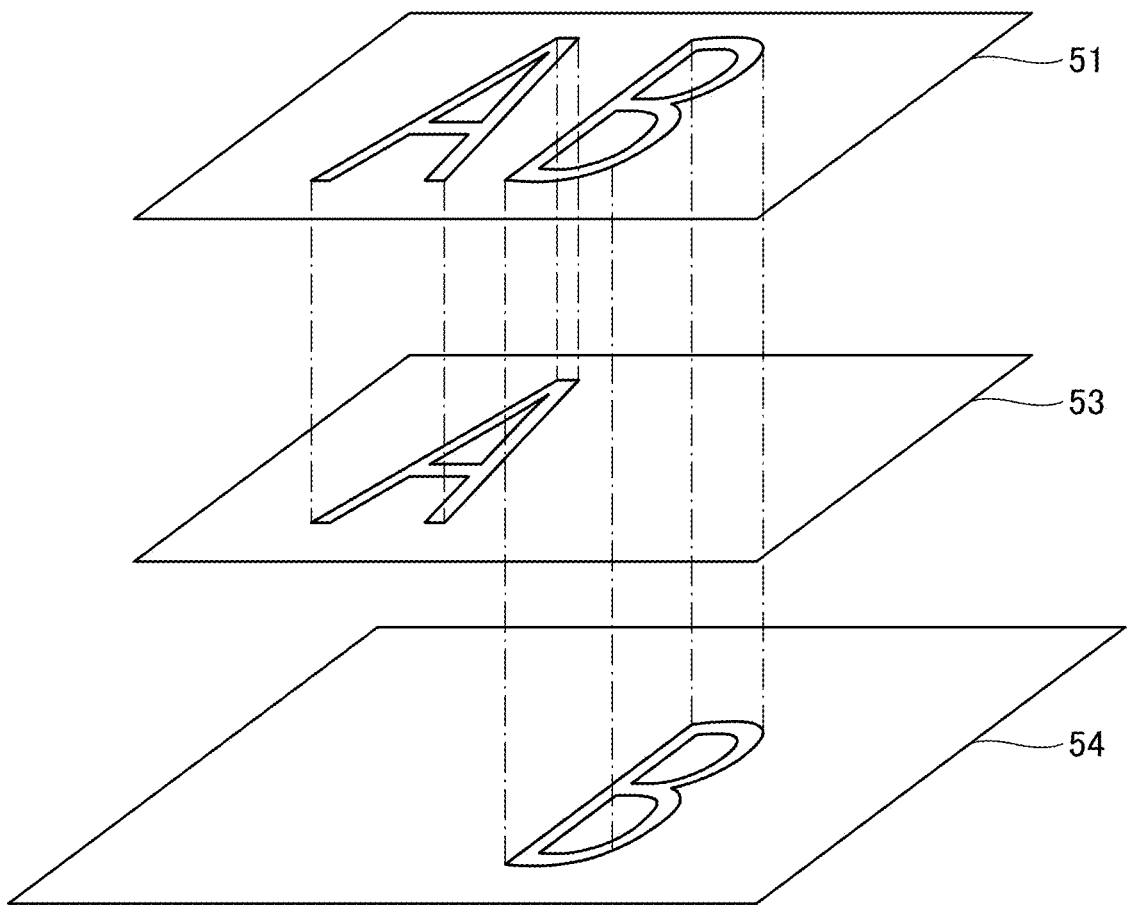
FIG. 8 is a diagram illustrating layers used for display by a display control unit according to one embodiment.

A description is given of the relationship between the layer structure and the display control unit 14 of the display apparatus 2, with reference to FIG. 8. FIG. 8 is a diagram illustrating layers used for display by the display control unit 14. The display control unit 14 displays an object using two layers, namely, the pinning layer 53, and the drawing layer 54.

Both layers are composed of data in which a pixel is expressed in RGB. When an object is generated, the object is added to the drawing layer 54.

The pinning layer 53 is a transparent layer to which an object is pinned, and is always located above the drawing layer 54. Objects in the drawing layer 54 are temporarily copied to the pinning layer 53, but pixels other than the objects are transparent.

The display control unit 14 performs an OR operation on the pixels of the drawing layer 54 and the pinning layer 53 and displays the result on the display 220. That is, the display control unit 14 combines the pixels of the drawing layer 54 and the pinning layer 53 and displays the result. As a simple method, the display control unit 14 may preferentially display the pixels of the pinning layer 53 located on the front side. The size of the drawing layer 54 matches that of the input receiving area 52 provided by the display apparatus 2.

Example of Display Using Pinning Layer

A method of displaying an object using the pinning layer 53 will be described with reference to FIGS. 9A to 9C.

Figure 9A:
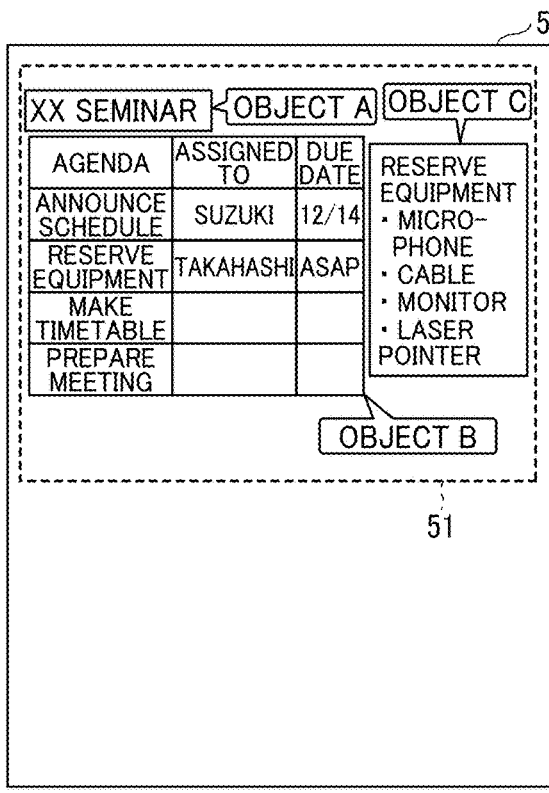
FIGS. 9A to 9C illustrate an example of display of an object pinned (retained) to a pinning layer according to Embodiment 1.
Figure 9B:
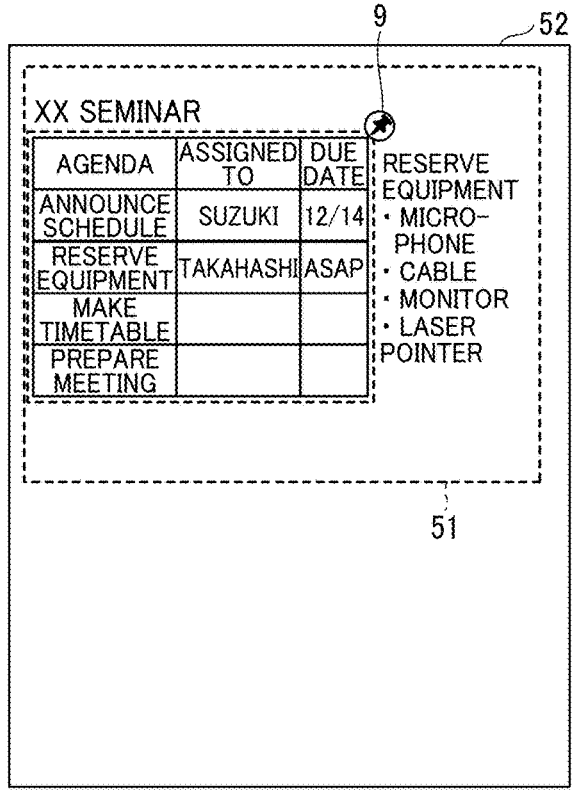
Figure 9C:
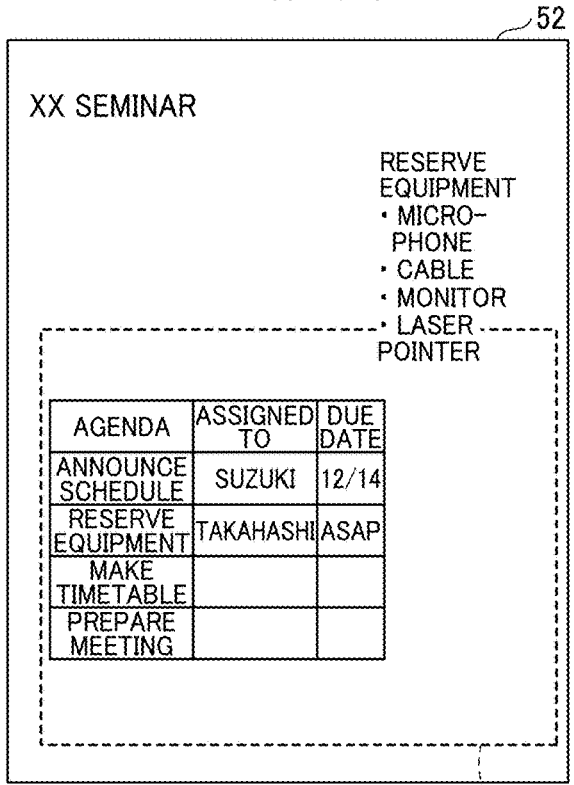

FIGS. 9A to 9C illustrate an example of display of an object pinned to the pinning layer 53.

As illustrated in FIG. 9A, the user handwrites the object A (XX seminar) and the object B (agenda table). In addition, the user handwrites the object C that is the minute memo about a subject "reserve equipment" on the agenda table. The memo includes a list of equipment (microphone, cable, monitor, and laser pointer).

Each of the items "reserve equipment," "microphone," "cable," "monitor," and "laser pointer" of the object C is one object. However, in the present embodiment, these objects are collectively referred to as one object C for convenience of description.

In the present embodiment, the drawing object management unit 11 determines completion of input of one object in response to elapse of a predetermined time from previous input of stroke or in response to detection of a stroke input at a coordinate separated by a predetermined distance or more. The drawing object management unit 11 classifies objects, for example, according to object type. The method of classification is not limited.

Table 1A presents the start point coordinates, the end point coordinates, and the layer attributes of the objects A, B, and C when the upper left corner of the display area 51 is the origin (0,0), the upper left coordinates of the object are the start point coordinates, and the lower right coordinates of the object are the end point coordinates.

TABLE 1A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Drawing layer |
| Object C | (Sxc, Syc) | (Exc, Eyc) | Drawing layer |

TABLE 1B

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Pinning layer |
| Object C | (Sxc, Syc) | (Exc, Eyc) | Drawing layer |

TABLE 1C

| Object ID | Start point coordinates | End point coordinates | Layer attribute |
|---|---|---|---|
| Object A | (Sxa-dx, Sya-dy) | (Exa-dx, Eya-dy) | Drawing layer |
| Object B | (Sxb, Syb) | (Exb, Eyb) | Pinning layer |
| Object C | (Sxc-dx, Syc-dy) | (Exc-dx, Eyc-dy) | Drawing layer |

Table 1A is an example of an object table in which information of objects is registered. The object table is held by the display apparatus 2. The object table may be stored on a network. "Object identifier (ID)" is identification information identifying an object. The start point coordinates and the end point coordinates are as illustrated in FIG. 7. The layer attribute indicates the layer in which the object is located.

The drawing object management unit 11 stores, as one object, strokes input by the user without an elapse of the predetermined time after input of the previous stroke. The drawing object management unit 11 stores, as another object, a stroke input after the elapse of the predetermined time from the input of the previous stroke by the user. In the case of a table object, the drawing object management unit 11 may determine that strokes inside the outer frame of the table is one object.

When the next subject on the agenda table (object B) is discussed, the user performs an operation for clearing the right side of the object B (agenda table) to create a space for writing a note of this subject. First, the user holds down the object B (agenda table).

The drawing object management unit 11 determines which object the contact position overlaps with. Since the contact position is inside the object B (agenda table), the drawing object management unit 11 sets the object B (agenda table) to the selected state and displays the pinning button 9 (an example of a first graphical representation).

FIG. 9B illustrates the object B (agenda table) on which the pinning button 9 is displayed. When the user presses the pinning button 9 with the input device 291, the drawing object management unit 11 copies the pixel data corresponding to the object B (agenda table) in the drawing layer 54 to the pinning layer 53 and deletes the pixel data corresponding to the object B (agenda table) from the drawing layer 54. Table 1B illustrates the start point coordinates and the end point coordinates of the objects A to C in this state.

The user then swipes with the input device 291 from a desired position to another desired position on the display 220. When the swipe detection unit 15 detects a swipe, the display control unit 14 repeats, at set time intervals, a process of subtracting the amount of movement in the x-axis direction of the swipe from the x coordinates of the objects A and C of the drawing layer 54 and the amount of movement in the y-axis direction of the swipe from the y coordinates of the objects A and C.

The display control unit 14 updates the display of the object at set time intervals. When the user stops swiping, the objects A and C in the drawing layer 54 have the start point coordinates (Sxa-dx,Sya-dy) and (Sxc-dx,Syc-dy), respectively.

The display control unit 14 performs an OR operation on pixels of the pinning layer 53 and the drawing layer 54 corresponding to the display area 51 and displays the result on the display 220. Since the object B is in the pinning layer 53, the new display area 51 is displayed in which the coordinates of the object B are not changed (the display position is not changed).

FIG. 9C illustrates the new display area 51 after the objects A and C are moved. In this way, according to the user operation, the display apparatus 2 creates a space on the right side of the object B (agenda table) for writing notes of the next subject of the agenda table (object B). Table 1C illustrates the start point coordinates and the end point coordinates of the objects A to C in the state of FIG. 9C.

A method of ending the pinning, of the object B will be described later.

A description is given below of the operation for display illustrated in FIGS. 9A to 9C, performed by the display apparatus 2.

Figure 10:
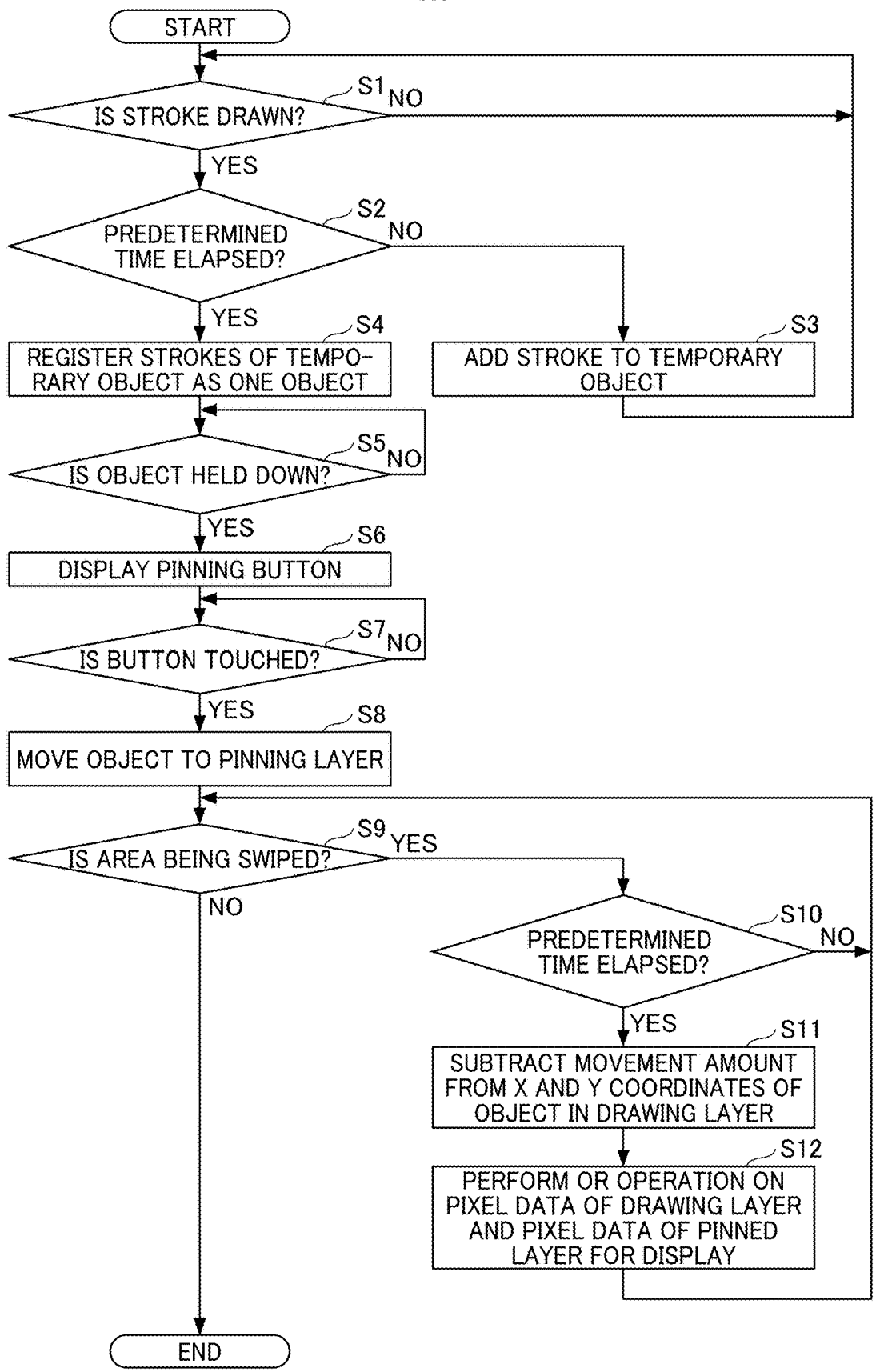
FIG. 10 is a flowchart illustrating an example of a procedure for displaying an object pinned in a display area, performed by the display apparatus according to Embodiment 1.

FIG. 10 is a flowchart illustrating an example of a procedure for displaying an object pinned in the display area 51 (see FIGS. 9A to 9C), performed by the display apparatus 2.

The contact position detection unit 12 determines whether or not a stroke has been drawn (handwritten) (S1).

When the stroke is handwritten (Yes in S1), the drawing object management unit 11 determines whether or not the predetermined time has elapsed from the end of input of the stroke (S2). The drawing object management unit 11 adds the stroke to a temporary object.

The drawing object management unit 11 keeps adding, to the temporary object, a next stroke input before the elapse of the predetermined time from the previous stroke (S3).

When the predetermined time has elapsed from the previous input of stroke, the drawing object management unit 11 determines a plurality of strokes included in the temporary object as one object, and registers the object in an object table (S4).

Next, the drawing object management unit 11 determines whether or not the contact position detection unit 12 has detected holding-down of the object (S5).

When the contact position detection unit 12 has detected holding-down of the object (Yes in S5), the display control unit 14 displays the pinning button 9 adjacent to the object that is held down (S6).

Next, the drawing object management unit 11 determines whether or not the contact position detection unit 12 has detected that the pinning button 9 has been touched (S7).

In response to the detection of the touch (Yes in S7), the drawing object management unit 11 copies the pixel data of the held-down object to the pinning layer 53, and deletes the pixel data thereof from the drawing layer 54 (S8). Thus, the object is moved to the pinning layer 53. The deletion of the pixel data from the drawing layer 54 may be omitted. Alternatively, the drawing object management unit 11 may set the pixel data of the object in the drawing layer 54 to half luminance, to indicate that the object has been copied therefrom.

Next, the drawing object management unit 11 determines whether or not the contact position detection unit 12 has detected a swipe of the display area 51 (S9). The drawing object management unit 11 may detect the swipe made at any position in the display area 51 or detect the swipe on the object in the display area 51.

In the period in which the display area 51 is being swiped, for each predetermined time, (S10), the display control unit 14 repeats a process of subtracting the movement amount (swipe amount) from the x and y coordinates of the object in the drawing layer 54 in the x-axis direction and the y-axis direction, respectively (S11). In this way, in a period of receiving the operation of moving the display area 51, the display control unit 14 retains the object at the position in the display area 51 at the time of receiving the selection of the object.

The display control unit 14 performs an OR operation on the pixel data of the drawing layer 54 and the pixel data of the pinning layer 53, and displays the result on the display 220 (S12).

In response to detection of end of the swipe (when the input device 291 is separated from the display 220), the display apparatus 2 ends the process in FIG. 10. In order to detect the user's operation of separating the input device 291 from the display 220 and again swiping the input device 291, the contact position detection unit 12 may detect the end of the swipe when the contact of the input device 291 is not detected for a certain period of time after the input device 291 is separated from the display 101.

As described above, according to the present embodiment, the display apparatus 2 retains the pinned object in the display area 51 and allows the user to perform handwriting in a new space created around the pinned object.

Embodiment 2

In the present embodiment, the display apparatus 2 allows a user to select an object by enclosing the object with a stroke.

The hardware configuration illustrated in FIG. 5 and the functional configuration illustrated in FIG. 6 of the above-described embodiment are applicable to the present embodiment.

Display Example Using Pinning Layer

Figure 11A:
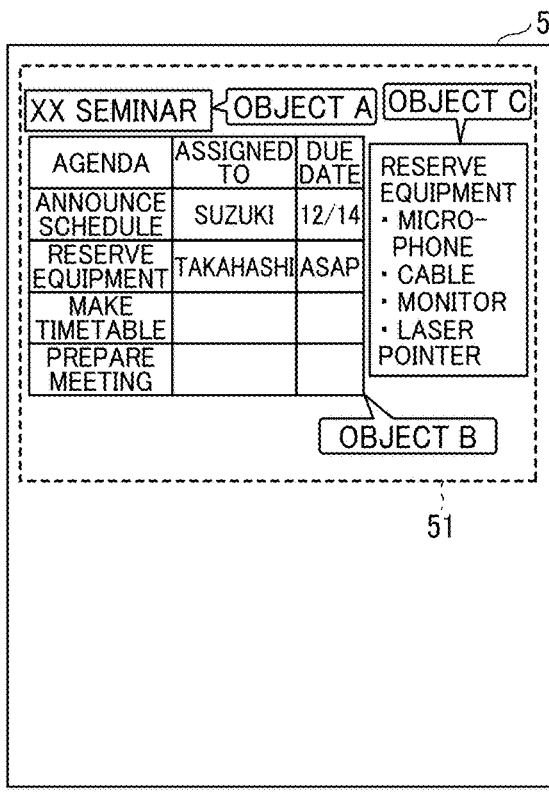
FIGS. 11A to 11C illustrate an example of display of an object pinned to the pinning layer according to Embodiment 2.
Figure 11B:
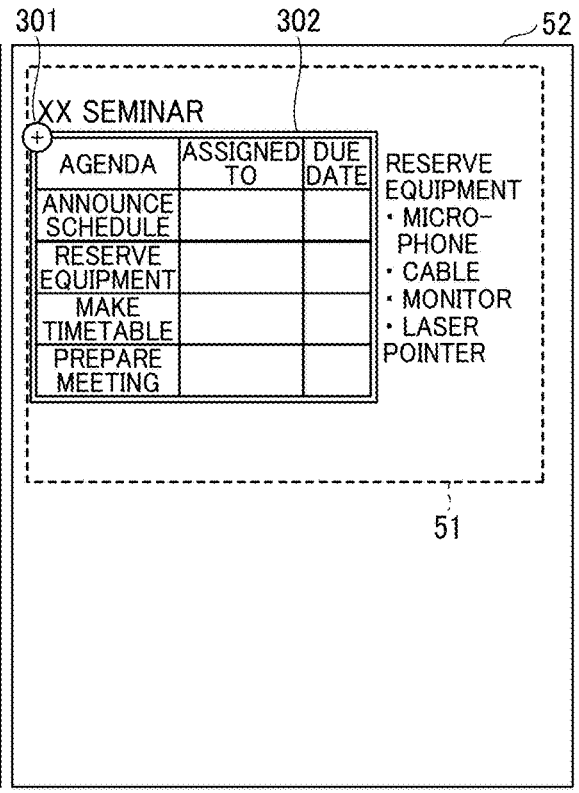
Figure 11C:
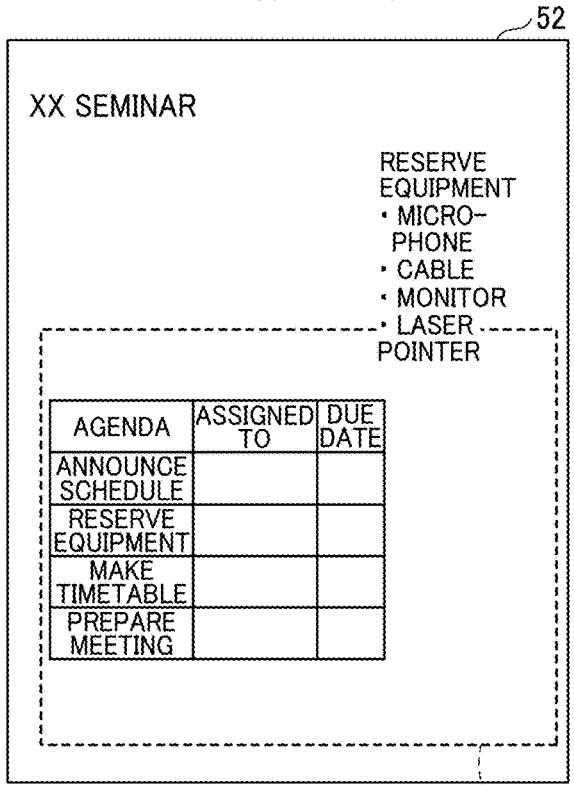

A method of displaying an object using the pinning layer 53 will be described with reference to FIGS. 11A to 11C. FIGS. 11A to 11C illustrate an example of display of an object pinned to the pinning layer 53.

As illustrated in FIG. 11A, the user handwrites the object A (XX seminar), the object B (agenda table), and the object C (memo about "reserve equipment").

Table 2A illustrates the object table in this state.

TABLE 2A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Drawing layer |
| Object C | (Sxc, Syc) | (Exc, Eyc) | Drawing layer |

TABLE 2B

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Pinning layer |
| Object C | (Sxc, Syc) | (Exc, Eyc) | Drawing layer |

TABLE 2C

| Object ID | Start point coordinates | End point coordinates | Layer attribute |
|---|---|---|---|
| Object A | (Sxa-dx, Sya-dy) | (Exa-dx, Eya-dy) | Drawing layer |
| Object B | (Sxb, Syb) | (Exb, Eyb) | Pinning layer |
| Object C | (Sxc-dx, Syc-dy) | (Exc-dx, Eyc-dy) | Drawing layer |

The structure (item names) of the object table in Tables 2A to 2C is the same as that in Tables 1A to 1C.

As illustrated in FIG. 11B, the user draws a pinning mark 301 for pinning (in this case, a symbol "+" enclosed by a circle) and encloses a region to be pinned by a stroke 302. The mark 301 is an example and may be any mark. For example, the symbol recognition unit 17 may recognize a pinning mark by referring to data of pinning marks registered in advance. The pinning mark 301 is an example of a retaining mark.

When the symbol recognition unit 17 determines that the mark handwritten by the user is the pinning mark 301 (in FIG. 11B, a symbol "+" enclosed by a circle), the drawing object management unit 11 monitors the range enclosed by the stroke 302.

The drawing object management unit 11 pins the object B in the area enclosed by the stroke 302 to the pinning layer 53. Specifically, the drawing object management unit 11 copies the pixel data of the object B in the drawing layer 54 to the pinning layer 53 and deletes the pixel data corresponding to the object B from the drawing layer 54. Table 2B illustrates the object table including the objects A, B, and C in the state where the object B is enclosed.

Then, the user swipes the display area 51 (any object or any position therein). The operation of the display apparatus 2 at the time of swiping may be the same as that in Embodiment 1. Table 2C is the object table including the objects A, B, and C in the state after the display area 51 is moved.

FIG. 11C illustrates the display area 51 after the swipe. Since there is no change in the coordinates of the object B, the display apparatus 2 displays a new display area 51 in which the position of the object B is not changed. Table 2C illustrates the state of the object table including the objects A, B, and C after the swipe.

A description is given below of the operation for display illustrated in FIGS. 11A to 11C, performed by the display apparatus 2.

Figure 12:
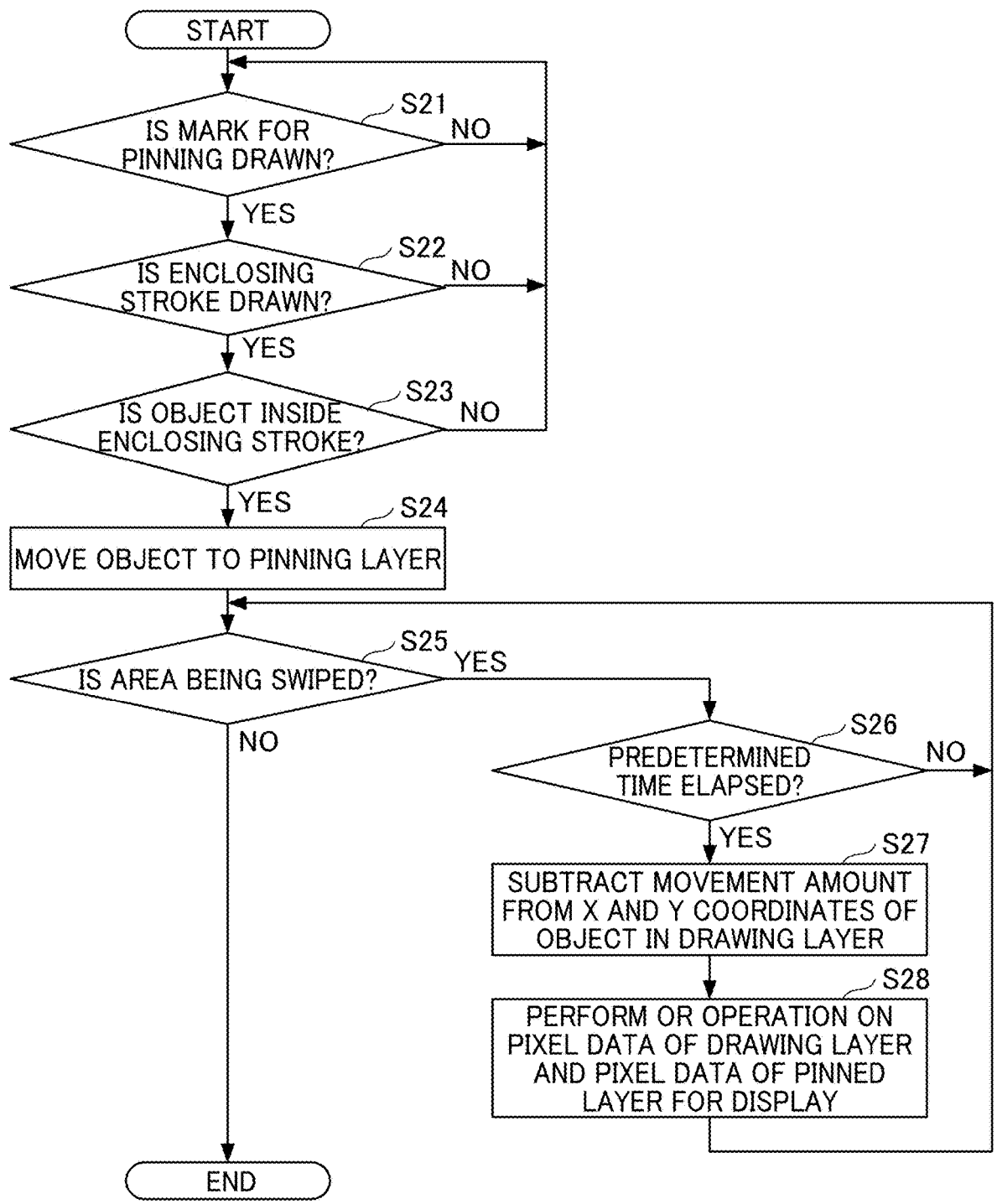
FIG. 12 is a flowchart illustrating an example of a procedure for displaying an object pinned in the display area, performed by the display apparatus according to Embodiment 2.

FIG. 12 is a flowchart illustrating an example of a procedure for displaying an object pinned in the display area 51, performed by the display apparatus 2. In the description referring to FIG. 12, for simplicity, mainly differences from FIG. 10 are described.

The symbol recognition unit 17 determines whether the user has handwritten the pinning mark. 301 based on the stroke data generated by the drawing data generation unit 13 (S21).

In response to a determination that the pinning mark 301 has been handwritten (Yes in S21), the drawing object management unit 11 determines whether an enclosing stroke is input (S22). In response to detecting input of the stroke, the drawing object management unit 11 determines whether there is an object fully included in the rectangle circumscribing the stroke 302 based on the stroke data generated by the drawing data generation unit 13 (S23). Alternatively, in this determination, a portion of the object may protrude from the rectangle circumscribing the stroke 302. The drawing object management unit 11 determines that the object B in the stroke 302 (see FIG. 11B) is to be moved to the pinning layer 53.

The process from S24 to S28 is similar to that from S8 to S12 in FIG. 10.

According to the present embodiment, the display apparatus 2 allows the user to pin the object B by handwriting the pinning mark 301 and a stroke enclosing the object B, and creates a new space while pinning the object B and moving other objects away from the display area 51. The pinning mark 301 illustrated in FIG. 11B is an example, and may be any mark.

Alternatively, the display apparatus 2 may pin the object B to the display area 51 without receiving input of the pinning mark 301, in response to receiving input of a stroke enclosing the object B.

Embodiment 3

In the present embodiment, the display apparatus 2 allows a user to select an object to be pinned by handwriting a predetermined mark on a side of the object.

The hardware configuration illustrated in FIG. 5 and the functional configuration illustrated in FIG. 6 of the above-described embodiment are applicable to the present embodiment.

Display Example Using Pinning Layer

A method of displaying an object using the pinning layer 53 will be described with reference to FIGS. 13A to 13D. FIGS. 13A to 13D illustrate an example of display of an object pinned to the pinning layer 53.

Figure 13A:
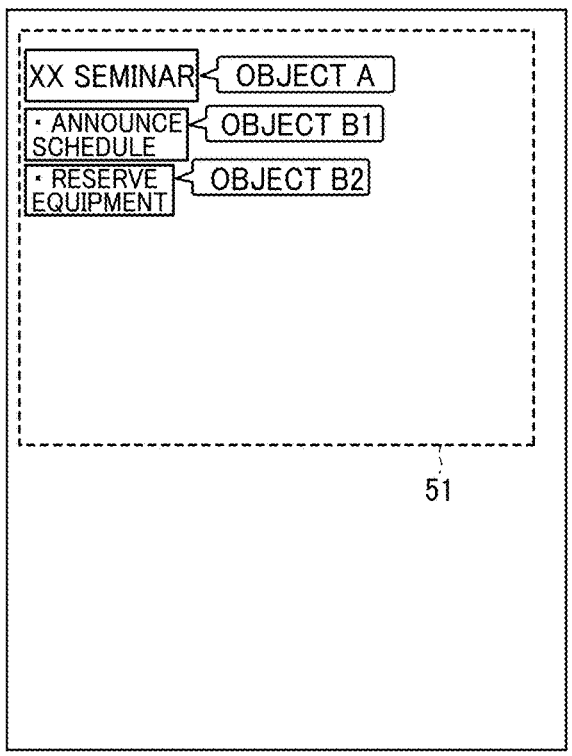
FIGS. 13A to 13D illustrate an example of display of an object pinned to the pinning layer according to Embodiment 3.

As illustrated in FIG. 13A, the user handwrites an object A (XX seminar), an object B1 (announce schedule) that is a subject on the agenda, and an object B2 (reserve equipment) that is another subject on the agenda.

Figure 13B:
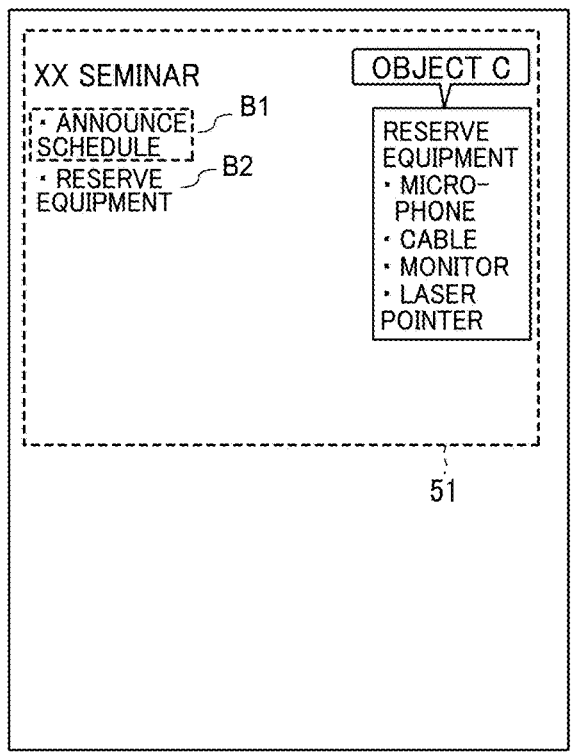

In addition, as illustrated in FIG. 13B, the user handwrites a note about the subject "reserve equipment" and includes the list of equipment (microphone, cable, monitor, and laser pointer). Although each of the "microphone," "cable," "monitor," and "laser pointer" on the list is one object, these are collectively referred to as the object C for convenience of description. Table 3A illustrates the object table at the time when the objects A, B1, B2, and C are handwritten.

TABLE 3A

| Object ID | Start point coordinates | End point coordinates | Layer attribute |
| --- | --- | --- | --- |
| Object A | (Sxa, Sya) | (Exa, Eya) | Drawing layer |

TABLE 3A-continued

| Object ID | Start point coordinates | End point coordinates | Layer attribute |
| --- | --- | --- | --- |
| Object B1 | (Sxb1, Syb1) | (Exb1, Eyb1) | Drawing layer |
| Object B2 | (Sxb2, Syb2) | (Ex b2, Ey b2) | Drawing layer |
| Object C | (Sxc, Syc) | (Exc, Eyc) | Drawing layer |

TABLE 3B

| Object ID | Start point coordinates | End point coordinates | Layer attribute |
| --- | --- | --- | --- |
| Object A | (Sxa, Sya) | (Exa, Eya) | Drawing layer |
| Object B1 | (Sxb1, Syb1) | (Exb1, Eyb1) | Pinning layer |
| Object B2 | (Sxb2, Syb2) | (Exb2, Eyb2) | Drawing layer |
| Object C | (Sxc, Syc) | (Exc, Eyc) | Drawing layer |

TABLE 3C

| Object ID | Start point coordinates | End point coordinates | Layer attribute |
| --- | --- | --- | --- |
| Object A | (Sxa-dx, Sya-dy) | (Exa-dx, Eya-dy) | Drawing layer |
| Object B1 | (Sxb1, Syb1) | (Exb1, Eyb1) | Pinning layer |
| Object B2 | (Sxb2-dx, Sy b2-dy) | (Ex b2-dx, Ey b2-dy) | Drawing layer |
| Object C | (Sxc-dx, Syc-dy) | (Exc-dy, Eyc-dy) | Drawing layer |

The structure (item names) of the object table in Tables 3A to 3C is the same as that in Tables 1A to 2C.

Figure 13C:
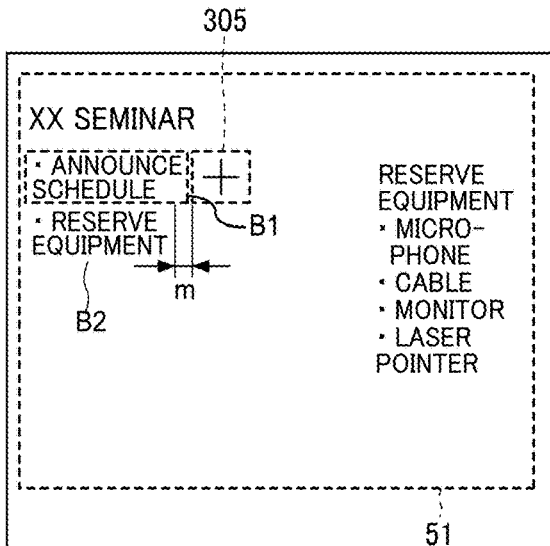

Next, as illustrated in FIG. 13C, the user handwrites a pinning mark 305 ("+" mark in FIG. 13C) next to the object B1 (announce schedule) to be pinned. The pinning mark 305 illustrated in FIG. 13C is an example, and may be any mark.

The drawing object management unit 11 determines whether or not there is another object within a threshold distance (a distance m) from the pinning mark 305. For example, assume that the object B1 (announce schedule) and the object B2 (reserve equipment) are within the distance m from the pinning mark 305. In this case, the drawing object management unit 11 sets the object B1 (announce schedule) and the object B2 (reserve equipment) to selected states so as to receive the user selection of the object to be pinned by holding down of the object B1 or B2 with the input device 291.

Alternatively, the drawing object management unit 11 may determine the distance m from the pinning mark 305 only in the horizontal direction and identify the object B1 in this example.

When the symbol recognition unit 17 determines that the mark handwritten by the user is the pinning mark 305 (e.g., "+" enclosed by a circle), the drawing object management unit 11 copies the pixel data corresponding to the object B1 in the drawing layer 54 to the pinning layer 53, and deletes the pixel data corresponding to the object B1 from the drawing layer 54. Table 3B illustrates the object table including the objects A to C when the handwritten mark is determined as the pinning mark 305.

Then, the user swipes the display area 51 (any object or any position therein). The operation of the display apparatus 2 at the time of swiping may be the same as that in Embodiment 1. Table 3C illustrates the object table including the objects A to C in the state after the display area 51 is moved.

Figure 13D:
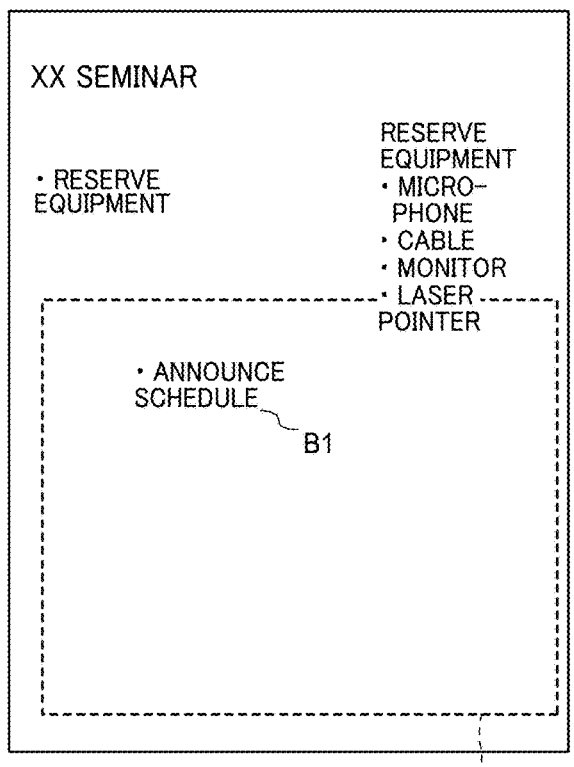

FIG. 13D illustrates the display area 51 after the swipe. Since there is no change in the coordinates of the object B1, the display apparatus 2 displays a new display area 51 in which the position of the object B is not changed.

A description is given below of the operation for display illustrated in FIGS. 13A to 13D, performed by the display apparatus 2.

Figure 14:
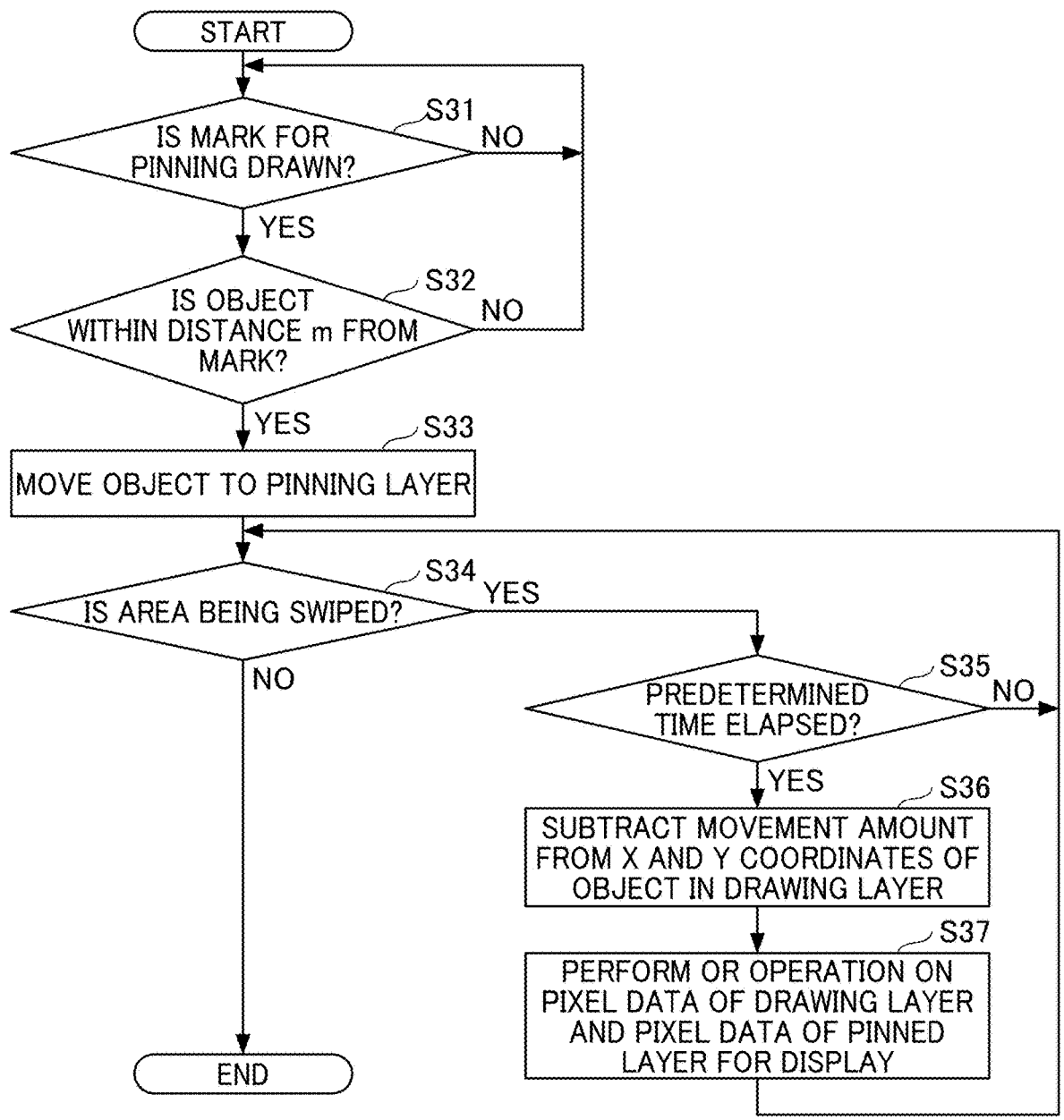
FIG. 14 is a flowchart illustrating an example of a procedure for displaying an object pinned in the display area, performed by the display apparatus according to Embodiment 3.

FIG. 14 is a flowchart illustrating an example of a procedure for displaying an object pinned in the display area 51, performed by the display apparatus 2. In the description referring to FIG. 14, for simplicity, mainly differences from FIG. 10 are described.

The symbol recognition unit 17 determines whether the user has handwritten the pinning mark 305 based on the stroke data generated by the drawing data generation unit 13 (S31).

In response to a determination that the pinning mark 305 has been handwritten, the drawing object management unit 11 determines whether or not there is an object within the distance m from the pinning mark 305 (S32). The drawing object management unit 11 compares, with the distance m, the distance between the circumscribed rectangle of the pinning mark 305 and a part of the circumscribed rectangle of the object closest thereto. The drawing object management unit 11 determines that the object within the distance m from the pinning mark 305 is to be pinned.

The process from S33 to S37 is similar to that from S8 to S12 in FIG. 10.

According to the present embodiment, the display apparatus 2 allows the user to pin the object B1 by handwriting the pinning mark 305, and creates a new space while pinning the object B and moving other objects from the display area 51.

Embodiment 4

In the present embodiment, the display apparatus 2 allows a user to pin an object by operating an operation menu.

The hardware configuration illustrated in FIG. 5 and the functional configuration illustrated in FIG. 6 of the above-described embodiment are applicable to the present embodiment.

Menu Layer

In the present embodiment, the display apparatus 2 provides an operation menu including the pinning button 9 and allows the user to pin the object by pressing the pinning button 9.

Figure 15:
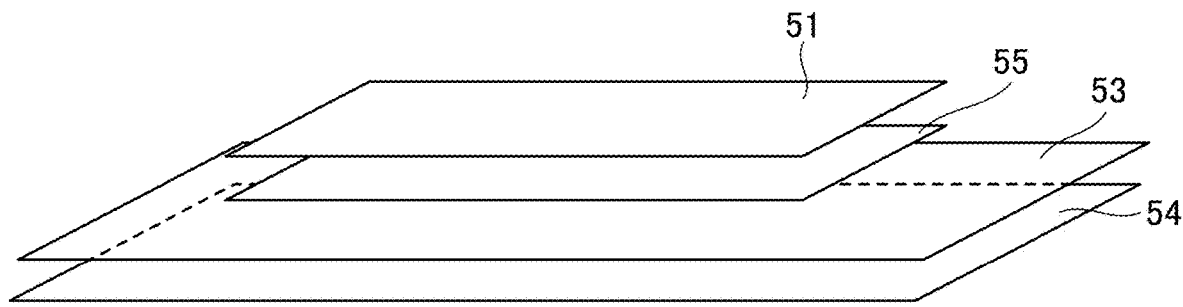
FIG. 15 is a diagram illustrating a menu layer.

A description is given of a menu layer 55 with reference to FIG. 15. The menu layer 55 expresses one pixel in RGB. The menu layer 55 is a layer including buttons, icons, and the like for selecting functions, and is always located above the pinning layer 53. The size of the menu layer 55 matches that of the display area 51.

The display control unit 14 performs an OR operation on the pixels of the drawing layer 54 and the pinning layer 53, replace the value of the pixel in the menu layer 55 that is not transparent with the value obtained by the OR operation, and displays the result on the display 220. That is, the display control unit 14 displays the menu layer 55 as the top layer.

Display Example Using Pinning Layer

Figure 16A:
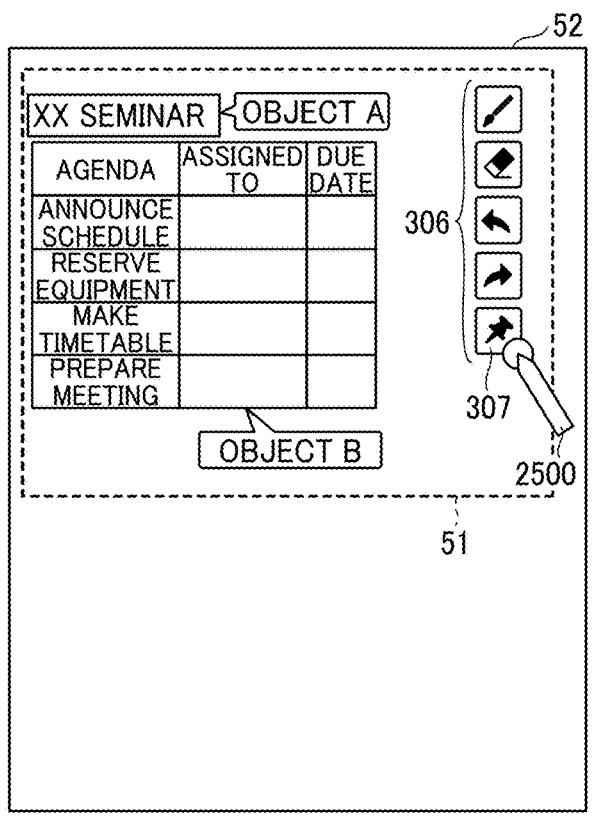
FIGS. 16A to 16C illustrate an example of display of an object pinned to the pinning layer by pressing of a pinning button, according to Embodiment 4.
Figure 16B:
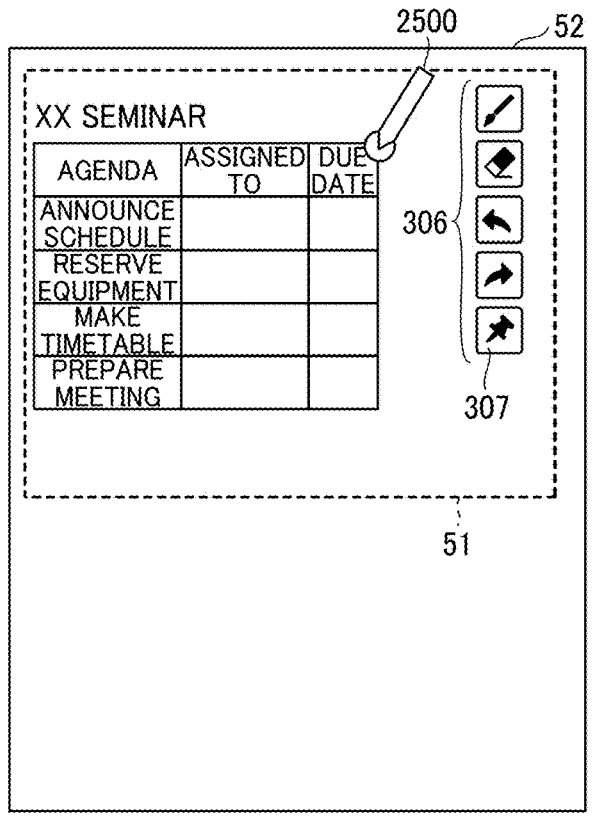
Figure 16C:
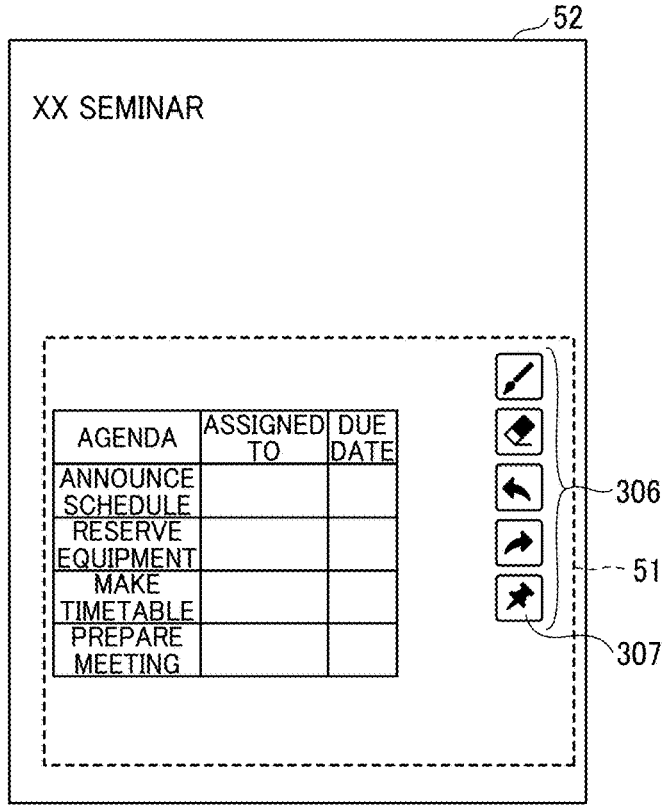

A method of displaying an object using the pinning layer 53 will be described with reference to FIGS. 16A to 16C. FIGS. 16A to 16C illustrate an example of display of an object pinned to the pinning layer 53 by pressing of a pinning icon 307.

As illustrated in FIG. 16A, the user handwrites the object A (XX seminar) and the object B (agenda table). In a right portion of the display area 51, an operation menu 306 for receiving selection of various functions is displayed. The operation menu 306 is in the menu layer 55. The operations menu 306 includes, for example, icons of pen input, eraser, return, and advance; and the pinning icon 307. The pinning icon 307 is an icon for pinning an object. Table 4A illustrates the object table at the time when the objects A and B are handwritten.

TABLE 4A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Drawing layer |

TABLE 4B

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Pinning layer |

TABLE 40

| Object ID | Start point coordinates | End point coordinates | Layer attribute |
|---|---|---|---|
| Object A | (Sxa-dx, Sya-dy) | (Exa-dx, Eya-dy) | Drawing layer |
| Object B | (Sxb, Syb) | (Exb, Eyb) | Pinning layer |

The structure (item names) of the object table in Tables 4A to 4C is the same as that in Tables 1A to 3C.

As illustrated in FIG. 16B, the user presses the pinning icon 307 of the operation menu 306. In response to this, the drawing object management unit 11 enters a selection mode and waits for the selection of an object by the user. For example, in response to detecting the user's pressing the object B (agenda table) using the input device 291, the drawing object management unit 11 determines that the object B (agenda table) is selected to be pinned.

The drawing object management unit 11 copies the pixel data corresponding to the object B (agenda table) in the drawing layer 54 to the pinning layer 53 and deletes the pixel data corresponding to the object B (agenda table) from the drawing layer 54. Table 4B illustrates the object table including the objects A and B in the state where the object B is selected by the user.

Then, the user swipes the display area 51 (any object or any position therein). The operation of the display apparatus 2 at the time of swiping may be the same as that in Embodiment 1. Table 4C illustrates the object table including the objects A and B in the state after the display area 51 is moved.

FIG. 16C illustrates the display area 51 after the swipe. Since there is no change in the coordinates of the object B, the display apparatus 2 displays a new display area 51 in which the position of the object B is not changed. In addition, since the operation menu 306 is pinned to the display area 51, the operation menu 306 is displayed at the same position.

A description is given below of the operation for display illustrated in FIGS. 16A to 16C, performed by the display apparatus 2.

Figure 17:
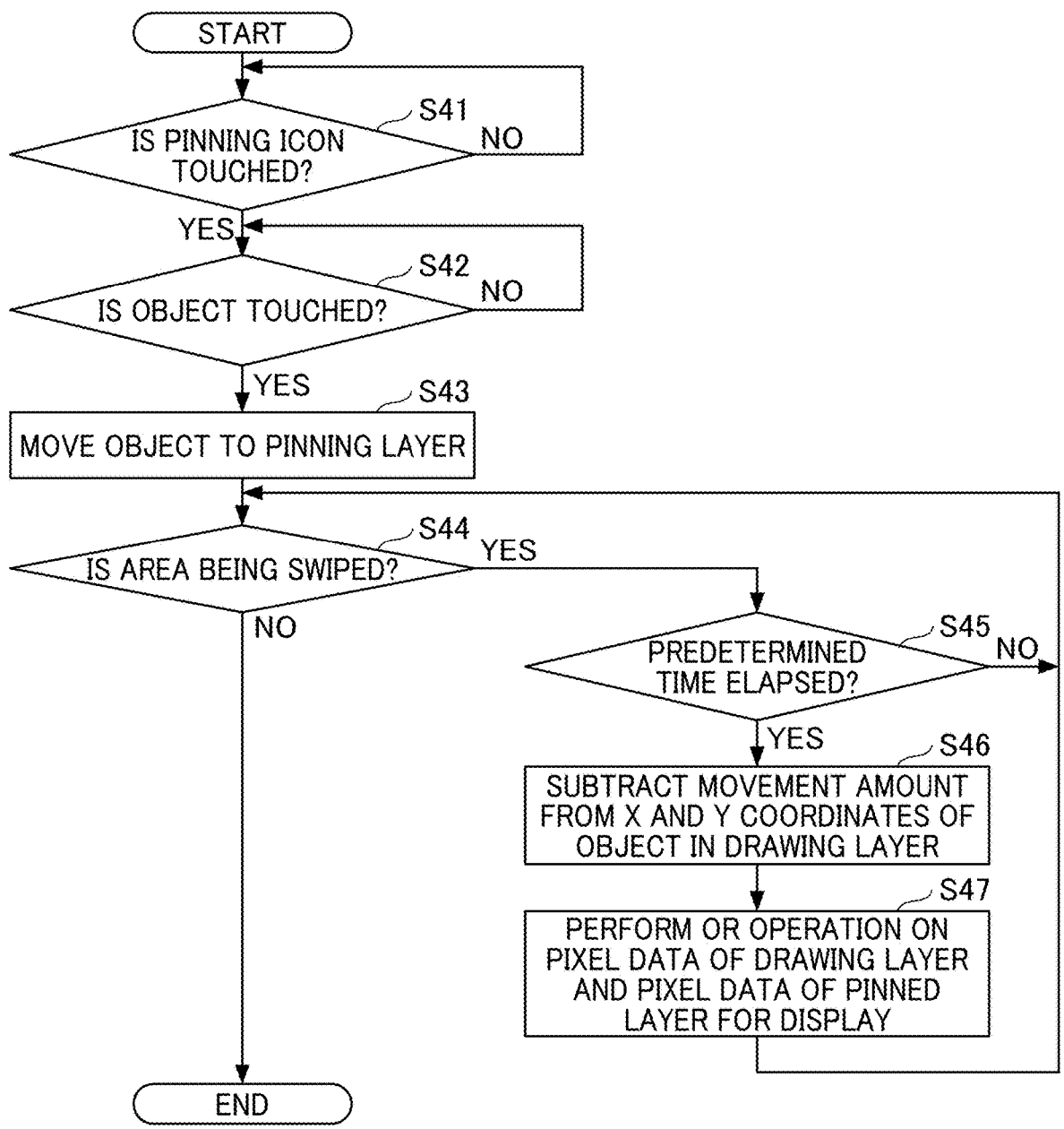
FIG. 17 is a flowchart illustrating an example of a procedure for displaying an object pinned in the display area, performed by the display apparatus according to Embodiment 4.

FIG. 17 is a flowchart illustrating an example of a procedure for displaying an object pinned in the display area 51, performed by the display apparatus 2. In the description referring to FIG. 17, for simplicity, mainly differences from FIG. 10 are described.

The contact position detection unit 12 determines whether or not the user has touched (or pressed) the pinning icon 307 based on the contact position of the input device 291 (S41).

The drawing object management unit 11 determines whether or not an object is touched based on the contact position of the input device 291 (e.g., the electronic pen 2500) detected by the contact position detection unit 12 (S42). The drawing object management unit 11 determines that the object touched is to be moved to the pinning layer 53.

The process from S43 to S47 is similar to that from S8 to S12 in FIG. 10.

According to the present embodiment, the display apparatus 2 allows the user to select the object by pressing the pinning icon 307, and create a new space while pinning the selected object B and moving other objects.

Embodiment 5

In the present embodiment, the display apparatus 2 allows the user to pin an object by operating the operation menu 306 and enclosing the object with a stroke.

The hardware configuration illustrated in FIG. 5 and the functional configuration illustrated in FIG. 6 of the above-described embodiment are applicable to the present embodiment. The menu layer 55 is also similar to that of Embodiment 4.

Display Example Using Pinning Layer

Figure 18A:
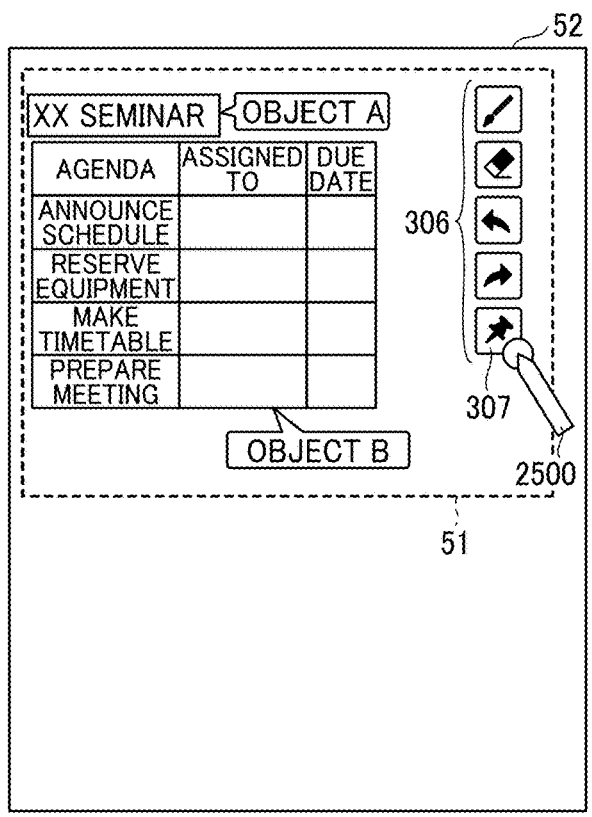
FIGS. 18A to 18C illustrate an example of display of an object pinned to the pinning layer by being enclosed by a stroke, according to Embodiment 5.
Figure 18B:
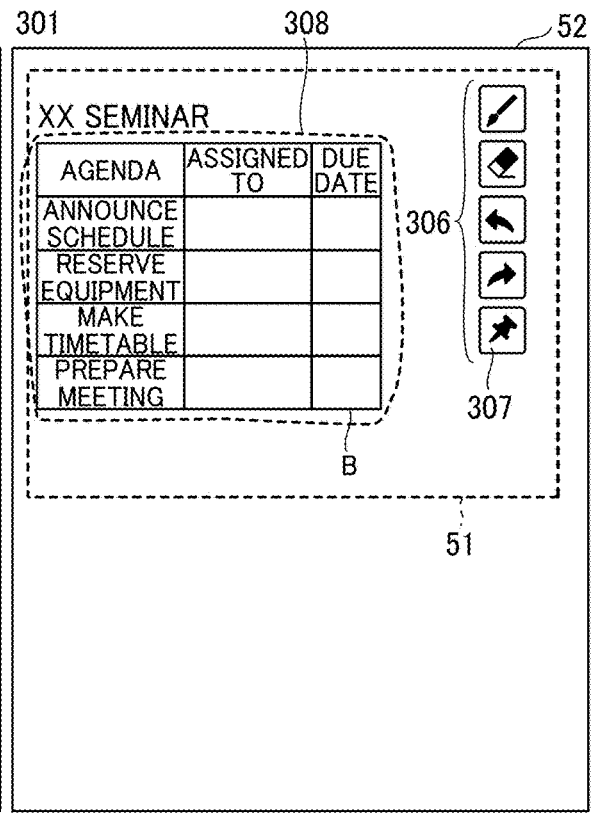
Figure 18C:
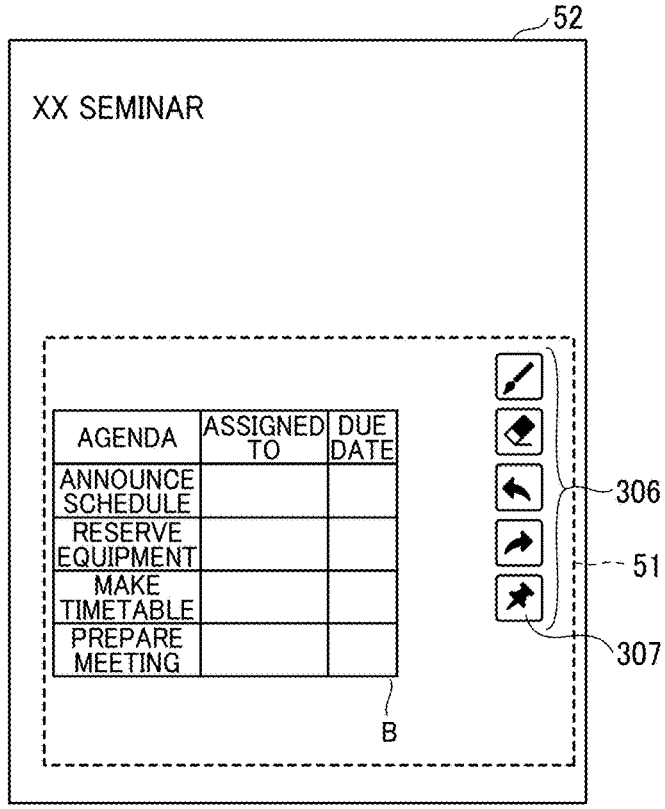

A method of displaying an object using the pinning layer 53 will be described with reference to FIGS. 18A to 18C. FIGS. 18A to 18C illustrate an example of display of an object pinned to the pinning layer 53 by being enclosed by a stroke 308.

As illustrated in FIG. 18A, the user handwrites the object A (XX seminar) and the object B (agenda table). In a right portion of the display area 51, the operation menu 306 for receiving selection of various functions is displayed. The operations menu 306 includes, for example, icons of pen input, eraser, return, and advance; and the pinning icon 307. The pinning icon 307 is an icon for pinning an object. Table 5A illustrates the object table at the time when the objects A and B are handwritten.

TABLE 5A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Drawing layer |

TABLE 5B

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Pinning layer |

TABLE 5C

| Object ID | Start point coordinates | End point coordinates | Layer attribute |
|---|---|---|---|
| Object A | (Sxa-dx, Sya-dy) | (Exa-dx, Eya-dy) | Drawing layer |
| Object B | (Sxb, Syb) | (Exb, Eyb) | Pinning layer |

The structure (item names) of the object table in Tables 5A to 5C is the same as that in Tables 1A to 4C.

As illustrated in FIG. 18B, the user presses the pinning icon 307 of the operation menu 306. In response to this, the drawing object management unit 11 enters a selection mode and waits for the selection of an object by the user. For example, when the user encloses the object B (agenda table) with the stroke 308, the drawing object management unit 11 determines that the object B (agenda table) is to be pinned.

The drawing object management unit 11 copies the pixel data corresponding to the object B (agenda table) in the drawing layer 54 to the pinning layer 53 and deletes the pixel data corresponding to the object B (agenda table) from the drawing layer 54. Table 5B illustrates the object table including the objects A and B in the state where the object B is selected by the user.

Then, the user swipes the display area 51 (any object or any position therein). The operation of the display apparatus 2 at the time of swiping may be the same as that in Embodiment 1. Table 5C illustrates the object table including the objects A and B in the state after the display area 51 is moved.

FIG. 18C illustrates the display area 51 after the swipe. Since there is no change in the coordinates of the object B, the display apparatus 2 displays a new display area 51 in which the position of the object B is not changed. In addition, since the operation menu 306 is pinned to the display area 51, the operation menu 306 is displayed at the same position.

A description is given below of the operation for display illustrated in FIGS. 18A to 18C, performed by the display apparatus 2.

Figure 19:
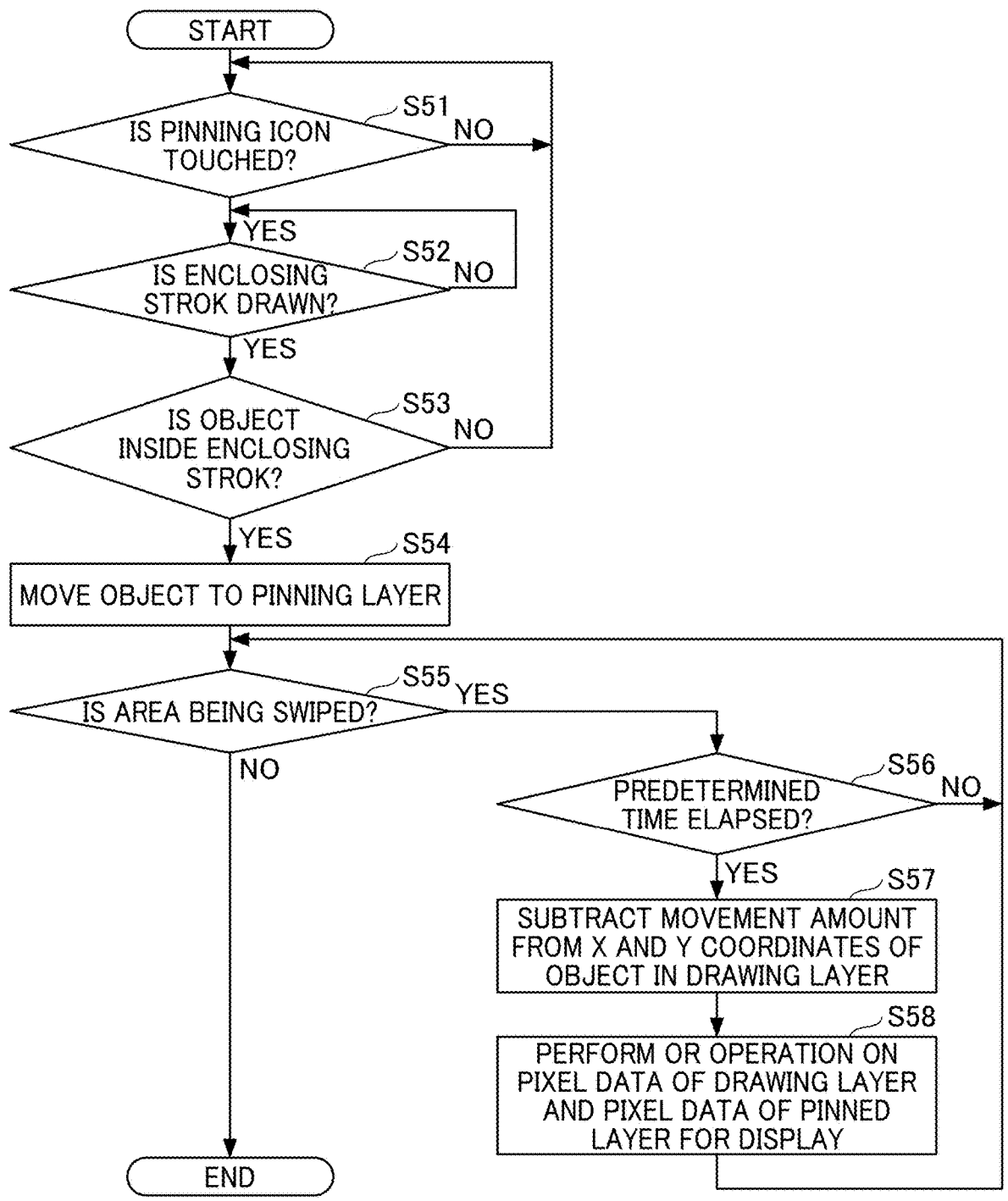
FIG. 19 is a flowchart illustrating an example of a procedure for displaying an object pinned in the display area, performed by the display apparatus according to Embodiment 5.

FIG. 19 is a flowchart illustrating an example of a procedure for displaying an object pinned in the display area 51, performed by the display apparatus 2. In the description referring to FIG. 19, for simplicity, mainly differences from FIG. 10 are described.

The contact position detection unit 12 determines whether or not the user has touched (or pressed) the pinning icon 307 based on the contact position of the input device 291 (S51).

In response to a determination that the pinning icon 307 has been touched or pressed (Yes in S51), the drawing object management unit 11 determines whether or not there is an object fully included in the circumscribed rectangle of the stroke 308 based on the stroke data generated by the drawing data generation unit 13 (S52 and S53). Alternatively, in this determination, a portion of the object may protrude from the rectangle of the stroke 308.

The process from S54 to S58 is similar to that from S8 to S12 in FIG. 10.

According to the present embodiment, the display apparatus 2 allows the user to select the object to be pinned by pressing the pinning icon 307 and enclosing the object with the stroke 308, and create a new space while pinning the selected object B and moving other objects.

Embodiment 6

In the present embodiment, the end of pinning of an object will be described.

The hardware configuration illustrated in FIG. 5 and the functional configuration illustrated in FIG. 6 of the above-described embodiment are applicable to the present embodiment.

Display Example at End of Pinning

Figure 20A:
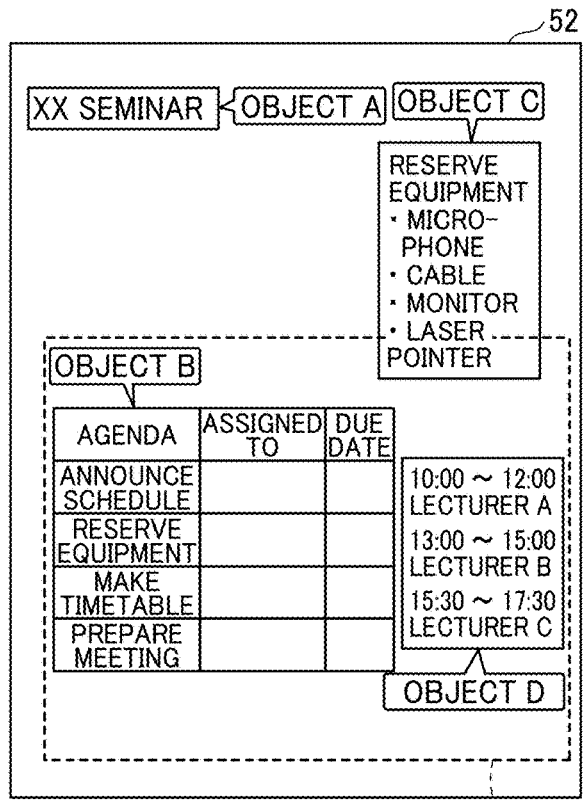
FIGS. 20A to 20C illustrate an example of display of an object at the end of pinning.
Figure 20B:
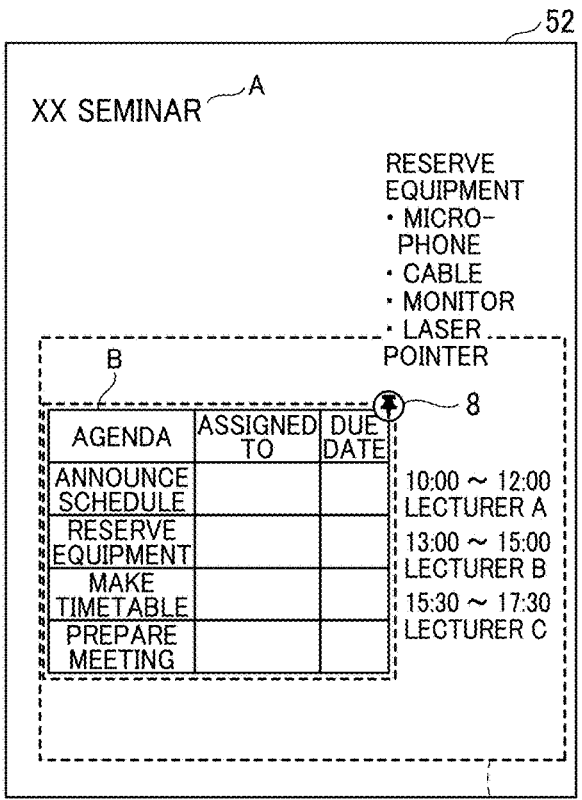
Figure 20C:
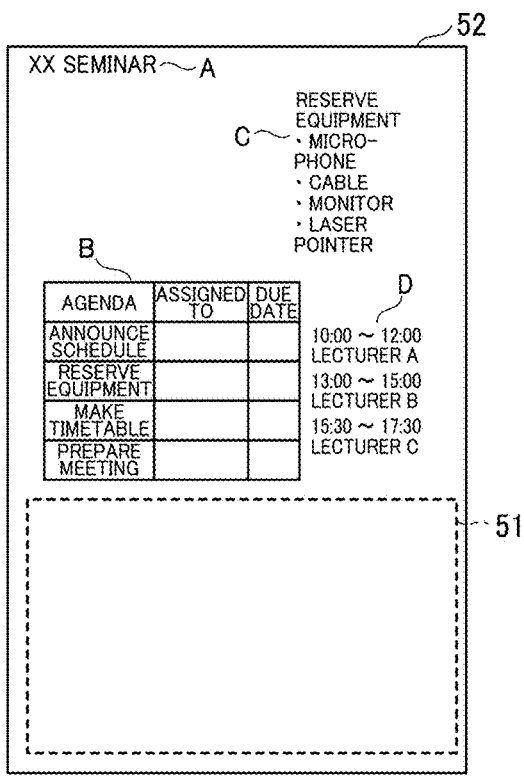

FIGS. 20A to 20C illustrate an example of display of an object at the end of pinning. FIG. 20A illustrates a state in which the objects A to C are arranged as illustrated in FIG. 9C and the user has handwritten an object D (timetable) in a space in the display area 51. Each of the times "10:00 to 12:00 lecturer A," "13:00 to 15:00 lecturer B," and "15:30 to 17:30 lecturer C" of the object D is one object. However, in the present embodiment, these objects are collectively referred to as one object D for convenience of description. Table 6A illustrates the object table including the objects A to D at the time when the object D is added.

TABLE 6A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Pinning layer |
| Object C | (Sxc, Syc) | (Exc, Eyc) | Drawing layer |
| Object D | (Sxd, Syd) | (Exd, Eyd) | Drawing layer |

TABLE 6B

| Object ID | Start point coordinates | End point coordinates | Layer attribute |
|---|---|---|---|
| Object A | (Sxa-dx, Sya-dy) | (Exa-dx, Eya-dy) | Drawing layer |
| Object B | (Sxb-dx, Syb-dx) | (Exb-dx, Eyb-dx) | Drawing layer |
| Object C | (Sxc-dx, Syc-dy) | (Exc-dx, Eyc-dy) | Drawing layer |
| Object D | (Sxd-dx, Syd-dy) | (Exd-dx, Eyd-dy) | Drawing layer |

The structure (item names) and the object table in Tables 6A to 6B is the same as that in Tables 1A to 5C.

Assume that, when the next subject on the agenda table (object B) is discussed, the user draws a layout of the facility where the XX seminar is to be held. Since the remaining space of the display area 51 is insufficient, the user wants to move the pinned object B outside the display area 51.

Therefore, for cancelling the pinning, as illustrated in FIG. 20B, the drawing object management unit 11 displays a pinning cancel button 8 when the user holds down a portion of the pinned object. B. The pinning cancel button 8 is an example of second display component (an example of graphical representation for releasing). When the user presses the pinning cancel button 8 with the input device 291, the drawing object management unit 11 copies the pixel data corresponding to the object B in the pinning layer 53 to the drawing layer 54 and deletes the pixel data corresponding to the object B from the pinning layer 53.

Subsequently, when the user swipes the display area 51 leftward by a distance dx and upward by a distance dy, the display control unit 14 subtracts the amounts corresponding to the distances dx and dy from x coordinates and y coordinates of the objects A to D, respectively. As a result, the objects A to D disappear from the display area 51 as illustrated in FIG. 20C. Table 6B illustrates the object table including the objects A to D in the state after the display area 51 is moved.

A description is given below of the operation for display illustrated in FIGS. 20A to 20C, performed by the display apparatus 2.

Figure 21:
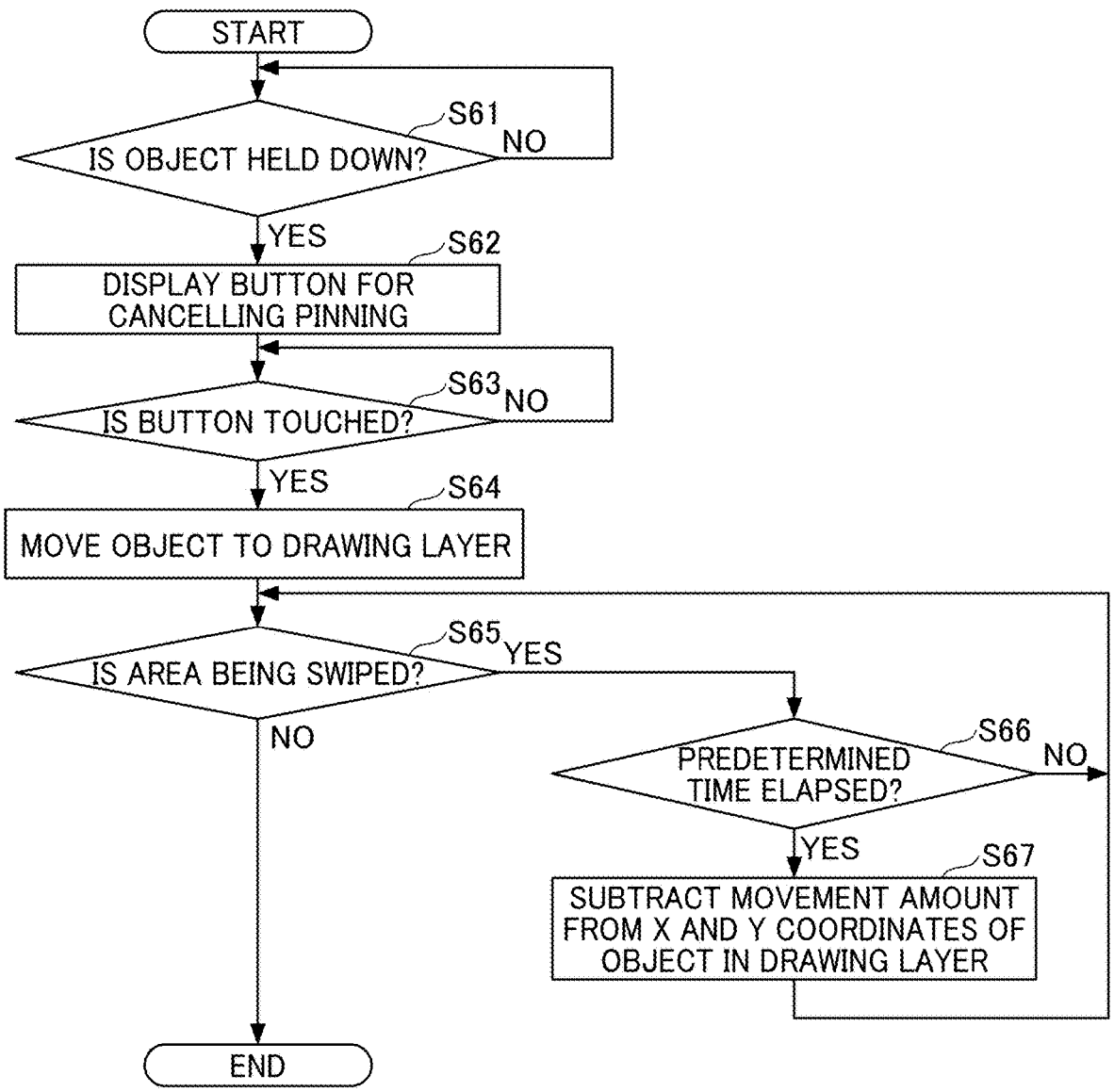
FIG. 21 is a flowchart illustrating an example of a procedure for releasing an object from the display area, performed by the display apparatus according to Embodiment 6.

FIG. 21 is a flowchart illustrating an example of a procedure for releasing an object from the display area 51, performed by the display apparatus 2. In the description referring to FIG. 21, for simplicity, mainly differences from FIG. 10 are described.

The drawing object management unit 11 determines whether or not an object (e.g., the object B in FIG. 20A) in the pinning layer 53 has been held down based on the contact position of the input device 291 detected by the contact position detection unit 12 (S61).

When the object in the pinning layer 53 is held down, the display control unit 14 displays the pinning cancel button 8 (see FIG. 20B) adjacent to the selected object (S62).

The drawing object management unit 11 determines whether or not the pinning cancel button 8 is pressed based on the contact position of the input device 291 (e.g., the electronic pen 2500) detected by the contact position detection unit 12 (S63).

When the pinning cancel button 8 is pressed (Yes in S63), the drawing object management unit 11 moves the object from the pinning layer 53 to the drawing layer 54 (S64).

Further, the drawing object management unit 11 deletes the pixel data corresponding to the object from the pinning layer 53.

The process from S65 to S67 is similar to that from S9 to S11 in FIG. 10.

According to the present embodiment, the display apparatus 2 allows the user to release the pinned object from the display area 51 and displays the display area 51 without the object.

Embodiment 7

In the present embodiment, the display apparatus 2 allows the user to move a pinned object with a simple operation and then move the display area 51.

The hardware configuration illustrated in FIG. 5 and the functional configuration illustrated in FIG. 6 of the above-described embodiment are applicable to the present embodiment.

Display Example Using Pinning Layer

A method of displaying an object using the pinning layer 53 will be described with reference to FIGS. 22A to 22E. FIGS. 22A to 22E illustrate an example of display of an object pinned to the pinning layer 53.

Figure 22A:
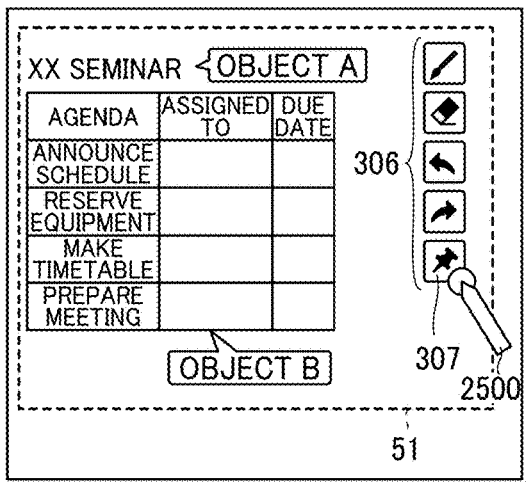
FIGS. 22A to 22E illustrate an example of display of an object pinned to the pinning layer, according to Embodiment 7.

As illustrated in FIG. 22A, the user handwrites the object A (XX seminar) and the object B (agenda table). In a right portion of the display area 220, the operation menu 306 for receiving selection of various functions is displayed.

Table 7A presents the start point coordinates, the end point coordinates and the layer attributes of the objects A and B when the upper left corner of the display area 51 is the origin (0,0), the upper left coordinates of the object are the start point coordinates, and the lower right coordinates of the object are the end point coordinates.

TABLE 7A

| Object ID | Start point coordinates | End point coordinates | Layer attribute |
|---|---|---|---|
| Object A | (Sxa, Sya) | (Exa, Eya) | Drawing Layer |
| Object B | (Sxb, Syb) | (Exb, Eyb) | Drawing layer |

TABLE 7B

| Object ID | Start point coordinates | End point coordinates | Layer attribute |
|---|---|---|---|
| Object A | (Sxa,Sya) | (Exa,Eya) | Drawing layer |
| Object B | $\left(Px - \frac{\|Sxb-Exb\|}{2}, Py - \frac{\|Syb-Eyb\|}{2}\right)$ | $\left(Px + \frac{\|Sxb-Exb\|}{2}, Py + \frac{\|Syb-Eyb\|}{2}\right)$ | Pinning layer |

TABLE 7C

| Object ID | Start point coordinates | End point coordinates | Layer attribute |
|---|---|---|---|
| Object A | (Sxa-dx,Sya-dy) | (Exa-dx,Eya-dy) | Drawing layer |
| Object B | $\left(Px - \frac{\|Sxb-Exb\|}{2}, Py - \frac{\|Syb-Eyb\|}{2}\right)$ | $\left(Px + \frac{\|Sxb-Exb\|}{2}, Py + \frac{\|Syb-Eyb\|}{2}\right)$ | Pinning layer |

Figure 22B:
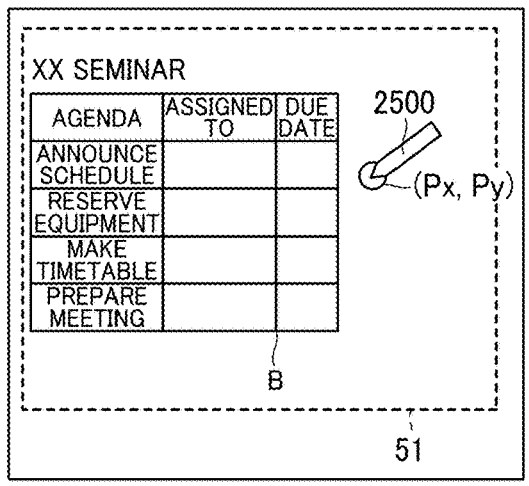

When the user presses the pinning icon 307 for pinning an object from the operation menu 306, the display apparatus 2 transitions to a pinning mode. The pinning mode is an operation mode in which the display apparatus 2 pins an object to the pinning layer 53 so as to be movable. Subsequently, as illustrated in FIG. 22B, the user presses a desired position (Px,Py) on the display 220 using the input device 291. The display control unit 14 displays the pinning button 9 at the pressed position (FIG. 22C).

Figure 22C:
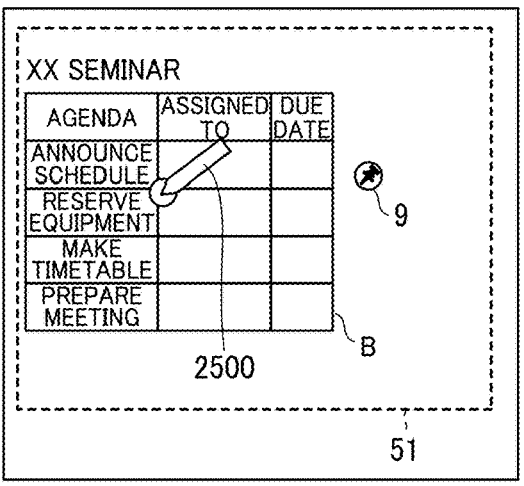
Figure 22D:
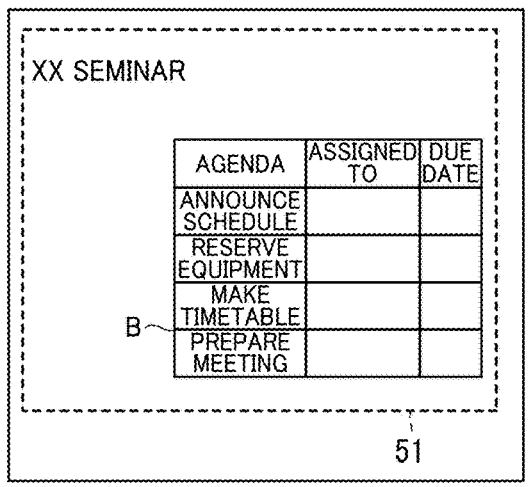

Subsequently, as illustrated in FIG. 22C, the user presses a desired position of the object B (agenda table) using the input device 291. The drawing object management unit 11 copies the pixel data corresponding to the object B from the drawing layer 54 to the pinning layer 53 such that, for example, the center coordinates of the object B match the position of the pinning button 9, and deletes the pixel data corresponding to the object B from the drawing layer 54 (FIG. 22D). Table 7B illustrates the start point coordinates and end point coordinates of the objects A and B after this processing. Alternatively, the drawing object management unit 11 may move the object B such that the upper left of the object B is located at the position of the pinning button 9.

Moving to the next subject of the agenda table, the user swipes the screen (any object or any position) to move by the distance dx to the left and by the distance dy downward to create a space for writing notes for the next subject.

The swipe detection unit 15 detects a swipe, and the display control unit 14 repeats, at set time intervals, a process of subtracting the amount of swipe in the x-axis direction from the x coordinate of the object A of the drawing layer 54 and the amount of swipe in the y-axis direction from the y coordinate of the object A. The display control unit 14 updates the display data at set time intervals. When the user stops swiping, the object A in the drawing layer 54 has the start point coordinates (Sxa-dx,Sya-dy). Then, the display control unit 14 performs an OR operation on the pixels of the drawing layer 54 and the pinning layer 53 corresponding to the display area 51, and displays the result on the display 220. Note that the display control unit 14 displays the menu layer 55 (including the operation menu 306 illustrated in FIG. 22A) as the top layer, but the menu layer 55 is deleted in FIGS. 22B to 22E.

Figure 22E:
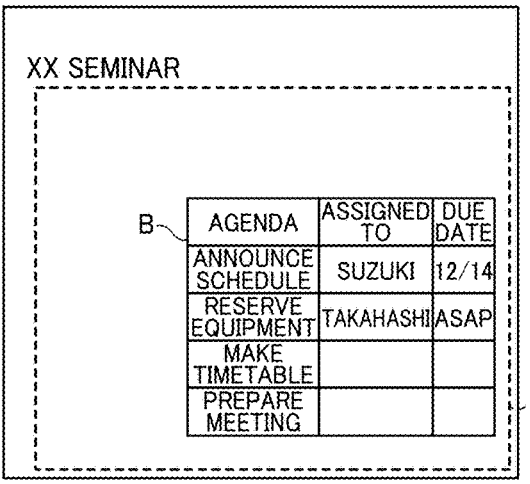

As a result, as illustrated in FIG. 22E, the object B (agenda table) is displayed at the same position without being swiped because there is no change in coordinates. Table 7C illustrates the start point coordinates and end point coordinates of the objects A and B after this processing.

A description is given below of a sequence of operation for display performed by the display apparatus 2.

Figure 23:
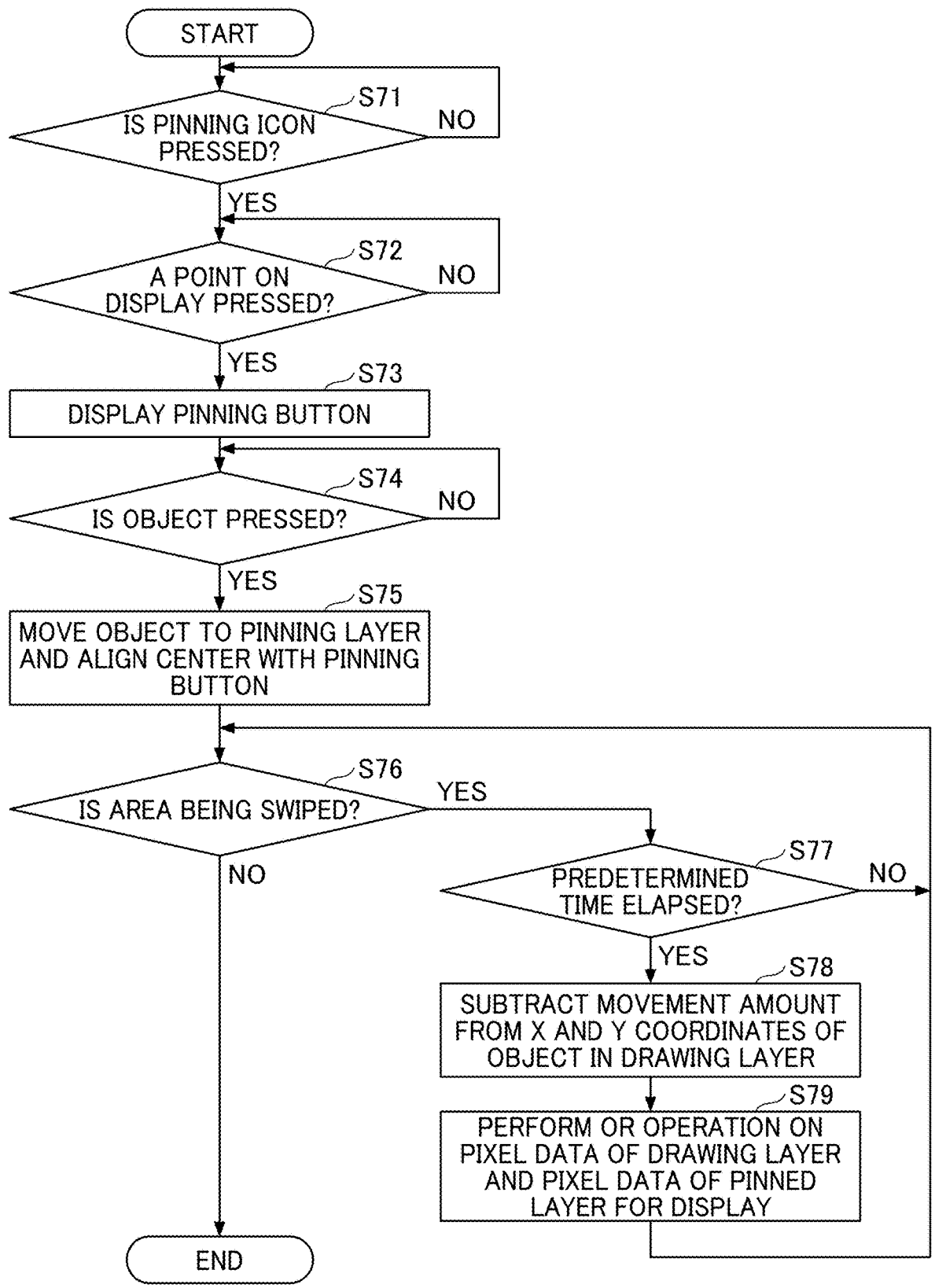
FIG. 23 is a flowchart illustrating an example of a procedure for displaying an object pinned in the display area, performed by the display apparatus according to Embodiment 7.

FIG. 23 is a flowchart illustrating an example of a procedure for displaying an object pinned in the display area 51, performed by the display apparatus 2.

The contact position detection unit 12 determines whether or not the pinning icon 307 is pressed by the input device 291 (e.g., the electronic pen 2500 illustrated in FIG. 22A) (S71).

When the pinning icon 307 is pressed (Yes in S71), the drawing object management unit 11 enters the pinning mode. Subsequently, the contact position detection unit 12 determines whether or not a position (Px,Py) on the display 220 (572) is pressed by the input device 291.

In a case where the contact position detection unit 12 detects pressing at a position (Px,Py) on the display 220 (Yes in S72), the display control unit 14 displays the pinning button 9 at the pressed position (S73).

In S74, the contact position detection unit 12 determines whether an object is selected (pressed) by the user, that is, whether a position within the circumscribed rectangle of the object is pressed.

When the contact position detection unit 12 detects selection (pressing) of an object (Yes in S74), the drawing object management unit 11 copies the pixel data corresponding to the selected object B from the drawing layer 54 to the pinning layer 53 such that the center coordinates of the selected object B are aligned with the position of the pinning button 9, and deletes the pixel data corresponding to the agenda table (object B) from the drawing layer 54 (S75).

The process from S76 to S79 is similar to that from S9 to S12 in FIG. 10. The method of ending pinning of an object may be the same as that in Embodiment 6.

According to the present embodiment, the display apparatus 2 allows the user to move a pinned object with a simple operation and then move the display area 51. Thus, the user can move the object in advance in consideration of the margin.

Embodiment 8

In the present embodiment, the display apparatus 2 allows the user to move one or more objects to be pinned, align the objects, and then move the display area 51.

The hardware configuration illustrated in FIG. 5 and the functional configuration illustrated in FIG. 6 of the above-described embodiment are applicable to the present embodiment.

Display Example Using Pinning Layer

A method of displaying an object using the pinning layer 53 will be described with reference to FIGS. 24A to 24G. FIGS. 24A to 24G illustrate an example of display of an object pinned to the pinning layer 53.

As illustrated in FIG. 24A, the user handwrites the object A (XX seminar) and the object B (agenda table). Next, the user sets the display apparatus 2 to the selection mode. For example, the display apparatus 2 displays a selection icon in the operation menu 306 (in FIG. 22A), and detects that the selection icon is selected based on the coordinates detected by the contact position detection unit 12. The selection mode is an operation mode in which the display apparatus 2 selects an object according to operation by the input device 291. When the user inputs a rectangular region with the input device 291, the display apparatus 2 displays the pinning button 9. The position of the pinning button 9 is not limited to the illustrated position.

When the user presses the pinning button 9, the display apparatus 2 displays a pinned area 320 having diagonal vertexes that are two points of the rectangular region input by the user (FIG. 24B). Table 8A presents the start point coordinates, the end point coordinates, and the layer attributes of the objects A and B and the pinned area 320 when the upper left corner of the display area 51 is the origin (0,0), the upper left coordinates of the object are the start point coordinates, and the lower right coordinates of the object are the end point coordinates.

TABLE 8A

| Object ID | Start point coordinates | End point coordinates | Layer attribute |
|---|---|---|---|
| Object A | (Sxa, Sya) | (Exa, Eya) | Drawing layer |
| Object B | (Sxb, Syb) | (Exb, Eyb) | Drawing layer |
| Pinned area | (Sxp, Syp) | (Exp, Eyp) | Pinning layer |

TABLE 8B

| Object ID | Start point coordinates | End point coordinates | Layer attribute |
|---|---|---|---|
| Object A | (Sxa,Sya) | (Exa,Eya) | Drawing layer |
| Pinned area | (Sxp,Syp) | (Exp,Eyp) | Pinning layer |
| Object B' | (Sxp,Syp) | $\left(Exp, Syp + \frac{|Syb-Eyb|+|Sxp-Exp|}{|Sxb-Exb|}\right)$ | Pinning layer |

TABLE 8C

| Obect ID | Start point coordinates | End point coordinates | Layer attribute |
|---|---|---|---|
| Object A | (Sxa-dx,Sya-dy) | (Exa-dx,Eya-dy) | Drawing layer |
| Pinned area | (Sxp,Syp) | (Exp,Eyp) | Pinning layer |
| Object B' | (Sxp,Syp) | $\left(Exp, Eyp + \frac{|Syb-Eyb|+|Sxp-Exp|}{|Sxb-Exb|}\right)$ | Pinning layer |

Next, as illustrated in FIG. 24C, the user drag and drops the object B and pins the object B in the pinned area 320. The drawing object management unit 11 copies the pixel data corresponding to the object B in the drawing layer 54 to the pinning layer 53 such that the start point (for example, the upper left vertex) of the object B matches the start point of the pinned area 320. The copied object 13 is referred to as an object B'. Then, the drawing object management unit 11 deletes the pixel data corresponding to the object B from the drawing layer 54 (FIG. 24D). As described above, the display apparatus 2 allows the user to move the display area 51 after placing the object in the pinned area 320.

The display apparatus 2 may move two or more objects to the pinned area 320 according to the user operation. The drawing object management unit 11 reduces the size of the objects moved to the pinned area 320 by the user so that all the objects fit in the pinned area 320. The drawing object management unit 11 may display each object as a thumbnail or an icon representing the object.

In the example illustrated in FIG. 24C, the object B has a width larger than the width of the pinned area 320. Accordingly, the drawing object management unit 11 reduces the object B with a reduction ratio α, so as to fit in the pinned area 320 and moves the object B to the pinned area 320. The reduction ratio α is "width of pinned area/width of object B." When the height of the object B is greater than the height of the pinned area 320, the reduction ratio α is a ratio of the heights. The drawing object management unit 11 multiplies the height and width of the object B' by the reduction ratio α. Table 8B presents the coordinates of the object A and B'.

The user then swipes at a desired position on the display 220 using the input device 291. When the swipe detection unit 15 detects a swipe, the display control unit 14 repeats, at set time intervals, a process of subtracting the amount of swipe in the x-axis direction from the x coordinates of the objects A and B of the drawing layer 54 and the amount of swipe in the y-axis direction from the y coordinates of the objects A and B. The display control unit 14 updates the display data at set time intervals. When the user stops swiping, the objects A and B in the drawing layer 54 have the start point coordinates (Sxa-dx,Sya-dy) and (Sxb-dx, Syb-dy), respectively.

The display control unit 14 performs an OR operation on pixels of the pinning layer 53 and the drawing layer 54 and displays the result on the display 220. Then, only the object B' is not swiped away but displayed at the same position because coordinates thereof are not changed (FIG. 24E). Table 8C presents the start point coordinates and end point coordinates of the objects A and B' after this processing.

The object B' may remain reduced in the pinned area 320. Alternatively, the display control unit 14 may return the object B' as the object B to the original position in the display area 51 by a user operation or automatically in response to end of the swipe (FIG. 24F).

In a case where the object B' remains reduced in the pinned area 320, when the user presses the object B', the display control unit 14 displays a preview 321 of the object B having the size before reduction (FIG. 24G). The preview 321 has the same size as or is larger than the original object B and allows the user to view the contents of object B. The display control unit 14 deletes the preview 321 after a certain period of time or in response to a user operation. The user may return the object B to the original position in the display area 51 from the preview 321.

When the object B is returned to the original position in the display area 51 by a user operation or automatically, the drawing object management unit 11 copies the object B from the pinning layer 53 to the drawing layer 54. Further, the drawing object management unit 11 deletes the pixel data corresponding to the object B from the pruning layer 53.

A description is given below of a sequence of operation for display performed by the display apparatus 2.

Figure 25:
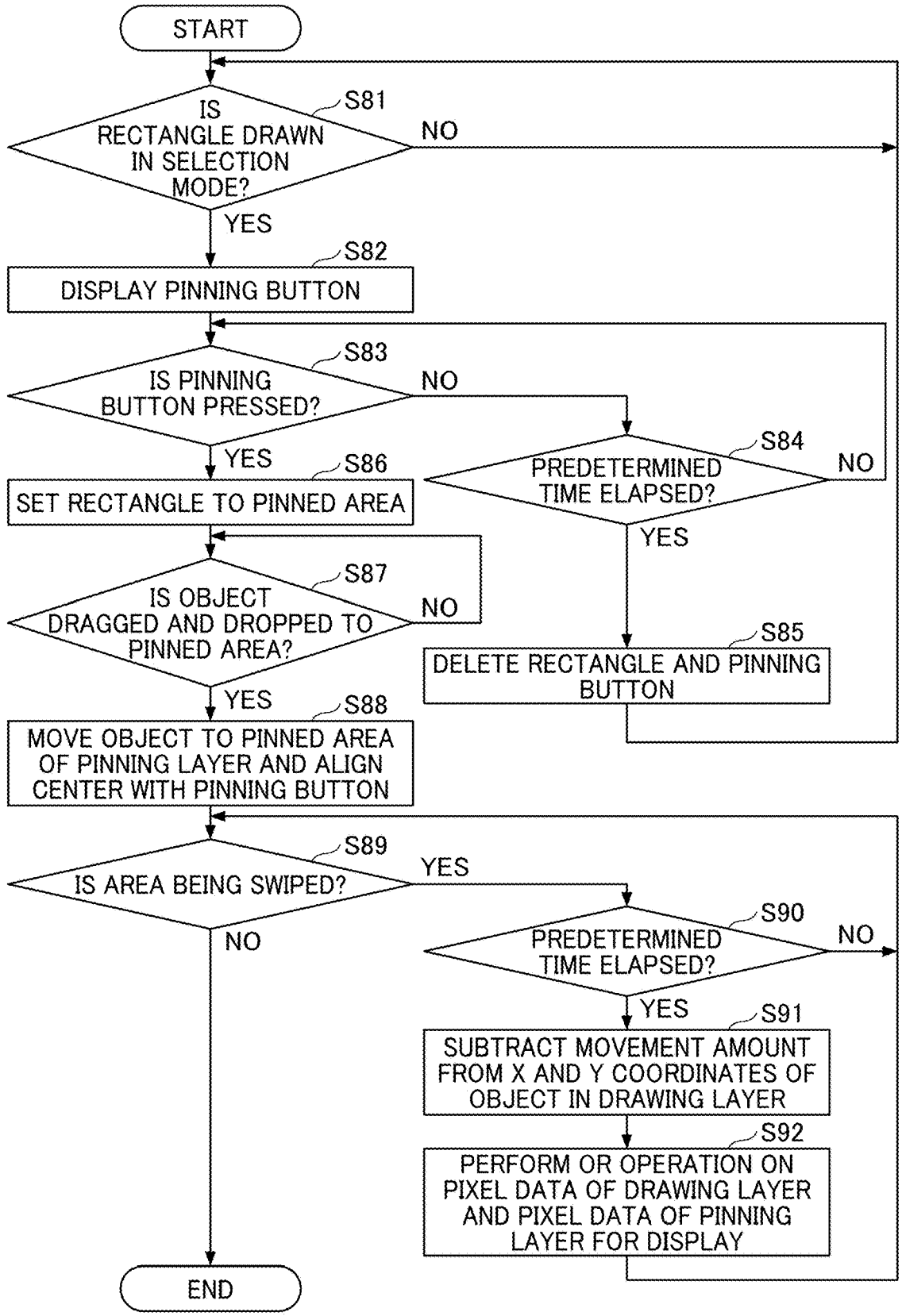
FIG. 25 is a flowchart illustrating an example of a procedure for displaying an object pinned in the display area, performed by the display apparatus according to Embodiment 8.

FIG. 25 is a flowchart illustrating an example of a procedure for displaying an object pinned in the display area 51, performed by the display apparatus 2.

The contact position detection unit 12 determines whether or not a rectangular has been drawn (handwritten) in the selection mode (S81). For example, the display apparatus 2 determines that the start point and the end point of a straight line are diagonal vertexes of a rectangle. In this case, handwriting of the rectangle is detected when the contact position detection unit 12 detects the input of the straight line (stroke). The drawing data generation unit 13 may perform pattern recognition to determine whether the shape is a rectangle on the stroke data generated from the coordinate point sequence detected by the contact position detection unit 12.

When hand draft input of a rectangle in the selection mode is detected (Yes in S81), the display control unit 14 displays the pinning button 9 in or on the rectangle (S82).

The contact position detection unit 12 determines whether or not the pinning button 9 is pressed by the input device 291 (S83).

When the pressing of the pinning button 9 is not detected (No in S83), the display control unit 14 determines whether or not a predetermined time has elapsed (S84). When the predetermined time has elapsed (Yes in S84), the display control unit 14 deletes the rectangle and the pinning button 9 (S85).

When the pressing of the pinning button 9 is detected within the predetermined time (Yes in S83), the drawing object management unit 11 determines the region specified by the rectangle as the pinned area 320 (S86). The region specified by the rectangle may be the same area as the rectangle, or may be an area adjusted so as to exclude other objects overlapping with the rectangle.

The contact position detection unit 12 determines whether or not an object has been dragged and dropped to the pinned area 320 (S87). That is, the contact position detection unit 12 determines whether or not the start point of dragging of the input device 291 matches an object and the end point of dropping is within the pinned area 320.

When the determination of step S87 is Yes, the drawing object management unit 11 copies the pixel data corresponding to the object in the drawing layer 54 to the pinning layer 53 such that the start point of the object matches the start point of the pinned area 320, and deletes the pixel data corresponding to the object from the drawing layer 54 (S88). The start points are, for example, the upper left vertex of the object and that of the pinned area 320, but may be the upper right vertex, the lower right vertex, or the lower left vertex.

The process from S89 to S92 is similar to that from S9 to S12 in FIG. 10.

According to the present embodiment, the display apparatus 2 allows the user to move one or more objects to the pinned area 320, align the objects therein, and then move the display area 51. In addition, since the object is reduced to fit in the pinned area 320, a margin is easily created even when a large object is to be moved together with the display area 51.

Embodiment 9

In the present embodiment, the display apparatus 2 allows the user to move the display area 51 while holding down an object.

The hardware configuration illustrated in FIG. 5 and the functional configuration illustrated in FIG. 6 of the above-described embodiment are applicable to the present embodiment.

Display Example Using Pinning Layer

Figure 26A:
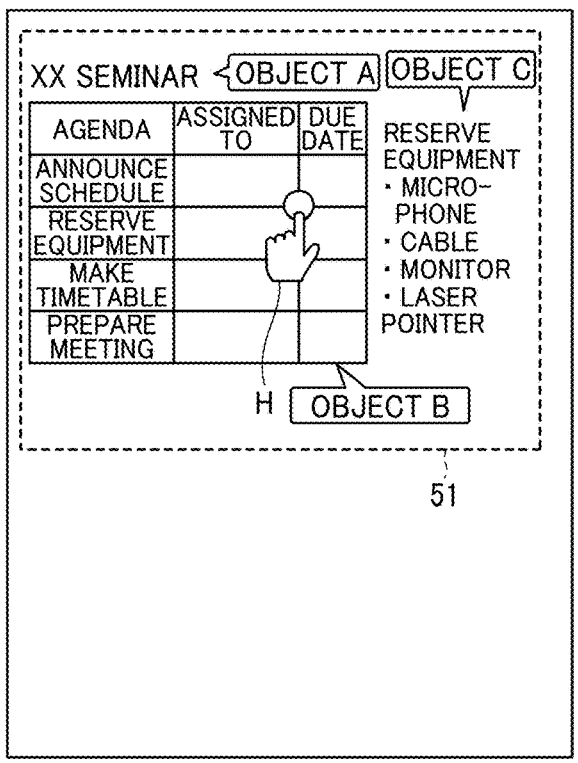
FIGS. 26A to 26C illustrate an example of display of an object pinned to the pinning layer, according to Embodiment 9.
Figure 26B:
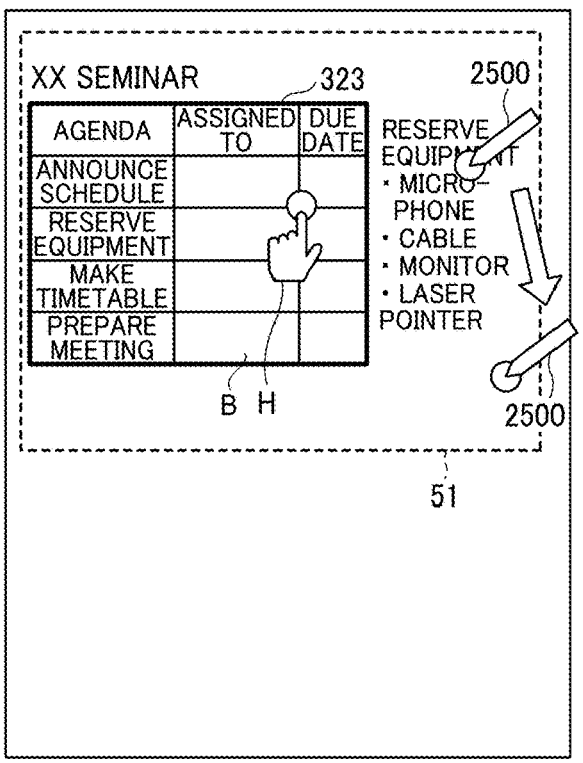
Figure 26C:
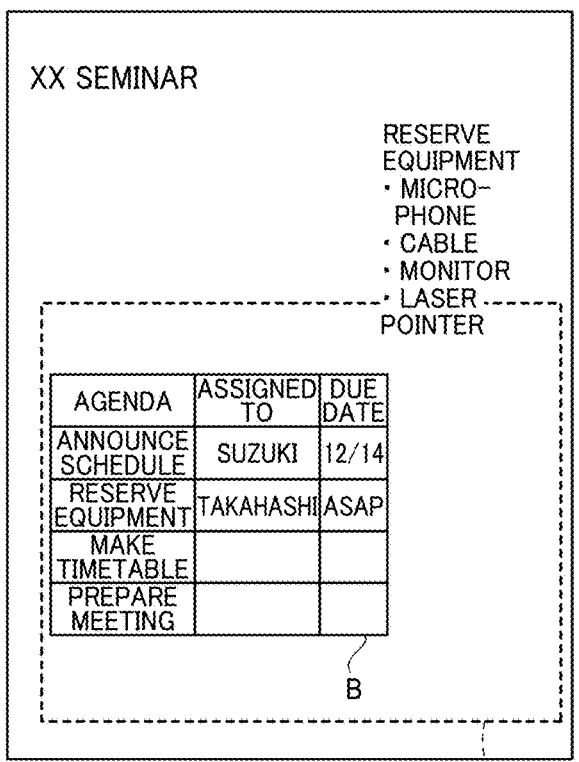

A method of displaying an object using the pinning layer 53 will be described with reference to FIGS. 26A to 26C. FIGS. 26A to 26C are diagrams illustrating a display example of an object pinned to the pinning layer 53.

As illustrated in FIG. 26A, the user handwrites the object A (XX seminar) and the object B (agenda table) on the display 220. In addition, the user handwrites the object C that is the note about "reserve equipment" and includes a list of equipment (microphone, cable, monitor, and laser pointer). The term "object C" is used for convenience of description, but the character strings therein are not grouped into one object. Table 9A presents the start point coordinates, the end point coordinates, and the layer attributes of the objects A, B, and C when the upper left corner of the display area 51 is the origin (0,0), the upper left coordinates of the object are the start point coordinates, and the lower right coordinates of the object are the end point coordinates.

TABLE 9A

| Object ID | Start point coordinates | End point coordinates | Layer attribute |
| --- | --- | --- | --- |
| Object A | (Sxa, Sya) | (Exa, Eya) | Drawing layer |
| Object B | (Sxb, Syb) | (Exb, Eyb) | Drawing layer |
| Object C | (Sxc, Syc) | (Exc, Eyc) | Drawing layer |

TABLE 9B

| Object ID | Start point coordinates | End point coordinates | Layer attribute |
| --- | --- | --- | --- |
| Object A | (Sxa, Sya) | (Exa, Eya) | Drawing layer |
| Object B | (Sxb, Syb) | (Exb, Eyb) | Pinning layer |
| Object C | (Sxc, Syc) | (Exc, Eyc) | Drawing layer |

TABLE 9C

| Object ID | Start point coordinates | End point coordinates | Layer attribute |
| --- | --- | --- | --- |
| Object A | (Sxa-dx, Sya-dy) | (Exa-dx, Eya-dy) | Drawing layer |
| Object B | (Sxb, Syb) | (Exb, Eyb) | Drawing layer |
| Object C | (Sxc-dx, Syc-dy) | (Exc-dx, Eyc-dy) | Drawing layer |

Proceeding to the next subject on the agenda table (object B), the user performs an operation for clearing the right side of the object B, to create a space for writing a note on this subject. First, the user holds down the object B (any position of the object B) with the hand H (an example of a first input device). The drawing object management unit 11 determines which object overlaps with the contact coordinates. Since the coordinates are in the circumscribed rectangle of the object B (agenda table), the drawing object management unit 11 copies the pixel data corresponding to the object B in the drawing layer 54 to the pinning layer 53, and deletes the pixel data corresponding to the object B from the drawing layer 54.

Further, in order to notify the user that the object B is temporarily pinned, the display control unit 14 borders the object B with a frame 323 as illustrated in FIG. 26B. Bordering refers to displaying a thick frame on the outline of an object B for emphasized display. The object B may be emphasized by a broken frame or a blinking frame.

The user swipes a position on the display 220 using the electronic pen 2500 (an example of a second input device) while touching the display 220 with the hand H.

When the swipe detection unit 15 detects a swipe, the display control unit 14 repeats, at set time intervals, a process of subtracting the amount of movement in the x-axis direction of the swipe from the x coordinates of the objects A and C of the drawing layer 54 and the amount of movement in the y-axis direction of the swipe from the y coordinates of the objects A and C. The display control unit 14 updates the display data at set time intervals. When the user stops swiping, the objects A and C in the drawing layer 54 have the start point coordinates (Sxa-dx,Sya-dy) and (Sxc-dx,Syc-dy), respectively.

When the user stops holding down the object B (agenda table) with the hand H (releases the hand H from the display 220), the drawing object management unit 11 copies the pixel data corresponding to the object B in the pinning layer 53 to the drawing layer 54 and deletes the pixel data corresponding to the object B from the pinning layer 53. Then, the display control unit 14 displays the pixels of the drawing layer 54 corresponding to the display area 51 on the display 220. Since there is no change in the coordinates of the object B, the display apparatus 2 displays a new display area 51 in which the position of the object B is not changed (see FIG. 26C). Table 9C presents the start point coordinates and end point coordinates of the objects A, B, and C after this processing.

Note that the user may hold down the object B with the electronic pen 2500 and swipe with the hand H. Alternatively, the user may hold down the object B with the electronic pen 2500 and swipe with another electronic pen 2500. Yet alternatively, the user may hold down the object B with the hand H and swipe with the other hand.

Although one object B is pinned in. FIGS. 26A to 26C, the display apparatus 2 allow the user to pin a plurality of objects to the pinning layer 53 by using a plurality of fingers or the like.

A description is given below of a sequence of operation for the display illustrated in FIGS. 26A to 26C, performed by the display apparatus 2.

Figure 27:
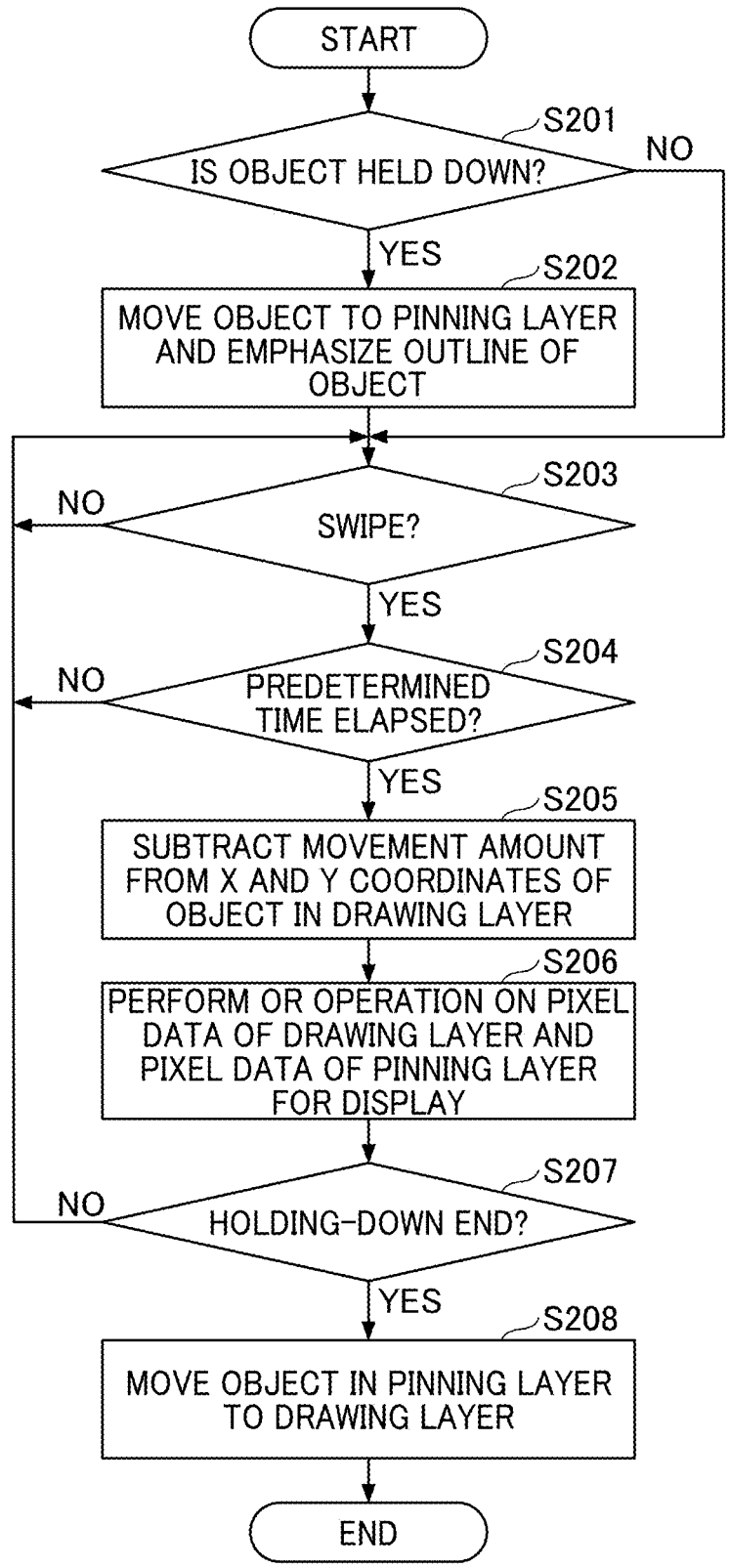
FIG. 27 is a flowchart illustrating an example of a procedure for displaying an object pinned in the display area, performed by the display apparatus according to Embodiment 9.

FIG. 27 is a flowchart illustrating an example of a procedure for displaying an object pinned in the display area 51, performed by the display apparatus 2.

The contact position detection unit 12 determines whether or not an object (e.g., the object B in FIG. 26A) has been held down by the input device 291 such as the hand H or the electronic pen 2500 (S201). The contact position detection unit 12 determines whether or not the coordinates touched by the input device 291 overlap with an object and the input device 291 is in contact with the object for a certain period of time or longer.

When the object B is held down (Yes in S201), the drawing object management unit 11 copies the pixel data corresponding to the object B in the drawing layer 54 to the pinning layer 53 and deletes the pixel data corresponding to the object B from the drawing layer 54. In addition, the display control unit 14 emphasizes (borders) the object B (202).

The swipe detection unit 15 determines whether or not a swipe on the display 220 by the input device 291 (e.g., the electronic pen 2500) is detected in a state where another input device 291 (e.g., the hand H) is in contact with the display 220 (S203).

When the display area 51 is being swiped, at set time intervals (S204), the display control unit 14 repeats a process of subtracting the movement amount (swipe amount) from the x and y coordinates of the object in the drawing layer 54 in the x-axis direction and the y-axis direction, respectively (S205). In this way, in a period of receiving the operation of moving the display area 51, the display control unit 14 maintains the position of the selected object in the display area 51.

The display control unit 14 performs an OR operation on pixels of the pinning layer 53 and the drawing layer 54 corresponding to the display area 51 and displays the result on the display 220 (S206).

Next, the contact position detection unit 12 determines whether or not holding-down by the input device 291 (e.g., the hand H) has ended or is continuously detected (S207).

When the holding-down is no longer detected (Yes in S207), the drawing object management unit 11 copies the pixel data corresponding to the object B in the pinning layer 53 to the drawing layer 54, and deletes the pixel data corresponding to the object B from the pinning layer 53 (S208). Thus, the object B is moved to the drawing layer 54. Then, the display control unit 14 displays the pixels of the drawing layer 54 corresponding to the display area 51 on the display 220.

According to the present embodiment, the display apparatus 2 receives holding-down of the object together with the operation for moving the display area 51 by the user who uses two input devices 291. This configuration obviates pressing a predetermined button or icon, thus facilitating intuitive operation.

Embodiment 10

In the present embodiment, a description is given of a display, system in which display apparatuses installed at two different sites communicate with each other to share pinning of an object.

System Configuration

Figure 28:
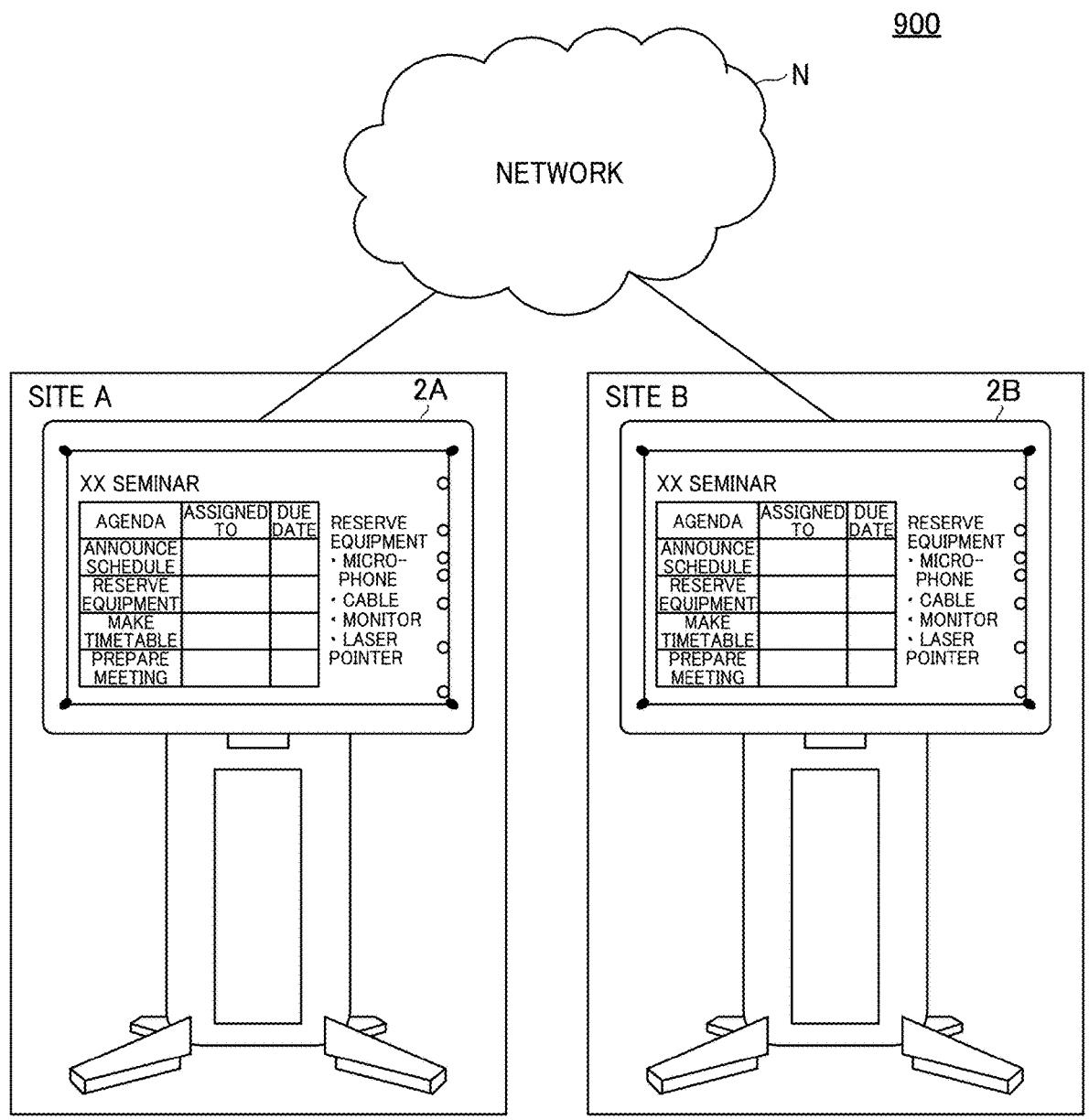
FIG. 28 is a diagram illustrating an example of a configuration of a display system according to Embodiment 10.

FIG. 28 is a diagram illustrating an example of a configuration of a display system 900. In FIG. 28, a display apparatus 2A (an example of a first display apparatus) is installed at a site A and a display apparatus 2B (an example of a second display apparatus) is installed at a site B. The display apparatus 2A and the display apparatus 2B are communicably connected via a network N such as the Internet.

The display apparatus 2A and the display apparatus 2B can share operation contents with each other and display the same object.

Functions

Figure 29:
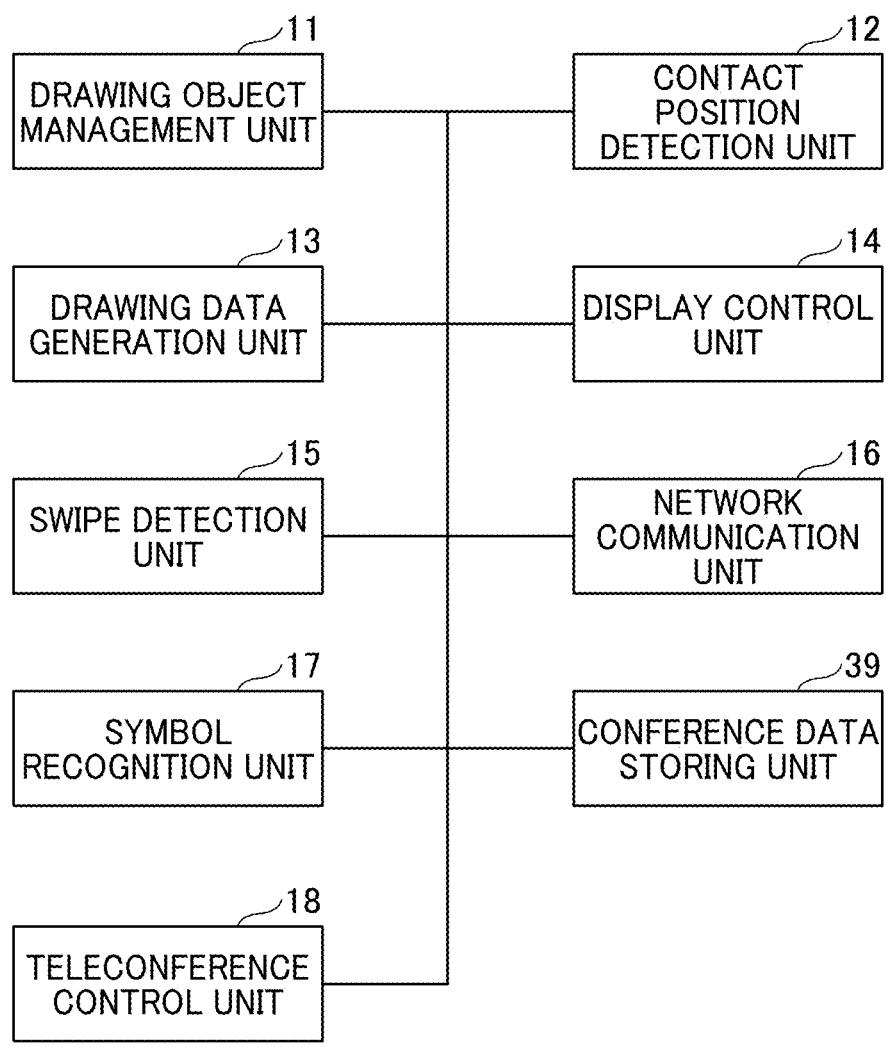
FIG. 29 is a block diagram illustrating an example of a functional configuration of display apparatuses of the display system according to Embodiment 10.

FIG. 29 is a block diagram illustrating an example of functional configuration of the display apparatuses 2A and 2B. In the description referring to FIG. 29, for simplicity, mainly differences from FIG. 6 are described.

The display apparatuses 2A and 2B of the present embodiment have a teleconference control unit 18 in addition to the functional units illustrated in FIG. 6. The user at the site A inputs an operation to the display apparatus 2A to perform a teleconference with the user of the display apparatus 2B at the site B (for example, the user selects the display apparatus 2B from a list and inputs an ID and a password). Then, the teleconference control unit 18 of the display apparatus 2A establishes a session for the conference with the display apparatus 2B at the site B. The teleconference control units 18 of the display apparatuses A and B mutually transmit and receive operation contents through a session.

Figures 30, 31:
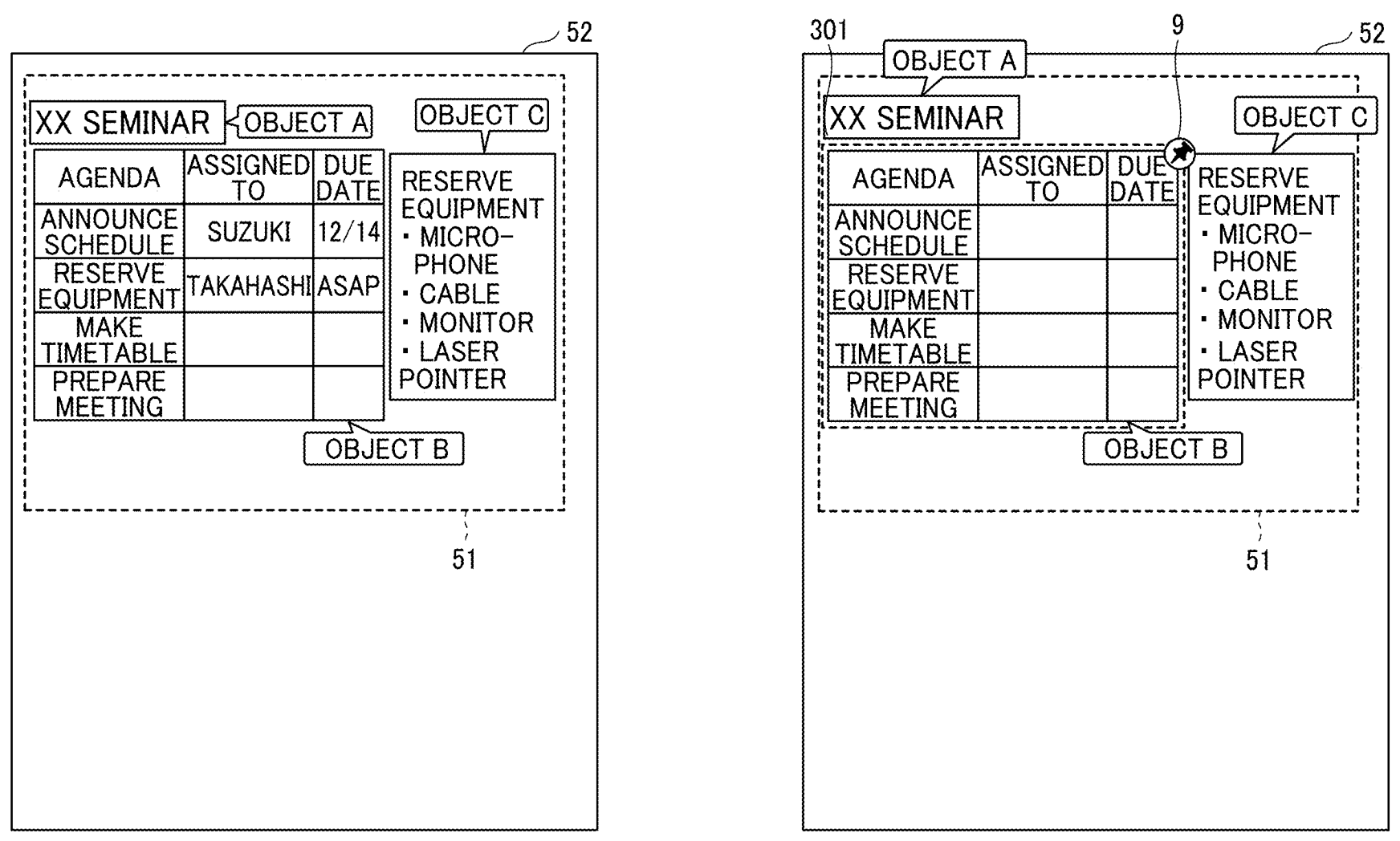

For example, as illustrated in FIG. 30, the user at the site A handwrites the object A (XX seminar), the object B (agenda table), and the object C (memo about "reserve equipment") in the display area 51 of the display apparatus 2A.

The drawing data generation unit 13 of the display apparatus 2A displays these handwritten objects on the display 220 via the display control unit 14 and transfers hand drafted input data (coordinate point sequences of the, and line attributes such as line thickness and color) to the teleconference control unit 18. The teleconference control unit 18 transmits the hand drafted input data to the display apparatus 2B via the network communication unit 16.

When the teleconference control unit 18 of the display apparatus 2B receives the hand drafted input data via the network communication unit 16, the display control unit 14 displays the objects based on the data on the display 220. In this way, the same objects are displayed on the display 220 of the display apparatus 2A and the display 220 of the display apparatus 2B.

Pinning of Object in Teleconference

Subsequently, as in Embodiment 1, when the drawing object management unit 11 detects that the user has held down the object B, the drawing object management unit 11 displays the pinning button 9 for pinning the object B.

FIG. 31 is a diagram illustrating the display area 51 in which the pinning button 9 is displayed. FIG. 31 is similar to FIG. 9B.

When the user presses the pinning button 9 with the input device 291, the drawing object management unit copies the pixel data corresponding to the object B from the drawing layer 54 to the pinning layer 53, and deletes the corresponding pixel data from the drawing layer 54.

Then, the drawing object management unit 11 transfers the pixel data and the start point coordinates of the object B to the teleconference control unit 18. The teleconference control unit 18 transmits a pinning command including these data to the display apparatus 2B via the network communication unit 16.

When the teleconference control unit 18 of the display apparatus 2B receives the pinning command via the network communication unit 16, the drawing object management unit 11 stores the pixel data of the received object B in the pinning layer 53, from the position corresponding to the received start point coordinates.

Then, the drawing object management unit 11 of the display apparatus 2B deletes the pixel data of the object B from the drawing layer 54, from the position of the received start point coordinates.

In this way, the object B (agenda table) is pinned to the pinning layer 53 also in the display apparatus 2B. When the display apparatus 2A and the display apparatus 2B share the object ID, the teleconference control unit 18 may transmit the object ID of the object B instead of the pixel data corresponding to the object B.

When the next subject on the agenda table (object B) is discussed, the user of the display apparatus 2A moves, by swipe, objects other than the pinned object B, to create a space for writing a note on the next subject.

Figure 32:
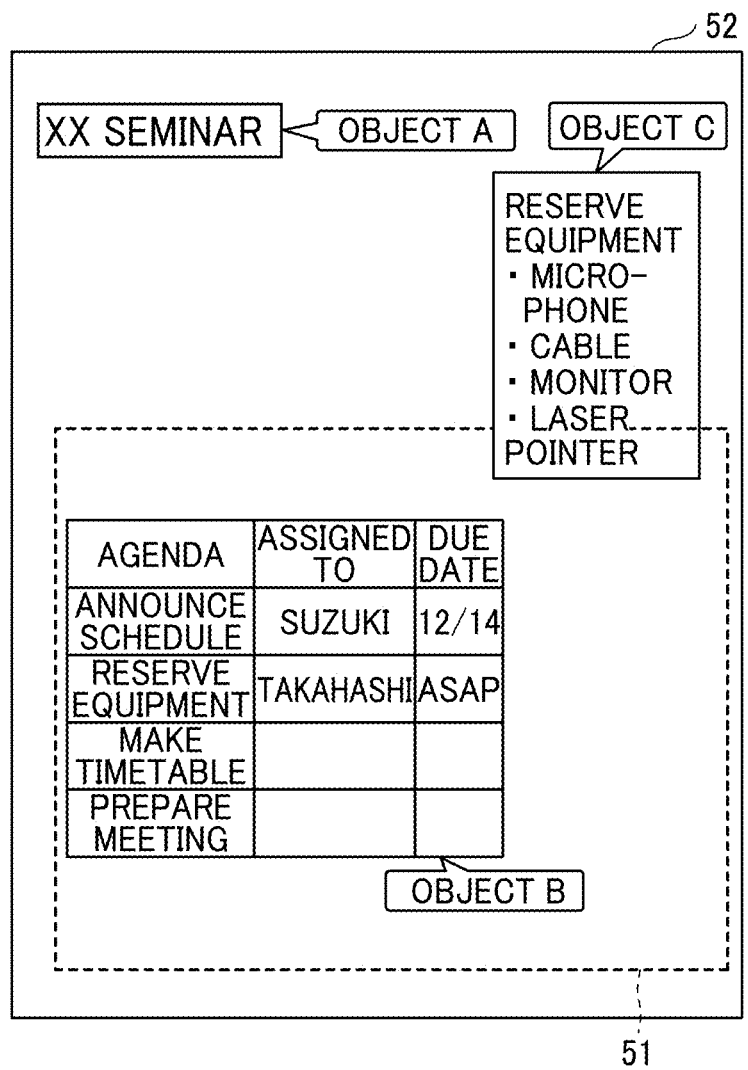
FIG. 32 is a diagram illustrating the display area in which a space is created by moving the object according to a user operation.

FIG. 32 illustrates the display area 51 in Which a space is created by moving objects other than the object B according to the user operation. FIG. 32 is similar to FIG. 9C.

The swipe detection unit 15 of the display apparatus 2A transfers the start point coordinates (Ssx,Ssy) and the end-point coordinates (Sex,Sey) of the swipe to the teleconference control unit 18. The teleconference control unit 18 transmits a swipe command including these data to the display apparatus 2B via the network communication unit 16.

When the teleconference control unit 18 of the display apparatus 2B receives the swipe command via the network communication unit 16, the drawing object management unit 11 moves the object in the drawing layer 54 by the amount (Sex-Ssx) in the x-axis direction and the amount (Sey-Ssy) in the y-axis direction.

Then, the display control unit 14 of the display apparatus 2B performs an OR operation on the pixel data in the drawing layer 54 and the pixel data in the pinning layer 53 and displays the result on the display 220. Therefore, the display apparatus 2B displays, on the display 220 thereof, the display area 51 (including the objects) similar to that illustrated in FIG. 32.

A description is given below of a sequence of operations.

Figure 33:
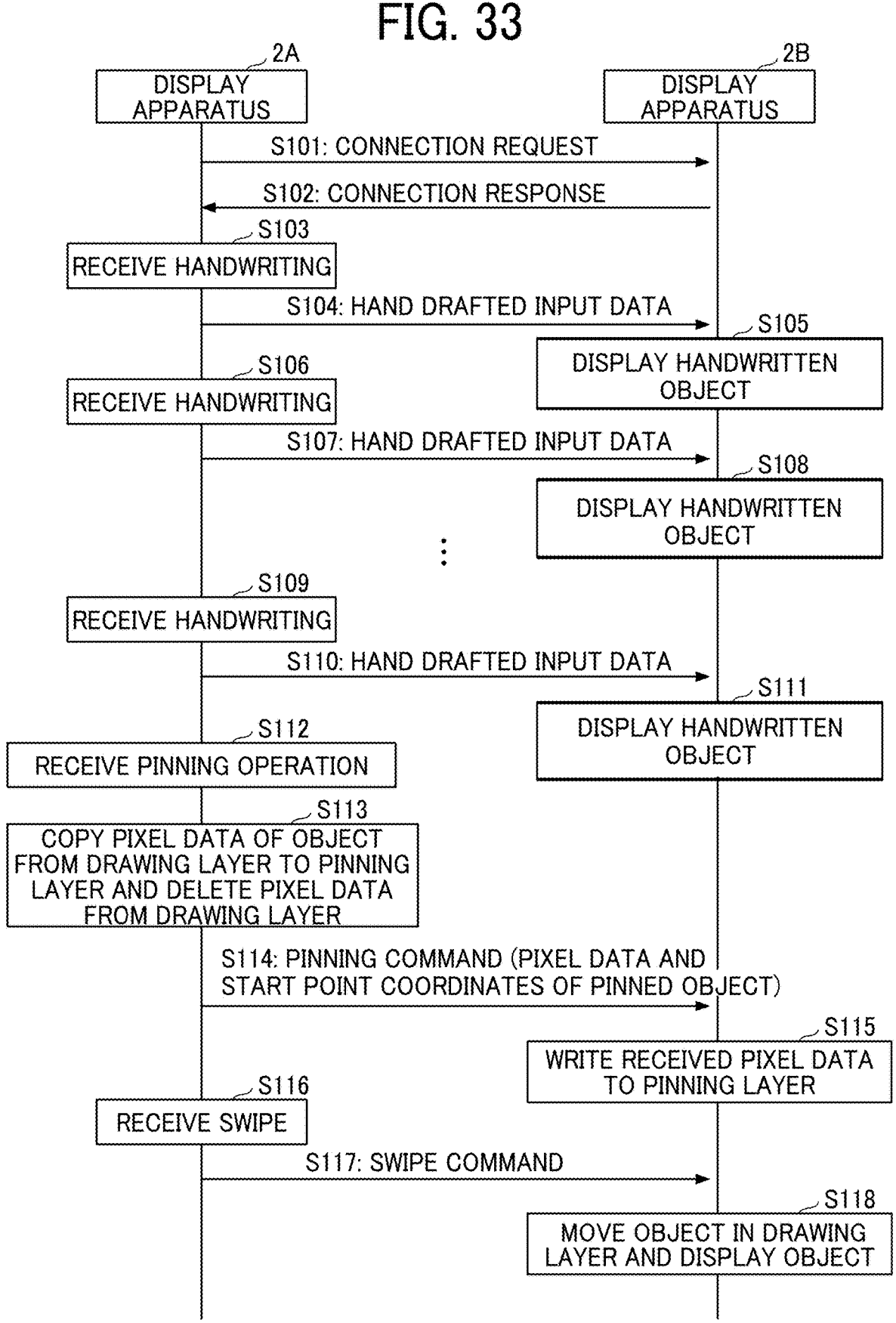
FIG. 33 is an example of a sequence diagram illustrating a procedure of sharing pinning of an object between two display apparatuses according to Embodiment 10.

FIG. 33 is an example of a sequence diagram illustrating a procedure of sharing pinning of an object between the display apparatuses 2A and 2B.

S101: The teleconference control unit 18 of the display apparatus 2A transmits a connection request (ID, password, etc.) to the display apparatus 2B via the network communication unit 16.

S102: The teleconference control unit 18 of the display apparatus 2B transmits a connection response (connection successful) to the display apparatus 2A when the authentication for the connection request is successful.

S103: The display apparatus 2A receives handwriting input by a user using the input device 291. The drawing data generation unit 13 generates hand drafted input data and writes the hand drafted input data in the drawing layer 54. The data written in the drawing layer 54 may include, in addition to data of handwriting, character strings, graphics, and images obtained by character recognition. These data are simply referred to as hand drafted input data.

S104: The teleconference control unit 18 transmits the hand drafted input data in the drawing layer 54 to the display apparatus 2B via the network communication unit 16 at predetermined time intervals.

S105: The teleconference control unit 18 of the display apparatus 2B receives hand drafted input data via the network communication unit 16, and the drawing data generation unit 13 writes the hand drafted input data in the drawing layer 54. The display control unit 14 displays, on the display 220, the object based on the hand drafted input data in the drawing layer 54.

S106 to S111: During the conference, the display apparatuses 2A and 2B repeat the processing of steps S103 to S105.

The hand drafted input data can also be transmitted from the display apparatus 2B to the display apparatus 2A.

S112: The user holds down the object B (see FIGS. 30 to 32) to display the pinning button 9, and presses the pinning button 9 with the input device 291. The drawing object management unit 11 detects pressing of the pinning button 9 based on the contact position of the input device 291 detected by the contact position detection unit 12.

S113: The drawing object management unit 11 copies the pixel data of the object B from the drawing layer 54 to the pinning layer 53, and deletes the corresponding pixel data from the drawing layer 54.

S114: The teleconference control unit 18 transmits a pinning command including the pixel data and the start point coordinates of the object B to the display apparatus 2B via the network communication unit 16.

S115: In the display apparatus 2B, in response to receiving, by the teleconference control unit 18, of the pinning command via the network communication unit 16, the drawing object management unit 11 writes the pixel data of the received object B from the position of the received start point coordinates in the pinning layer 53. In addition, the drawing object management unit 11 of the display apparatus 2B deletes the pixel data corresponding to the object B from the drawing layer 54, from the received position of the start point coordinates.

S116: Next, the display apparatus 2A moves objects other than the pinned object B by moving the display area 51 according to a swipe performed by the user.

S117: The swipe detection unit 15 of the display apparatus 2A transfers the start point coordinates (Ssx,Ssy) and the end point coordinates (Sex,Sey) of the swipe operation to the teleconference control unit 18. Then, the teleconference control unit 18 transmits a swipe command including the start point coordinates (Ssx,Ssy) and the end point coordinates (Sex,Sey) to the display apparatus 2B via the network communication unit 16.

S118: In the display apparatus 2B, in response to receiving, by the teleconference control unit 18, of the swipe command via the network communication unit 16, the drawing object management unit 11 moves the objects in the drawing layer 54 by (Sex-Ssx) in the x-axis direction and (Sey-Ssy) in the y-axis direction. The display control unit 14 of the display apparatus 2B performs an OR operation on the pixel data in the drawing layer 54 and the pixel data in the pinning layer 53 and displays the result on the display 220.

Addition of Object in Space

Next, the user of the display apparatus 2A handwrites a text related to the object D (illustrated in FIG. 34) in a space created on the right of the object B.

Figure 34:
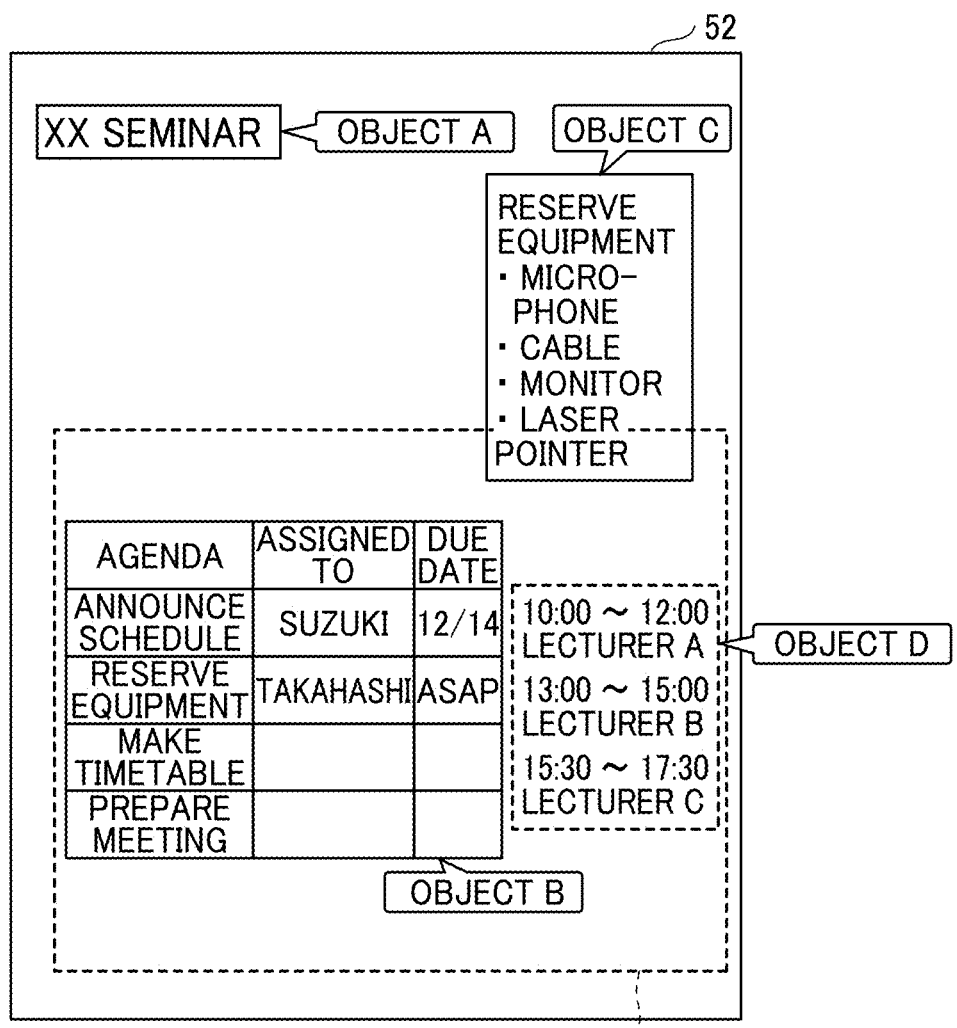
FIG. 34 is a diagram illustrating a state in which a character string (an object) is handwritten in a space in the display area, according to Embodiment 10.

FIG. 34 illustrates a state in which the object D (timetable) is handwritten in the space created in the display area 51. The drawing data generation unit 13 of the display apparatus 2A displays the handwritten objects on the display 220 via the display control unit 14 and transfers the hand drafted input data (coordinate point sequences, and line attribute data such as line thickness and color) to the teleconference control unit 18. The teleconference control unit 18 transmits the hand drafted input data to the display apparatus 2B via the network communication unit 16. When the display apparatus 2B receives the hand drafted input data, the display apparatus 2B displays the handwritten objects on the display 220 via the display control unit 14.

As described above, in the display system 900 according to the present embodiment, pinning of an object and creation of a space in the display area 51 are shared between two or more display apparatuses 2 participating in a teleconference.

Embodiment 11

In the present embodiment, a description is given of the display system 900 in which display apparatuses installed at two different sites communicate with each other via a server 60 to share pinning of an object.

System Configuration

Figure 35:
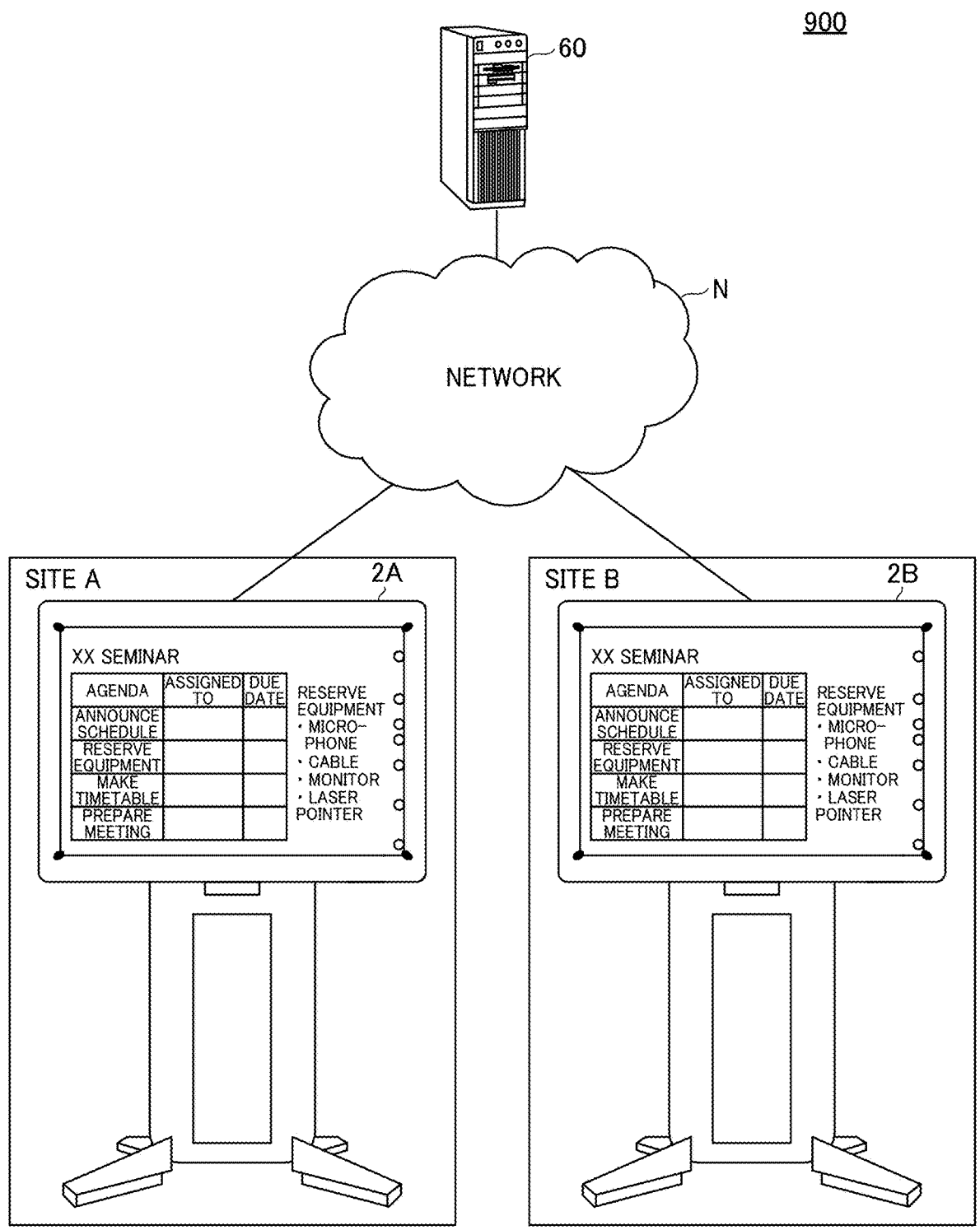
FIG. 35 is a diagram illustrating an example of a configuration of a display system according to Embodiment 11.

FIG. 35 is a diagram illustrating an example of a system configuration of the display system 900. In the following description with reference to FIG. 35, the differences from FIG. 28 are described. In FIG. 35, the server 60 is connected to the network N. The server 60 centrally manages the contents of operation of the display apparatus 2A and the display apparatus 2B, and the display apparatuses 2A and 2B display the same objects by receiving display data from the server 60.

Hardware. Configuration of Server

Figure 36:
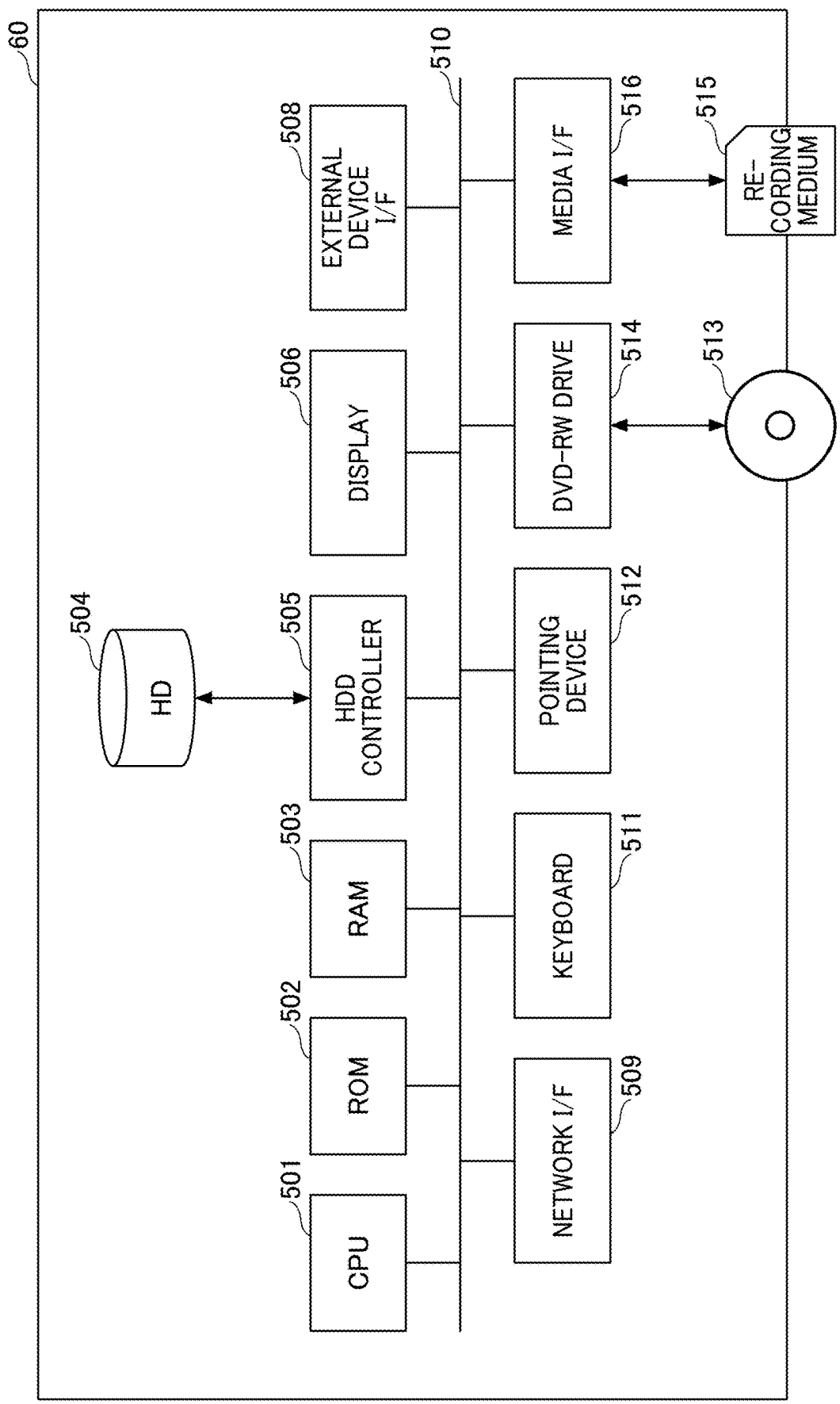
FIG. 36 is a block diagram illustrating an example of a hardware configuration of a server of the display system according to Embodiment 11.

FIG. 36 is a block diagram illustrating an example of a hardware configuration of the server according to the present embodiment. As illustrated in FIG. 30, the server 60 is implemented by computer and includes a CPU 501, a ROM 502, a RAM 503, a hard disk (HD) 504, a hard disk drive (HDD) controller 505, a display 500, an external device I/F 508, a network I/F 509, a bus line 510, a keyboard 511, a pointing device 512, a digital versatile disc rewritable (DVD-RW) drive 514, and a media I/F 516.

The CPU 501 controls entire operation of the server 60. The ROM 502 stores programs, such as an IPL, for driving the CPU 501. The RAM 503 is used as a work area for the CPU 501. The HD 504 is a storage area that stores various data such as programs. The HDD controller 505 controls reading and writing of various data from and to the HD 504 under control of the CPU 501. The display 506 displays various information such as a cursor, a menu, a window, characters, and images. The external device I/F 508 is an interface for connecting to various external devices. Examples of the external device include, but are not limited to, a USB memory and a printer.

The network I/F 509 is an interface for performing data communication via the network N. The bus line 510 is, for example, an address bus or a data bus for electrically connecting the components such as the CPU 501 illustrated in FIG. 36 with each other.

The keyboard 511 is an example of an input device provided with a plurality of keys for allowing a user to input characters, numerals, or various instructions. The pointing device 512 is an example of an input device that allows a user to select or execute various instructions, select an item for processing, or move a cursor being displayed. The DVD-RW drive 514 reads and writes various data from and to a DVD-RW 513, which is an example of a removable recording medium. The DVD-RW may be a digital versatile disc-recordable (DVD-R) or the like. The media I/F 516 controls reading and writing (storing) of data from and to a recording medium 515 such as a flash memory.

Functions

Figure 37:
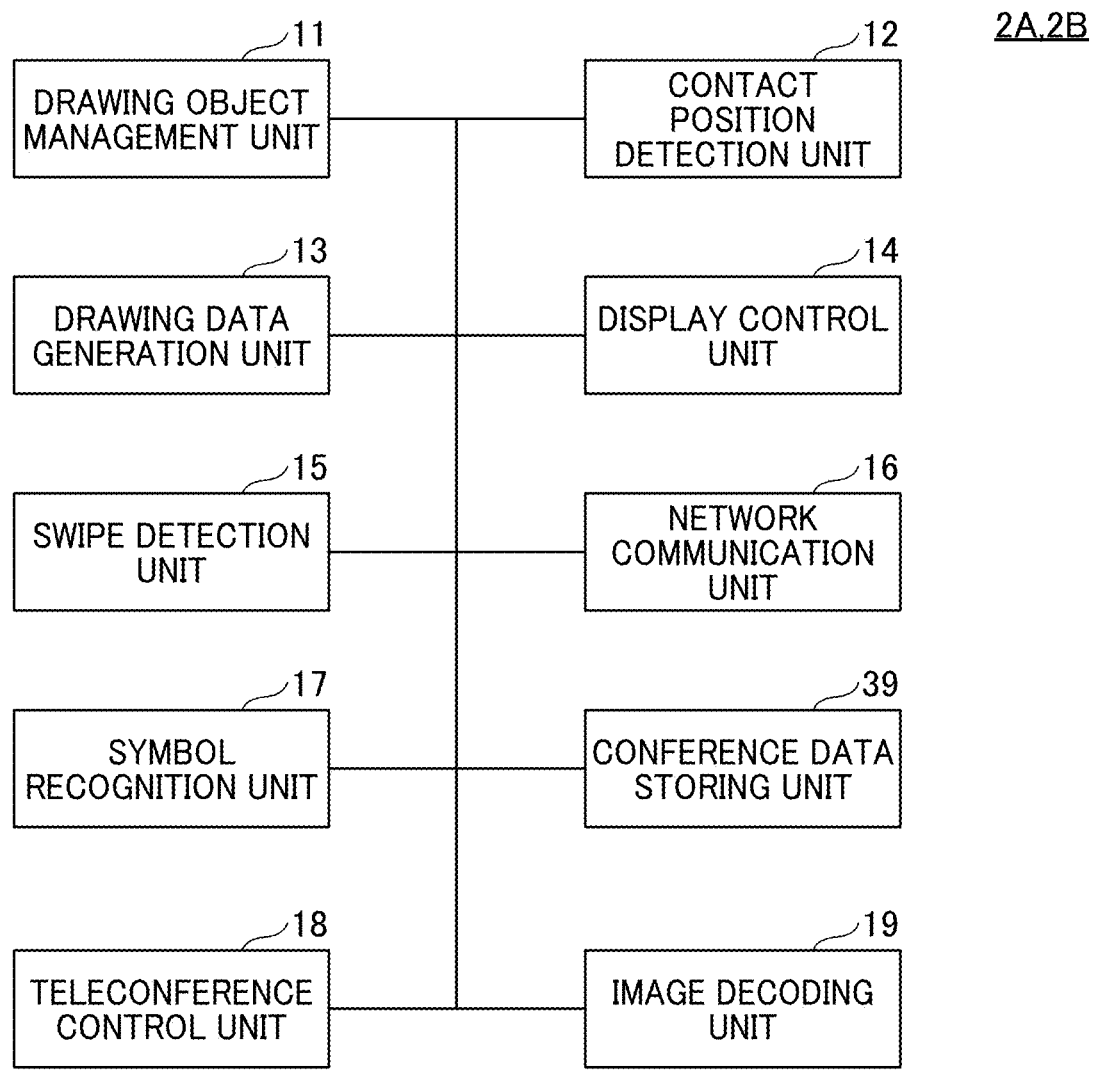
FIG. 37 is a block diagram illustrating an example of a functional configuration of the display apparatus according to Embodiment 11.

FIG. 37 is a block diagram illustrating an example of the functional configuration of the display apparatus 2 according to the present embodiment. The display apparatuses 2A and 2B may have the same functions. In the following description with reference to FIG. 37, the differences from FIG. 29 are described. The display apparatuses 2A and 2B (also collectively "display apparatuses 2") illustrated in FIG. 37 include an image decoding unit 19. The image decoding unit 19 decodes image data received from the server 60. In the present embodiment, the display apparatus 2 does not have the pinning layer 53. This is because the server 60 generates the image of the display area 51.

Figure 38:
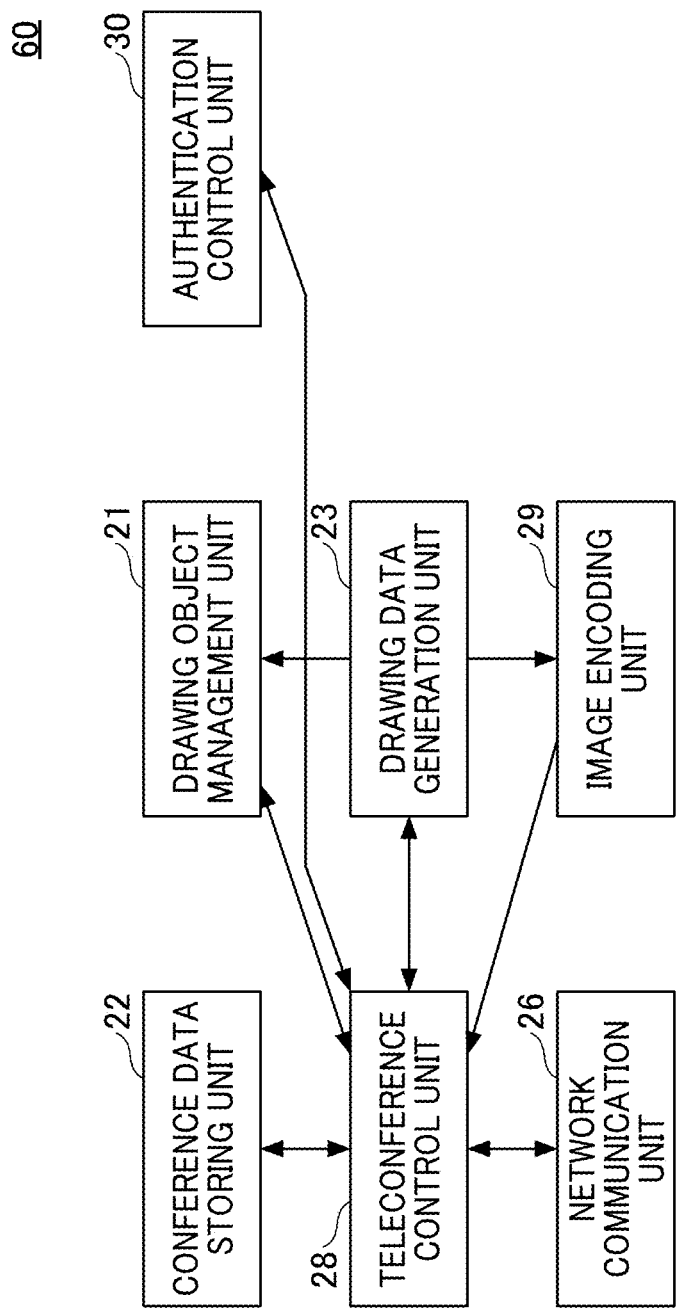
FIG. 38 is a block diagram illustrating an example of a functional configuration of the server according to Embodiment 11.

FIG. 38 is a block diagram illustrating an example of a functional configuration of the server 60 according to the present embodiment. The server 60 includes a drawing object management unit 21, a conference data storing unit 22, a drawing data generation unit 23, a network communication unit 26, a teleconference control unit 28, an image encoding unit 29, and an authentication control unit 30. The functional units of the server 60 are implemented by or are caused to function by operation of any of the elements illustrated in FIG. 36 according to an instruction from the CPU 501 executing a program loaded to the RAM 503.

The functions of the drawing object management unit 21, the conference data storing unit 22, the drawing data generation unit 23, the network communication unit 26, and the teleconference control unit 28 may be the same as those of the display apparatus 2 described above.

The authentication control unit 30 authenticates the display apparatuses 2A and 2B to participate in the same conference. The image encoding unit 29 encodes image data that the server 60 transmits to the display apparatus 2.

A description is given below of a sequence of operations by the display system 900 illustrated in FIG. 35.

Figure 39A:
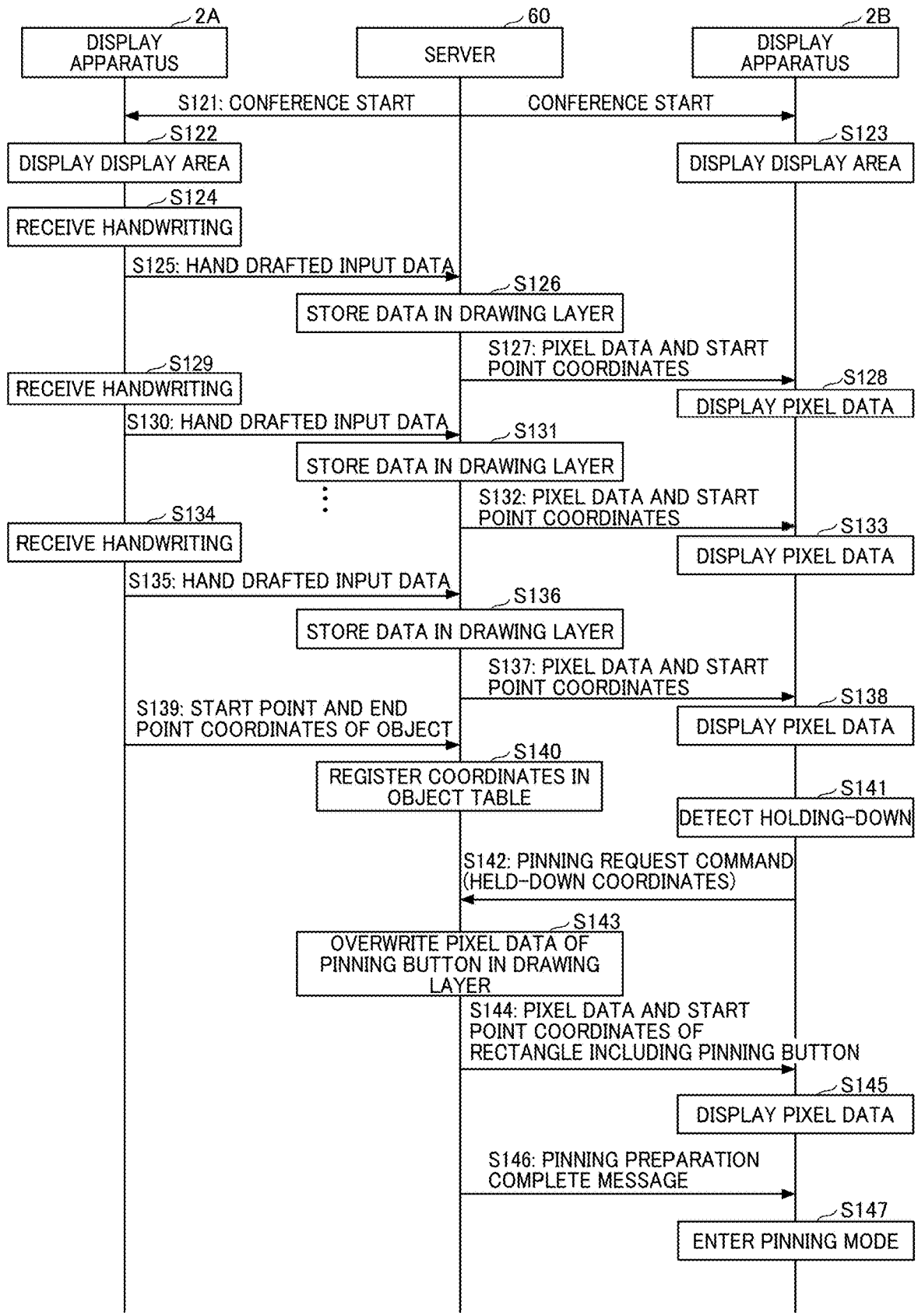
FIGS. 39A and 39B are sequence diagrams illustrating an example of a procedure for display apparatuses to hold a teleconference via the server according to Embodiment 11.
Figure 39B:
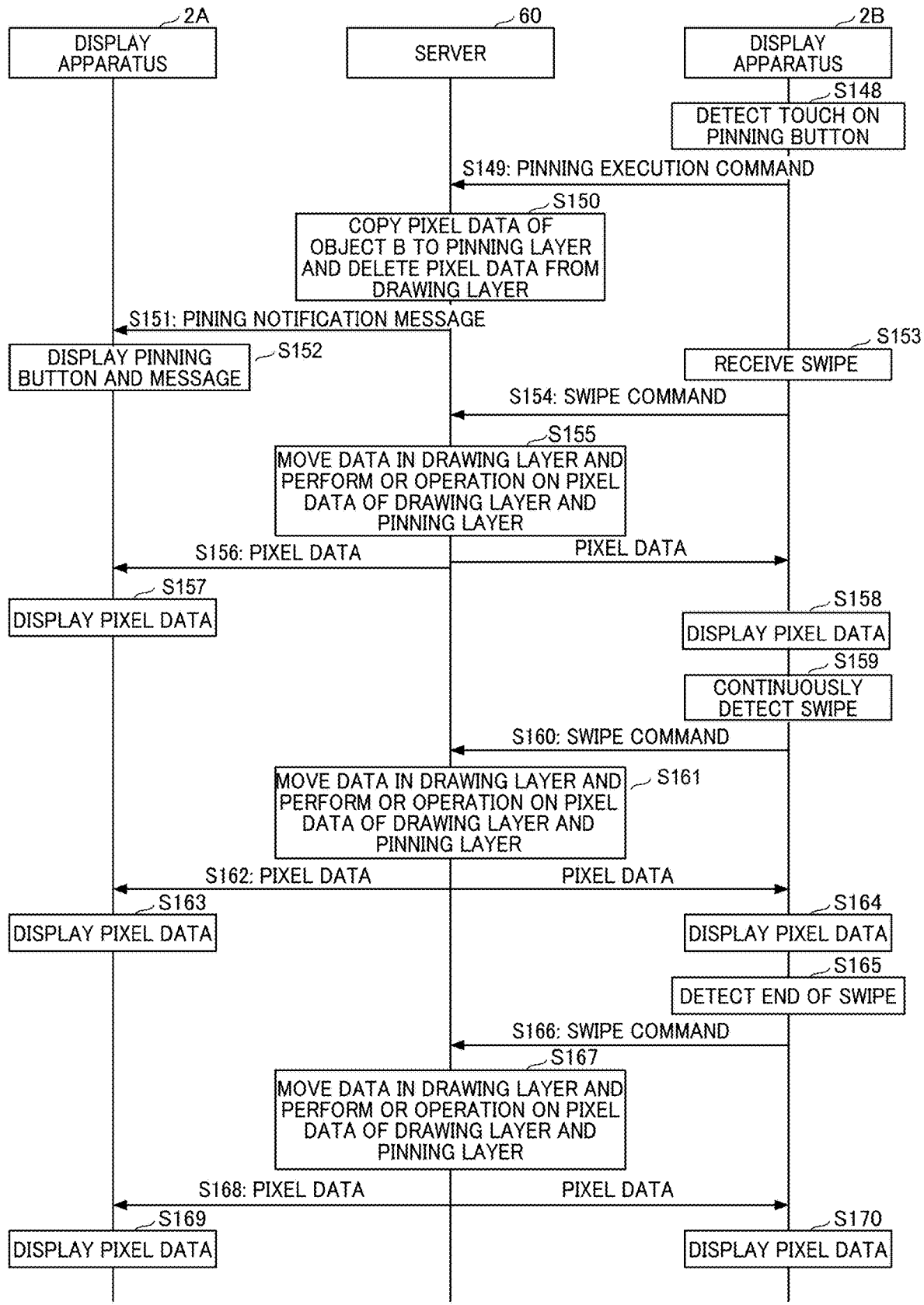

FIGS. 39A and 39B together illustrate an example of a procedure for the display apparatuses 2A and 2B to perform a teleconference via the server 60.

S121: Before a teleconference is held, the same conference ID is set in the display apparatus 2A at the site A and the display apparatus 2B at the site B. The conference ID may be set by the user operating the display apparatuses 2A and 2B. Alternatively, the conference ID may be set by the user operating an equipment reservation system and transmitted from the equipment reservation system to the display apparatuses 2A and 2B.

Receiving an operation for participating in the conference from the user at the site A, the display apparatus 2A accesses the server 60 and transmits account information (apparatus ID and password) of the display apparatus 2A and the conference ID. When the server 60 receives the account information and the conference ID, the authentication control unit 30 verifies the account information and the conference ID against those stored in the conference data storing unit 22 and permits connection of the display apparatus 2A. When a process of a conference application for the conference ID received from the display apparatus 2A is not activated, the teleconference control unit 28 activates the process of the conference application for the conference ID.

The same applies to a case where the display apparatus 2B receives an operation for participating in the conference from the user at the site B. However, the process of the conference application for the conference ID received from the display apparatus 2B has already been activated, and, accordingly, the teleconference control unit 28 causes the display apparatus 2B to participate in the conference specified by the conference ID.

The teleconference control unit 28 of the server 60 transmits a conference start message to the display apparatuses 2A and 2B via the network communication unit 26.

S122 and S123: In response to receiving this message, the respective display control unit 14 of each of the display apparatuses 2A and 2B display a whiteboard (the display area 51) on the display 220.

S124: The display apparatus 2A at the site A receives, from the user, hand drafted input of the object A (XX seminar), the object B (agenda table), and the object C (memo about "reserve equipment") in the display area 51 (see FIG. 30). The drawing data generation unit 13 of the display apparatus 2A converts the hand drafted input data (coordinate point sequences, and line attribute data such as line thickness and color) into pixel data and writes the pixel data in the drawing layer 54. Then, the display control unit 14 displays the hand drafted objects A, B, and C on the display 220.

S125: The teleconference control unit 18 of the display apparatus 2A also transmits the hand drafted input data (coordinate point sequence, and line attribute data such as line thickness and color) to the server 60 via the network communication unit 16. The drawing data generation unit 13 of the display apparatus 2A transmits the hand drafted input data to the server 60 via the network communication unit 16 every time the amount hand drafted input data reaches a threshold.

S126: The network communication unit 26 of the server 60 receives the hand drafted input data, and the drawing data generation unit 23 converts the received data into pixel data for display and stores the pixel data in the drawing layer 54.

S127: Then, the teleconference control unit 28 of the server 60 transmits the pixel data and the start point coordinates of the rectangular area (circumscribed rectangle of the hand drafted object) to the display apparatus 2B via the network communication unit 26.

S128: When the teleconference control unit 18 of the display apparatus 2B receives the pixel data and the start point coordinates of the rectangular area via the network communication unit 16, the drawing data generation unit 13 writes the received pixel data in the drawing layer 54 from the position of the received start point coordinates. The display control unit 14 displays, on the display 220, the objects based on the hand drafted input data in the drawing layer 54. In this manner, the same handwritten objects are displayed on the respective displays 220 of the display apparatuses 2A and 2B.

Thereafter, the display apparatuses 2A and 2B share input strokes in steps S129 to S138 in the same manner. Thus, the objects A to C are displayed on the displays 220 of the display apparatuses 2A and 2B.

S139: The teleconference control unit 18 of the display apparatus 2A transmits the start point coordinates and the end point coordinates of the objects A to C to the server 60 via the network communication unit 16. The processing of step S139 (object classification) may be performed by the server 60.

S140: The teleconference control unit 28 of the server 60 receives the start point coordinates and the end point coordinates via the network communication unit 26, and the drawing object management unit 21 registers the received coordinates in the object table.

Next, the pinning, operation will be described. A description is given of a case where pinning and swipe are performed on the display apparatus 2B, but pinning and swipe may be performed in the display apparatus 2A.

S141: In the display apparatus 2B, the contact position detection unit 12 detects that the user holds down a position of the object B (agenda table) using the input device 291.

S142: The drawing object management unit 11 of the display apparatus 2B refers to the object table stored by the display apparatus 2B, and determines whether or not the held down coordinates are in the area of the object. In this example, the coordinates are not in the area of the object managed by the display apparatus 2B, and the teleconference control unit 18 of the display apparatus 2B transmits a pinning request command including the held down coordinates, to the server 60 via the network communication unit 16. The object selected by the user is specified based on the coordinate data.

S143: When the teleconference control unit 28 of the server 60 receives the pinning request command via the network communication unit 26, the drawing object management unit 21 refers to the object table and determines whether or not the coordinates are in the area of an object registered in the object table. Since the coordinates are in the area of the object B, the drawing data generation unit 23 of the server 60 reads graphic data of the pinning button 9 from the HD 504, converts the graphic data into pixel data for display, and overwrites the pixel data on the upper right position of the object B in the drawing layer 54.

S144: Then, the teleconference control unit 28 transmits the pixel data of the pinning button 9 and the start point coordinates of the rectangular area circumscribing the pinning button 9 to the display apparatus 2B via the network communication unit 26.

S145: When the teleconference control unit 18 of the display apparatus 2B receives the pixel data including the pinning button 9 via the network communication unit 16, the drawing data generation unit 13 overwrites the pixel data of the drawing layer 54 from the received start point coordinates, and the display control unit 14 displays the result on the display 220. As a result, the display apparatus 2B displays the contents illustrated in FIG. 31.

S146: The teleconference control unit 28 of the server 60 transmits a pinning preparation completion message to the display apparatus 2B via the network communication unit 26.

S147: When the teleconference control unit 18 of the display apparatus 2B receives this message via the network communication unit 16, the drawing object management unit 11 causes the display apparatus 2B to enter the pinning mode.

The description of the procedure continues to FIG. 39B.

S148 and S149: When the display apparatus 2B receives the user's pressing (touching) the pinning button 9 with the input device 291, the teleconference control unit 18 transmits a pinning execution command to the server 60 via the network communication unit 16.

S150: When the teleconference control unit 28 of the server 60 receives this command via the network communication unit 26, the drawing object management unit 21 copies the pixel data corresponding to the object B from the drawing layer 54 to the pinning layer 53 and deletes the corresponding pixel data from the drawing layer 54. Additionally, the drawing object management unit 21 of the server 60 deletes the pixel data of the rectangular area circumscribing the pinning button 9.

S151: Subsequently, the teleconference control unit 28 of the server 60 transmits a pinning notification message to the display apparatus 2A via the network communication unit 26. The pinning notification message includes the coordinates held down on the display apparatus 2B included in the pinning request command received in step S142.

S152: When the teleconference control unit 18 of the display apparatus 2A receives the message via the network communication unit 16, the display control unit 14 displays, on the display 220, the pinning button 9 (see FIG. 31) at a position of the coordinates included in the message for a predetermined time.

Additionally, the display control unit 14 of the display apparatus 2A displays, on the display 220, a message notifying the user of the pinning of an object at a remote site. The message is displayed for a predetermined time.

Figure 40:
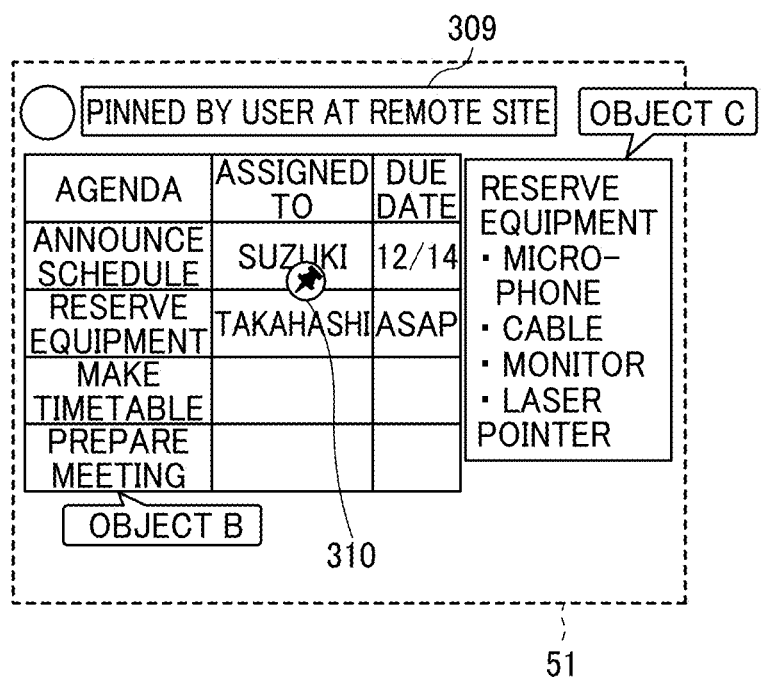
FIG. 40 is a diagram illustrating an example of a message notifying a user of pinning of an object on a display at a remote site, according to Embodiment 11.

FIG. 40 is a diagram illustrating a message 309 as an example of the message notifying the user of the pinning, displayed by the display apparatus 2A. In FIG. 40, a pin mark 310 is displayed on the object B, thereby enabling the user of the display apparatus 2A to know that the object B is pinned at another site.

Referring back to FIG. 39B, the description of the operation is continued.

S153: When the next subject on the agenda table (object B) is discussed, the user of the display apparatus 2A moves, by swipe, objects other than the pinned object B, to create a space for writing a note on the next subject. Therefore, the content displayed in the display area 51 is the same as that in FIG. 32.

S154: When the swipe detection unit 15 of the display apparatus 2B detects the start of the swipe operation and then detects that the contact position of the input device 291 has moved by a threshold amount, the teleconference control unit 18 transmits a swipe command including the start coordinates (Sx0,Sy0) of the swipe operation and the current contact position coordinates (Sx1,Sy1) to the server 60 via the network communication unit 16 of the display apparatus 2B.

S155: When the teleconference control unit 28 of the server 60 receives the swipe command via the network communication unit 26, the drawing object management unit 21 moves the object, in the drawing layer 54 by the amount (Sx1−Sx0) in the x-axis direction and the amount (Sy1−Sy0) in the y-axis direction. Then, the drawing data generation unit 23 of the server 60 performs an OR operation on the pixel data in the drawing layer 54 corresponding to the display area 51 and the corresponding pixel data in the pinning layer 53.

S156: The image encoding unit 29 of the server 60 compresses the pixel data into, for example, a portable network graphics (PNG) format, and the network communication unit 26 transmits the compressed pixel data to the display apparatuses 2A and 2B.

S157 and 158: The teleconference control unit 18 of each of the display apparatuses 2A and 2B receives the PNG data via the network communication unit 16, and the image decoding unit 19 converts the PNG data into pixel data for display. The display control unit 14 displays the display area 51 according to the pixel data on the display 220.

S159 to S164: While the display apparatus 2B keeps detecting the user's swipe operation, processing similar to that in steps S153 to S158 is executed.

S165 and S166: When the display apparatus 2B detects end of the user's swipe operation, the network communication unit 16 transmits a swipe command to the server 60. This is for transmitting the contact position transmitted last and the current contact position.

S167 to S170: When the display apparatus 2B transmits the swipe command to the server 60 in response to the end of the user's swipe operation, the same processing as that in S155 to S158 is executed.

In this manner, the objects in the display area 51 of FIG. 32 are displayed on the displays 220 of the display apparatuses 2A and 2B.

As described above, according to the present embodiment, in the display system 900 including the server 60, pinning of an object and creation of a space are shared between two or more display apparatuses 2 in a teleconference.

Embodiment 12

Descriptions are given of other examples of the configuration of the display system.

A description is given below of an example of the configuration of the display apparatus.

Although the display apparatus 2 according to the present embodiment is described as that having a large touch panel, the display apparatus 2 is not limited thereto.

Figure 41:
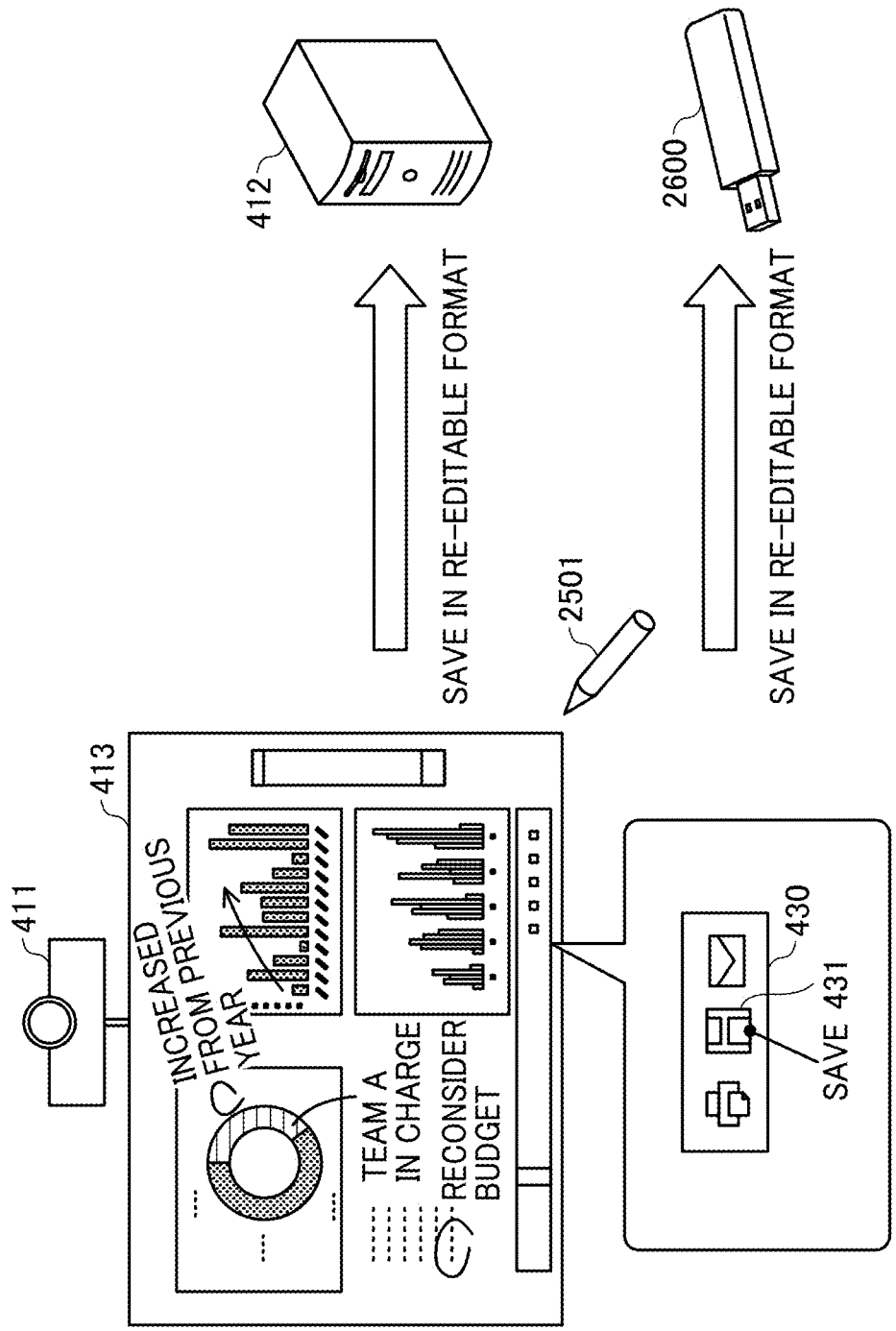
FIG. 41 is a diagram illustrating a configuration of a display system according to another embodiment.

FIG. 41 is a diagram illustrating another example of the configuration of the display system according to the above-described embodiments. The display system includes a projector 411, a screen 413 (such as a whiteboard), and a server 412, which are communicable via a network. In FIG. 41, the projector 411 is installed on the upper face of the screen 413. The projector 411 mainly operates as the display apparatus 2 described above. The projector 411 is a general-purpose projector, but installed with software that causes the projector 411 to function as the functional units illustrated in FIG. 6, 29 or 37. Alternatively, the server 412 may implement, for example, the functional units in FIG. 6, 29, or 37 other than the contact position detection unit 12, the display control unit 14, the swipe detection unit 15, and the network communication unit 16. Note that the screen may be a blackboard, and may be simply a plane having an area large enough to project an image.

The projector 411 employs an ultra short-throw optical system and projects an image (video) with reduced distortion from a distance of about 10 cm to the screen 413. This video may be transmitted from a PC connected wirelessly or by wire, or may be stored in the projector 411.

The user inputs handwriting on the screen 413 using a dedicated electronic pen 2501. The electronic pen 2501 includes a light-emitting element, for example, at a tip thereof. When a user presses the electronic pen 2501 against the screen 413 for handwriting, a switch is turned on, and the light-emitting portion emits light. The wavelength of the light from the light-emitting element is near-infrared or infrared, which is invisible to the user's eyes. The projector 411 includes a camera. The projector 411 captures, with the camera, an image of the light-emitting element, analyzes the image, and determines the direction of the electronic pen 2501. Further, the electronic pen 2501 emits a sound wave in addition to the light, and the projector 411 calculates a distance based on an arrival time of the sound wave. The projector 411 determines the position of the electronic pen 2501 based on the direction and the distance. Thus, the contact position detection unit 12, implemented by the camera and a sound wave receiver, detects position coordinates of the electronic pen 2501. A hand drafted object is drawn (projected) at the position of the electronic pen 2501.

The projector 411 projects a menu 430. When the user presses a button of the menu 430 with the electronic pen 2501, the projector 411 determines the pressed button based on the position of the electronic pen 2501 and the ON signal of the switch. For example, when a save button 431 is pressed, hand drafted input data (coordinate point sequence) input by the user is saved in the projector 411. The projector 411 stores hand drafted input data in the predetermined server 412, a USB memory 2600, or the like.

Embodiment 13

A description is given below of another example of the configuration of the display system.

Figure 42:
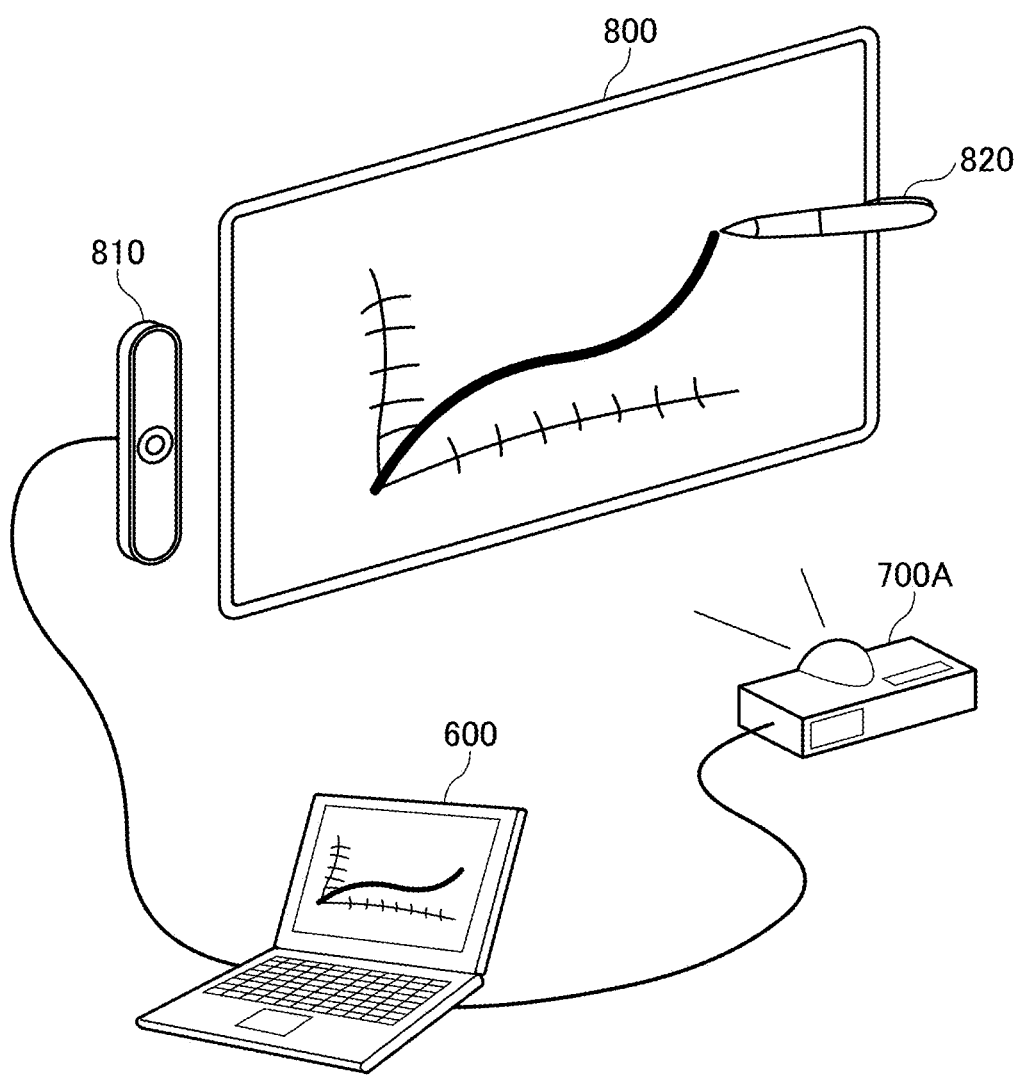
FIG. 42 is a diagram illustrating a configuration of a display apparatus according to another embodiment.

FIG. 42 is a diagram illustrating an example of the configuration of a display system. In the example illustrated FIG. 42, the display system includes a terminal 600 (information processing terminal such as a PC), an image projector 700A, and a pen motion detector 810.

The terminal 600 is wired to the image projector 700A and the pen motion detector 810. The image projector 700A projects an image onto a screen 800 according to data input from the terminal 600.

The pen motion detector 810 communicates with an electronic pen 820 to detect a motion of the electronic pen 820 in the vicinity of the screen 800. More specifically, the pen motion detector 810 detects coordinates indicating the position pointed by the electronic pen 820 on the screen 800 and transmits the coordinates to the terminal 600. The detection method may be similar to that of FIG. 41. Thus, the pen motion detector 810 includes the contact position detection unit 12 and the swipe detection unit 15, and the image projector 700A includes the display control unit 14. Other functional units illustrated in FIG. 6, 29, or 37 are implemented by the terminal 600.

Based on the coordinates received from the pen motion detector 810, the terminal 600 generates image data based on hand drafted input by the electronic pen 820 and causes the image projector 700A to project, on the screen 800, an image based on the hand drafted input data.

The terminal 600 generates data of a superimposed image in which an image based on hand drafted input by the electronic pen 820 is superimposed on the background image projected by the image projector 700A.

Embodiment 14

A description is given below of another example of the configuration of the display system.

Figure 43:
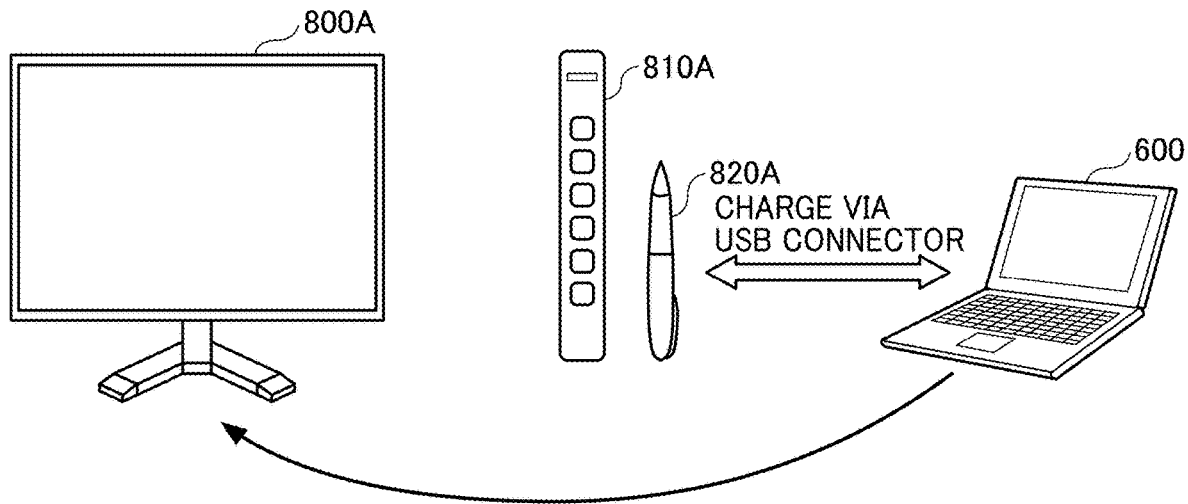
FIG. 43 is a diagram illustrating a configuration of a display apparatus according to another embodiment.

FIG. 43 is a diagram illustrating an example of the configuration of the display system according to Embodiment 14. In the example illustrated in FIG. 43, the display system includes the terminal 600, a display 800A, and a pen motion detector 810A.

The pen motion detector 810A is disposed in the vicinity of the display 800A. The pen motion detector 810A detects coordinate information indicating a position pointed by an electronic pen 820A on the display 800A and transmits the coordinate information to the terminal 600. The coordinate information may be detected in a method similar to that of FIG. 41. In the example illustrated FIG. 43, the electronic pen 820A may be charged from the terminal 600 via a USB connector.

Based on the coordinate information received from the pen motion detector 810, the terminal 600 generates image data of handwritten data input by the electronic pen 820A and displays an image based on the handwritten data on the display 800A.

Embodiment 15

A description is given below of another example of the configuration of the display system.

Figure 44:
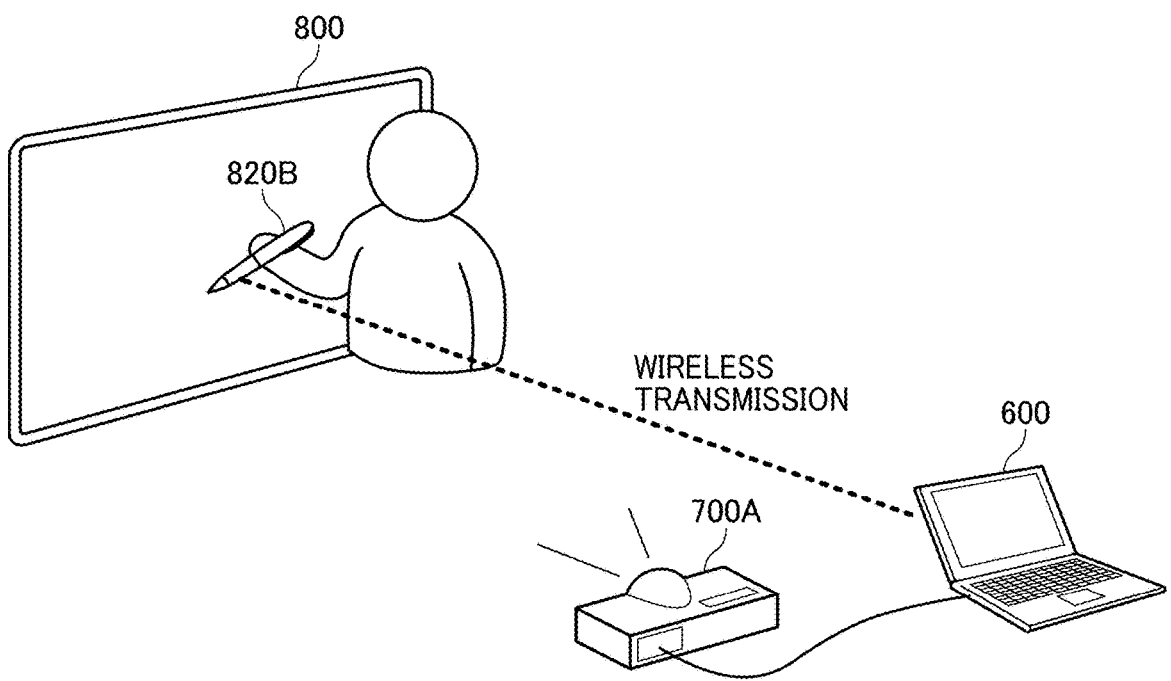
FIG. 44 is a diagram illustrating a configuration of a display apparatus according to another embodiment.

FIG. 44 is a diagram illustrating an example of the configuration of the display system according to Embodiment 15. In the example illustrated FIG. 44, the display system includes the terminal 600 and the image projector 700A.

The terminal 600 communicates with an electronic pen 820B through by wireless communication such as BLUETOOTH, to receive coordinate information indicating a position pointed by the electronic pen 820B on the screen 800. The electronic pen 820B may read minute position information on the screen 800, or receive the coordinate information from the screen 800.

Based on the received coordinate information, the terminal 600 generates image data of handwritten data input by the electronic pen 820B, and causes the image projector 700A to project an image based on the handwritten data.

The terminal 600 generates data of a superimposed image in which an image based on handwritten data input by the electronic pen 820B is superimposed on the background image projected by the image projector 700A.

The embodiments described above are applied to various system configurations.

Now, descriptions are given of other application of the embodiments described above.

The present disclosure is not limited to the details of the embodiments described above, and various modifications and improvements are possible.

The display apparatus 2 stores the character string as one or more character codes and stores the hand drafted input data as coordinate point sequence. The data can be saved in various types of storage media or in a memory on a network, to be downloaded from the display apparatus 2 to be reused later. The display apparatus 2 to reuse the data may be any display apparatus and may be a general information processing device. This allows a user to continue a conference or the like by reproducing the hand drafted content on different display apparatuses 2.

In the description above, an electronic whiteboard is described as an example of the display apparatus 2, but this is not limiting. A device having a substantially the same functions as the electronic whiteboard may be referred to as an electronic information board, an interactive board, or the like. The present disclosure is applicable to any information processing apparatus with a touch panel. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a laptop computer, a mobile phone, a smartphone, a tablet terminal, a game console, a personal digital assistant (PDA), a wearable PC, and a desktop PC.

Further, in the present embodiment, the display apparatus 2 detects the coordinates of the tip of the pen with the touch panel. However, the display apparatus 2 may detect the coordinates of the pen tip using ultrasonic waves. For example, the pen emits an ultrasonic wave in addition to the light, and the display apparatus 2 calculates a distance based on an arrival time of the sound wave. The display apparatus 2 determines the position of the pen based on the direction and the distance. The projector draws (projects) the trajectory of the pen based on stroke data.

In the block diagram such as FIG. 6, functional units are divided into blocks in accordance with main functions of the display apparatus 2, in order to facilitate understanding the operation by the display apparatus 2. Each processing unit or each specific name of the processing unit is not to limit a scope of the present disclosure. The processing implemented by the display apparatus 2 may be divided into a larger number of processing units depending on the content of the processing. In addition, a single processing unit can be further divided into a plurality of processing units.

A part of the processing performed by the display apparatus 2 may be performed by a server connected to the display apparatus 2 via a network.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

The drawing object management unit 11 is an example of a selection receiving unit. The display control unit 14 is an example of a display control unit. The drawing data generation unit 23 is an example of an image data generation unit. The drawing object management unit 11 is an example of an object management unit. The display control unit 14 of each of the display apparatuses 2A and 2B is an example of a first display control unit or a second display control unit. The network communication unit 16 is an example of a transmission unit. The network communication unit 16 of each of the display apparatuses 2A and 2B is an example of a first transmission unit, and the network communication unit 26 of the server 60 is an example of a second transmission unit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

According to one aspect, a display system includes a first display apparatus and a second display apparatus. The first display apparatus includes first circuit to select, based on a user operation, an object to be retained in a display area that is a portion of an input receiving area for receiving hand drafted input. The first circuitry is further to move the selected object in accordance with an operation of moving the display area in the input receiving area; display the moved display area in which the object is retained; and transmit, to the second display apparatus, data of the retained object, coordinates of the object in the display area, and data of movement of moving the display area.

The second display apparatus includes second circuitry to display the display area moved based on the data of movement of moving the display area, and display the object in the moved display area based on the coordinates of the object.

According to another one aspect, a non-transitory recording medium storing a plurality of program codes which, when executed by one or more processors, causes the processors to perform a method. The method includes displaying a display area that is a portion of an input receiving area for receiving hand drafted input; selecting, in the display area, an object to be retained in the display area based on a user operation; moving the selected object in accordance with an operation of moving the display area in the input receiving area; and displaying the moved display area in which the object is retained.

The invention claimed is:

1. A display apparatus comprising:
a drawing layer;
a pinning layer, the pinning layer being closer to a sight of a user than the drawing layer; and
circuitry configured to:
display a display area at a first location, the display area being a portion of an input receiving area on the drawing layer for receiving hand drafted input;
select an object on the drawing layer to be retained in the display area based on a user operation;
copy the selected object on the drawing layer to the pinning layer while remaining areas of the pinning layer other than the object are transparent;
receive an operation of moving the display area to a second location different from the first location in the input receiving area; and
display the display area in which the object is retained at the second location according to the operation of moving the display area by pinning the pinning layer to the display area.

2. The display apparatus according to claim 1,
wherein the circuitry displays the retained object at a same position in the display area as a position of the object in the display area at a time when the object is selected.

3. The display apparatus according to claim 1,
wherein, in a period during which the operation of moving the display area is received, the circuitry maintains a position of the object in the display area at a time when the object is selected.

4. The display apparatus according to claim 1,
wherein the circuitry selects the object held down by a user operation.

5. The display apparatus according to claim 1,
wherein the circuitry selects the object to be retained based a stroke enclosing the object after receiving hand draft input of a retaining mark.

6. The display apparatus according to claim 1,
wherein the circuitry selects the object to be retained in response to determining hand draft input of a retaining mark within a threshold distance from the object.

7. The display apparatus according to claim 1,
wherein the circuitry:
displays an operation menu including a graphical representation for selecting an object to be retained; and
selects, as the object to be retained, an object pressed by a user operation after detecting selection of the graphical representation for selecting.

8. The display apparatus according to claim 1,
wherein the circuitry:
displays an operation menu including a graphical representation for selecting an object to be retained; and
selects the object to be retained based on a stroke enclosing the object after the graphical representation for selecting is pressed.

9. The display apparatus according to claim 4,
wherein the circuitry:
displays a graphical representation for selecting the object to be retained, adjacent to an object held down by a user operation in the display area; and
selects the object held down, as the object to be retained, in response to detecting pressing of the graphical representation for selecting.

10. The display apparatus according to claim 1,
wherein the circuitry:
displays an operation menu including a graphical representation for selecting an object to be retained;
in response to pressing of the graphical representation for selecting, detects a contact position of the display area being in contact with an input device;
moves the object to be retained to the contact position; and
retains the object at the contact position in the display area.

11. The display apparatus according to claim 1,
wherein, in a selection mode to select an object according to a user operation, the circuitry:
in response to receiving an input of a rectangle in the display area by the user operation, moves the object selected by the user operation to a region inside the rectangle; and
retains the moved object in the rectangle in the display area.

12. The display apparatus according to claim 1,
wherein circuitry:
selects, as the object to be retained, an object held down by a first input device, and
moves the selected object in accordance with an operation of moving the display area by a second input device, the operation of moving performed in a state in which the object is being held down by the first input device.

13. The display apparatus according to claim 1,
wherein the circuitry:
in response to detecting holding down of the object retained in the display area, displays, adjacent to the retained object, a graphical representation for releasing of the retained object from the display area; and
releases the retained object from the display area in response to pressing of the graphical representation for releasing; and
change a position of the released object relative to the display area in accordance with a movement amount by which the display area has been moved.

14. A display method comprising:
displaying a display area at a first location, the display area being a portion of an input receiving area on a drawing layer for receiving hand drafted input;
selecting an object on the drawing layer to be retained in a display area based on a user operation;
copying the selected object on the drawing layer to a pinning layer while remaining areas of the pinning layer other than the object are transparent, the pinning layer being closer to a sight of a user than the drawing layer;
receiving an operation of moving the display area to a second location different from the first locating in the input receiving area; and
displaying the display area in which the object is retained at the second location according to the operation of moving the display area by pinning the pinning layer to the display area.

15. The display apparatus according to claim 1, wherein the circuitry is further configured to, after copying the selected object on the drawing layer to the pinning layer, delete the selected object from the drawing layer.

16. The display apparatus according to claim 1, wherein the circuitry is further configured to, after copying the selected object on the drawing layer to the pinning layer, display the selected object in the drawing layer with half luminance.

* * * * *